US012741318B2

(12) United States Patent
Brown et al.

(10) Patent No.: US 12,741,318 B2
(45) Date of Patent: Sep. 22, 2026

(54) MATERIAL MANIPULATION IN THREE-DIMENSIONAL PRINTING

(71) Applicant: Velo3D, Inc., Fremont, CA (US)

(72) Inventors: Gregory Ferguson Brown, San Jose, CA (US); Maritza Ruiz, Scotts Valley, CA (US); Joseph Andrew Tralongo, El Cajon, CA (US); Richard Joseph Romano, San Jose, CA (US); Sergey Borisovich Korepanov, Los Altos, CA (US); Benyamin Buller, Cupertino, CA (US)

(73) Assignee: Velo3D, Inc., Fremont, CA (US)

( * ) Notice: Subject to any disclaimer, the term of this patent is extended or adjusted under 35 U.S.C. 154(b) by 0 days.

(21) Appl. No.: 18/071,960

(22) Filed: Nov. 30, 2022

(65) Prior Publication Data

US 2023/0150030 A1 May 18, 2023

Related U.S. Application Data

(63) Continuation of application No. PCT/US2021/035350, filed on Jun. 2, 2021.

(60) Provisional application No. 63/034,002, filed on Jun. 3, 2020.

(51) Int. Cl.
*B22F 10/68* (2021.01)
*B22F 12/90* (2021.01)
*B33Y 40/20* (2020.01)

(52) U.S. Cl.
CPC .............. *B22F 10/68* (2021.01); *B22F 12/90* (2021.01); *B33Y 40/20* (2020.01)

(58) Field of Classification Search
CPC ...... B22F 10/68; B22F 12/90; B22F 2998/00; B22F 2999/00; B22F 10/28; B22F 10/32; B22F 10/73; B22F 10/77; B22F 10/85; B22F 12/70; B33Y 40/20; B33Y 40/00; B33Y 30/00; Y02P 10/25
See application file for complete search history.

(56) References Cited

U.S. PATENT DOCUMENTS

| | | | |
|---|---|---|---|
| 430,047 | A | 6/1890 | Tylee |
| 1,003,518 | A | 9/1911 | Schiller |
| 1,003,530 | A | 9/1911 | Smith |
| 1,011,223 | A | 12/1911 | Messick |
| 1,025,233 | A | 5/1912 | Austin |
| 1,025,904 | A | 5/1912 | Earhart |

(Continued)

FOREIGN PATENT DOCUMENTS

| | | | |
|---|---|---|---|
| CN | 1057034 | C | 10/2000 |
| CN | 1648802 | A | 8/2005 |

(Continued)

OTHER PUBLICATIONS

US 10,507,527 B2, 12/2019, Romano (withdrawn)

(Continued)

*Primary Examiner* — Alexander Markoff
(74) *Attorney, Agent, or Firm* — Bryan L. Baysinger; Nicholas P. Stadnyk; Maynard Nexsen PC

(57) ABSTRACT

The present disclosure provides three-dimensional (3D) printing systems, apparatuses, software, and methods for safe production of at least one requested 3D object, and for passivation of material accumulated on a filter of the 3D printing system.

25 Claims, 11 Drawing Sheets

(56) References Cited

U.S. PATENT DOCUMENTS 1,028,645 A 6/1912 Weaver
1,028,660 A 6/1912 Barber
3,790,787 A 2/1974 Geller
3,849,003 A 11/1974 Velzel
3,864,809 A 2/1975 Donachie
4,019,066 A 4/1977 Lucas
4,177,087 A 12/1979 Hills
4,300,474 A 11/1981 Livsey
4,323,756 A 4/1982 Brown
4,359,622 A 11/1982 Dostoomian
4,823,158 A 4/1989 Casey
4,845,356 A 7/1989 Baker
4,863,538 A 9/1989 Deckard
4,927,582 A 5/1990 Bryson
4,938,816 A 7/1990 Beaman
4,961,154 A 10/1990 Pomerantz
4,962,988 A 10/1990 Swann
5,088,047 A 2/1992 Bynum
5,127,037 A 6/1992 Bynum
5,155,321 A 10/1992 Grube
5,156,697 A 10/1992 Bourell
5,162,660 A 11/1992 Popil
5,202,837 A 4/1993 Coe
5,203,944 A 4/1993 Prinz
5,204,055 A 4/1993 Sachs
5,208,431 A 5/1993 Uchiyama
5,223,781 A 6/1993 Criswell
5,252,264 A 10/1993 Forderhase
5,255,057 A 10/1993 Stelter
5,286,573 A 2/1994 Prinz
5,296,062 A 3/1994 Bourell
5,303,141 A 4/1994 Batchelder
5,325,516 A 6/1994 Blomgren
5,342,919 A 8/1994 Dickens, Jr.
5,352,405 A 10/1994 Beaman
5,354,414 A 10/1994 Feygin
5,386,427 A 1/1995 Zayhowski
5,387,380 A 2/1995 Cima
5,393,482 A 2/1995 Benda
5,396,333 A 3/1995 Aleshin
5,424,834 A 6/1995 Akedo
5,430,666 A 7/1995 Deangelis
5,460,758 A 10/1995 Langer
5,508,489 A 4/1996 Benda
5,527,019 A 6/1996 Schwarz
5,527,877 A 6/1996 Dickens, Jr.
5,530,221 A 6/1996 Benda
5,534,104 A 7/1996 Langer
5,536,467 A 7/1996 Reichle
5,582,876 A 12/1996 Langer
5,593,531 A 1/1997 Penn
5,594,652 A 1/1997 Penn
5,601,737 A 2/1997 Asahi
5,615,013 A 3/1997 Rueb
5,640,667 A 6/1997 Freitag
5,647,931 A 7/1997 Retallick
5,648,450 A 7/1997 Dickens, Jr.
5,658,412 A 8/1997 Retallick
5,665,401 A 9/1997 Serbin
5,730,925 A 3/1998 Mattes
5,733,497 A 3/1998 McAlea
5,745,834 A 4/1998 Bampton
5,749,041 A 5/1998 Lakshminarayan
5,753,171 A 5/1998 Serbin
5,753,274 A 5/1998 Wilkening
5,764,874 A 6/1998 White
5,786,562 A 7/1998 Larson
5,800,579 A 9/1998 Billingsley
5,818,718 A 10/1998 Thomas
5,821,475 A 10/1998 Morehead
5,824,259 A 10/1998 Allanic
5,832,415 A 11/1998 Wilkening
5,859,786 A 1/1999 Klein
5,876,550 A 3/1999 Feygin
5,876,767 A 3/1999 Mattes
5,904,890 A 5/1999 Lohner
5,908,569 A 6/1999 Wilkening
5,932,059 A 8/1999 Langer
5,951,864 A 9/1999 Hazrati
6,042,774 A 3/2000 Wilkening
6,066,285 A 5/2000 Kumar
6,085,122 A 7/2000 Manning
6,106,659 A 8/2000 Spence
6,126,276 A 10/2000 Davis
6,136,257 A 10/2000 Graf
6,138,892 A 10/2000 Kim
6,143,378 A 11/2000 Harwell
6,151,345 A 11/2000 Gray
6,169,605 B1 1/2001 Penn
6,175,422 B1 1/2001 Penn
6,206,672 B1 3/2001 Grenda
6,207,097 B1 3/2001 Iverson
6,215,093 B1 4/2001 Meiners
6,251,488 B1 6/2001 Miller
6,261,077 B1 7/2001 Bishop
6,268,584 B1 7/2001 Keicher
6,336,480 B2 1/2002 Gaylo
6,337,459 B1 1/2002 Terwijn
6,341,042 B1 1/2002 Matsunaka
6,376,148 B1 4/2002 Liu
6,391,251 B1 5/2002 Keicher
6,401,001 B1 6/2002 Jang
6,483,596 B1 11/2002 Philippi
6,492,651 B2 12/2002 Kerekes
6,531,036 B1 3/2003 Leitgeb
6,531,086 B1 3/2003 Larsson
6,554,600 B1 4/2003 Hofmann
6,583,379 B1 6/2003 Meiners
6,636,676 B1 10/2003 Renn
6,656,409 B1 12/2003 Keicher
6,656,410 B2 12/2003 Hull
6,672,343 B1 1/2004 Perret
6,682,688 B1 1/2004 Higashi
6,688,886 B2 2/2004 Hughes
6,722,872 B1 4/2004 Swanson
6,767,499 B1 7/2004 Hory
6,811,744 B2 11/2004 Keicher
6,814,823 B1 11/2004 White
6,815,636 B2 11/2004 Chung
6,823,124 B1 11/2004 Renn
6,824,714 B1 11/2004 Tuerck
6,861,613 B1 3/2005 Meiners
6,905,645 B2 6/2005 Iskra
6,930,278 B1 8/2005 Chung
6,932,935 B1 8/2005 Oberhofer
6,945,638 B2 9/2005 Teung
6,949,216 B2 9/2005 Brice
6,955,023 B2 10/2005 Rotheroe
6,963,338 B1 11/2005 Bachelder
6,986,654 B2 1/2006 Imiolek
6,989,115 B2 1/2006 Russell
6,994,894 B2 2/2006 Hofmeister
7,008,209 B2 3/2006 Iskra
7,027,887 B2 4/2006 Gaylo
7,045,015 B2 5/2006 Renn
7,047,098 B2 5/2006 Lindemann
7,073,442 B2 7/2006 Fedor
7,084,370 B2 8/2006 Hagemeister
7,107,118 B2 9/2006 Orozco
7,108,894 B2 9/2006 Renn
7,149,596 B2 12/2006 Berger
7,153,463 B2 12/2006 Leuterer
7,229,272 B2 6/2007 Leuterer
7,241,415 B2 7/2007 Khoshnevis
7,261,542 B2 8/2007 Hickerson
7,261,550 B2 8/2007 Herzog
7,270,844 B2 9/2007 Renn
7,294,366 B2 11/2007 Renn
7,296,599 B2 11/2007 Cox
7,326,377 B2 2/2008 Adams
7,357,629 B2 4/2008 Weiskopf
7,419,632 B2 9/2008 Keller
7,435,368 B2 10/2008 Davidson
7,452,500 B2 11/2008 Uckelmann

(56) References Cited

U.S. PATENT DOCUMENTS 7,454,262 B2 11/2008 Larsson
7,485,345 B2 2/2009 Renn
7,515,986 B2 4/2009 Huskamp
7,521,652 B2 4/2009 Chung
7,537,722 B2 5/2009 Andersson
7,540,738 B2 6/2009 Larsson
7,604,768 B2 10/2009 Kritchman
7,615,179 B2 11/2009 Dumond
7,628,600 B2 12/2009 Perret
7,635,825 B2 12/2009 Larsson
7,639,267 B1 12/2009 Desimone
7,658,163 B2 2/2010 Renn
7,661,948 B2 2/2010 Perret
7,665,979 B2 2/2010 Heugel
7,674,107 B2 3/2010 Perret
7,674,671 B2 3/2010 Renn
7,686,605 B2 3/2010 Perret
7,704,432 B2 4/2010 Dumond
7,713,048 B2 5/2010 Perret
7,713,454 B2 5/2010 Larsson
7,740,683 B2 6/2010 Thorsson
7,741,578 B2 6/2010 Adams
7,789,037 B2 9/2010 Teulet
7,799,253 B2 9/2010 Hoechsmann
7,814,441 B2 10/2010 Bae
7,820,241 B2 10/2010 Perret
7,833,465 B2 11/2010 Larsson
7,837,458 B2 11/2010 Perret
7,847,212 B2 12/2010 Renz
7,850,885 B2 12/2010 Philippi
7,863,544 B2 1/2011 Serruys
7,871,551 B2 1/2011 Wallgren
7,879,394 B1 2/2011 Keicher
7,891,095 B2 2/2011 Jonsson
7,901,604 B2 3/2011 Oberhofer
7,931,462 B2 4/2011 Mattes
7,936,352 B2 5/2011 Baran
7,938,079 B2 5/2011 King
7,938,341 B2 5/2011 King
7,946,840 B2 5/2011 Perret
7,976,302 B2 7/2011 Halder
7,987,813 B2 8/2011 Renn
7,991,465 B2 8/2011 Bartic
8,025,831 B2 9/2011 Kong
8,031,384 B2 10/2011 Perret
8,034,279 B2 10/2011 Dimter
8,048,359 B2 11/2011 Wang
8,073,315 B2 12/2011 Philippi
8,075,814 B2 12/2011 Fruth
8,083,513 B2 12/2011 Montero-Escuder
8,110,247 B2 2/2012 Renn
8,124,192 B2 2/2012 Paasche
8,132,744 B2 3/2012 King
8,137,739 B2 3/2012 Philippi
8,172,562 B2 5/2012 Mattes
8,186,414 B2 5/2012 Furlong
8,186,990 B2 5/2012 Perret
8,187,521 B2 5/2012 Larsson
8,187,522 B2 5/2012 Higashi
8,249,480 B2 8/2012 Aslam
8,260,447 B2 9/2012 Mattes
8,272,579 B2 9/2012 King
8,299,208 B2 10/2012 Mueller
8,303,886 B2 11/2012 Philippi
8,308,466 B2 11/2012 Ackelid
8,313,087 B2 11/2012 Hesse
8,317,508 B2 11/2012 Bokodi
8,366,432 B2 2/2013 Perret
8,414,281 B2 4/2013 Schleiss
8,455,051 B2 6/2013 Renn
8,488,994 B2 7/2013 Hanson
8,501,075 B2 8/2013 Philippi
8,502,107 B2 8/2013 Uckelmann
8,524,142 B2 9/2013 Uckelmann
8,525,071 B2 9/2013 Leuterer
8,543,361 B2 9/2013 Chen
8,556,981 B2 10/2013 Jones
8,570,534 B1 10/2013 Loewgren
8,590,157 B2 11/2013 Kruth
8,640,975 B2 2/2014 King
8,658,078 B2 2/2014 Weidinger
8,705,144 B2 4/2014 Gullentops
8,710,144 B2 4/2014 Hesse
8,728,387 B2 5/2014 Jones
8,734,694 B2 5/2014 Perret
8,753,105 B2 6/2014 Scott
8,784,720 B2 7/2014 Oberhofer
8,784,721 B2 7/2014 Philippi
8,794,263 B2 8/2014 Scott
8,796,146 B2 8/2014 Renn
8,803,073 B2 8/2014 Philippi
8,845,319 B2 9/2014 Oberhofer
8,884,186 B2 11/2014 Uckelmann
8,887,658 B2 11/2014 Essien
8,895,893 B2 11/2014 Perret
8,906,216 B2 12/2014 Detor
8,915,620 B2 12/2014 Vaes
8,945,456 B2 2/2015 Zenere
8,967,990 B2 3/2015 Weidinger
8,968,625 B2 3/2015 Tan
8,994,592 B2 3/2015 Scott
9,011,982 B2 4/2015 Muller
9,037,068 B2 5/2015 Kojima
9,064,671 B2 6/2015 Ljungblad
9,073,265 B2 7/2015 Snis
9,079,248 B2 7/2015 Ackelid
9,114,478 B2 8/2015 Scott
9,114,652 B1 8/2015 Wayman
9,117,039 B1 8/2015 Mosterman
9,126,167 B2 9/2015 Ljungblad
9,162,393 B2 10/2015 Ackelid
9,162,394 B2 10/2015 Ackelid
9,192,054 B2 11/2015 King
9,205,691 B1 12/2015 Jones
9,221,100 B2 12/2015 Schwarze
9,233,507 B2 1/2016 Bibas
9,254,535 B2 2/2016 Buller
9,272,369 B2 3/2016 Bruck
9,308,583 B2 4/2016 El-Dasher
9,314,972 B2 4/2016 Green
9,327,450 B2 5/2016 Hein
9,327,451 B2 5/2016 Teulet
9,346,127 B2 5/2016 Buller
9,366,422 B2 6/2016 Mcclure
9,380,304 B1 6/2016 Chang
9,399,256 B2 7/2016 Buller
9,403,235 B2 8/2016 Buller
9,415,443 B2 8/2016 Ljungblad
9,486,878 B2 11/2016 Buller
9,498,921 B2 11/2016 Teulet
9,505,057 B2 11/2016 Nordkvist
9,522,426 B2 12/2016 Das
9,527,246 B2 12/2016 Wiesner
9,533,452 B2 1/2017 Guenster
9,550,207 B2 1/2017 Ackelid
9,573,193 B2 2/2017 Buller
9,573,225 B2 2/2017 Buller
9,586,290 B2 3/2017 Buller
9,592,554 B2 3/2017 Abe
9,662,840 B1 5/2017 Buller
9,676,145 B2 6/2017 Buller
9,700,908 B2 7/2017 Baker
9,757,760 B2 9/2017 Halder
9,821,411 B2 11/2017 Buller
9,827,717 B2 11/2017 Huang
9,835,568 B2 12/2017 Woods
9,886,526 B2 2/2018 Huang
9,919,360 B2 3/2018 Buller
9,919,476 B2 3/2018 Paternoster
9,931,697 B2 4/2018 Levin
9,962,767 B2 5/2018 Buller
10,022,915 B2 7/2018 Bostick
10,035,188 B2 7/2018 Weilhammer
10,035,304 B2 7/2018 Reinarz

(56) References Cited

U.S. PATENT DOCUMENTS 10,058,920 B2 8/2018 Buller
10,065,270 B2 9/2018 Buller
10,071,422 B2 9/2018 Buller
10,093,123 B2 10/2018 Schwarze
10,112,236 B2 10/2018 Schlick
10,144,176 B1 12/2018 Buller
10,183,330 B2 1/2019 Buller
10,195,693 B2 2/2019 Buller
10,207,454 B2 2/2019 Buller
10,252,335 B2 4/2019 Buller
10,252,336 B2 4/2019 Buller
10,259,044 B2 4/2019 Buller
10,272,525 B1 4/2019 Buller
10,286,452 B2 5/2019 Buller
10,286,603 B2 5/2019 Buller
10,315,252 B2 6/2019 Symeonidis
10,357,829 B2 7/2019 Spink
10,357,957 B2 7/2019 Buller
10,369,629 B2 8/2019 Symeonidis
10,434,573 B2 10/2019 Buller
10,442,003 B2 10/2019 Symeonidis
10,449,696 B2 10/2019 Elgar
10,493,564 B2 12/2019 Buller
10,507,549 B2 12/2019 Buller
10,583,482 B2 3/2020 Heugel
10,611,092 B2 4/2020 Buller
10,625,374 B2 4/2020 Schwarze
10,688,722 B2 6/2020 Buller
10,888,925 B2 1/2021 Symeonidis
11,186,034 B2 11/2021 Matthieu
2001/0017085 A1 8/2001 Kubo
2002/0017509 A1 2/2002 Ishide
2002/0020945 A1 2/2002 Cho
2002/0041818 A1 4/2002 Abe
2002/0079601 A1 6/2002 Russell
2002/0090410 A1 7/2002 Tochimoto
2002/0104973 A1 8/2002 Kerekes
2002/0129485 A1 9/2002 Mok
2002/0145213 A1 10/2002 Liu
2002/0152002 A1 10/2002 Lindemann
2002/0158054 A1 10/2002 Manetsberger
2002/0195747 A1 12/2002 Hull
2003/0106378 A1 6/2003 Giannakopoulos
2003/0201255 A1 10/2003 Manetsberger
2003/0222066 A1 12/2003 Low
2003/0232512 A1 12/2003 Dickinson
2004/0003738 A1 1/2004 Imiolek
2004/0003741 A1 1/2004 Iskra
2004/0004303 A1 1/2004 Iskra
2004/0004653 A1 1/2004 Pryor
2004/0005182 A1 1/2004 Gaylo
2004/0026807 A1 2/2004 Andersson
2004/0045941 A1 3/2004 Herzog
2004/0056022 A1 3/2004 Meiners
2004/0061260 A1 4/2004 Heugel
2004/0084814 A1 5/2004 Boyd
2004/0094728 A1 5/2004 Herzog
2004/0099996 A1 5/2004 Herzog
2004/0118309 A1 6/2004 Fedor
2004/0121257 A1 6/2004 Kaminsky
2004/0173946 A1 9/2004 Pfeifer
2004/0179808 A1 9/2004 Renn
2004/0197493 A1 10/2004 Renn
2004/0200816 A1 10/2004 Chung
2004/0204785 A1 10/2004 Richardson
2004/0217095 A1 11/2004 Herzog
2004/0222549 A1 11/2004 Sano
2004/0228004 A1 11/2004 Sercel
2004/0262261 A1 12/2004 Fink
2005/0011631 A1 1/2005 Hong
2005/0035285 A1 2/2005 Tan
2005/0116391 A1 6/2005 Lindemann
2005/0133527 A1 6/2005 Dullea
2005/0142024 A1 6/2005 Herzog
2005/0156991 A1 7/2005 Renn
2005/0163917 A1 7/2005 Renn
2005/0186716 A1 8/2005 Kasumi
2005/0207901 A1 9/2005 Klobucar
2005/0258570 A1 11/2005 Kong
2005/0278933 A1 12/2005 Macke, Jr.
2005/0287031 A1 12/2005 Macke, Jr.
2006/0000814 A1 1/2006 Gu
2006/0003095 A1 1/2006 Bullen
2006/0019232 A1 1/2006 Fischer
2006/0054079 A1 3/2006 Withey
2006/0111807 A1 5/2006 Gothait
2006/0118532 A1 6/2006 Chung
2006/0156978 A1 7/2006 Lipson
2006/0180300 A1 8/2006 Lenehan
2006/0181700 A1 8/2006 Andrews
2006/0187326 A1 8/2006 Spencer
2006/0192322 A1 8/2006 Abe
2006/0208396 A1 9/2006 Abe
2006/0211158 A1 9/2006 Arai
2006/0214335 A1 9/2006 Cox
2006/0228248 A1 10/2006 Larsson
2006/0228897 A1 10/2006 Timans
2006/0249485 A1 11/2006 Partanen
2006/0280866 A1 12/2006 Marquez
2007/0001342 A1 1/2007 Oberhofer
2007/0003656 A1 1/2007 Labossiere
2007/0019028 A1 1/2007 Renn
2007/0023977 A1 2/2007 Braun
2007/0035069 A1 2/2007 Wust
2007/0051704 A1 3/2007 Husmann
2007/0052836 A1 3/2007 Yamada
2007/0057412 A1 3/2007 Weiskopf
2007/0122562 A1 5/2007 Adams
2007/0142914 A1 6/2007 Jones
2007/0154634 A1 7/2007 Renn
2007/0175875 A1 8/2007 Uckelmann
2007/0176312 A1 8/2007 Clark
2007/0183918 A1 8/2007 Monsheimer
2007/0196561 A1 8/2007 Philippi
2007/0241482 A1 10/2007 Giller
2007/0290409 A1 12/2007 Brice
2008/0006334 A1 1/2008 Davidson
2008/0013299 A1 1/2008 Renn
2008/0014457 A1 1/2008 Gennaro
2008/0026338 A1 1/2008 Cinader
2008/0060330 A1 3/2008 Davidson
2008/0131540 A1 6/2008 Perret
2008/0138515 A1 6/2008 Williams
2008/0151951 A1 6/2008 Elliott
2008/0204748 A1 8/2008 Nomaru
2008/0206460 A1 8/2008 Rhoades
2008/0208268 A1 8/2008 Bartic
2008/0257867 A1 10/2008 Malshe
2009/0004380 A1 1/2009 Hochsmann
2009/0017220 A1 1/2009 Muller
2009/0025638 A1 1/2009 Inoue
2009/0035411 A1 2/2009 Seibert
2009/0039570 A1 2/2009 Clark
2009/0042050 A1 2/2009 Matteazzi
2009/0045553 A1 2/2009 Weidinger
2009/0047165 A1 2/2009 Syvanen
2009/0059235 A1 3/2009 Qu
2009/0061077 A1 3/2009 King
2009/0069301 A1 3/2009 Milburn
2009/0090298 A1 4/2009 King
2009/0114151 A1 5/2009 Renn
2009/0152771 A1 6/2009 Philippi
2009/0185178 A1 7/2009 Miyoshi
2009/0206065 A1 8/2009 Kruth
2009/0206522 A1 8/2009 Hein
2009/0257672 A1 10/2009 Sullender
2009/0314391 A1 12/2009 Crump
2010/0004454 A1 1/2010 Fukuzumi
2010/0006228 A1 1/2010 Abe
2010/0012630 A1 1/2010 Leuterer
2010/0044547 A1 2/2010 Higashi
2010/0125356 A1 5/2010 Shkolnik
2010/0138028 A1 6/2010 Tasker
2010/0140550 A1 6/2010 Keller

(56) References Cited

U.S. PATENT DOCUMENTS

2010/0163405 A1 7/2010 Ackelid
2010/0173096 A1 7/2010 Kritchman
2010/0174392 A1 7/2010 Fink
2010/0215856 A1 8/2010 Kritchman
2010/0233012 A1 9/2010 Higashi
2010/0242843 A1 9/2010 Peretti
2010/0305743 A1 12/2010 Larsson
2010/0323050 A1 12/2010 Kumagai
2011/0029093 A1 2/2011 Bojarski
2011/0042031 A1 2/2011 Furlong
2011/0046916 A1 2/2011 Yu
2011/0052927 A1 3/2011 Martinoni
2011/0061591 A1 3/2011 Stecker
2011/0106290 A1 5/2011 Hoevel
2011/0123383 A1 5/2011 Fuwa
2011/0133367 A1 6/2011 Weidinger
2011/0135840 A1 6/2011 Doye
2011/0165339 A1 7/2011 Skoglund
2011/0165340 A1 7/2011 Baumann
2011/0168091 A1 7/2011 Baumann
2011/0187713 A1 8/2011 Pershing
2011/0190904 A1 8/2011 Lechmann
2011/0221100 A1 9/2011 Wesselky
2011/0223349 A1 9/2011 Scott
2011/0259862 A1 10/2011 Scott
2011/0278773 A1 11/2011 Bokodi
2011/0287185 A1 11/2011 Felstead
2011/0293771 A1 12/2011 Oberhofer
2012/0000893 A1 1/2012 Broude
2012/0010741 A1 1/2012 Hull
2012/0013256 A1 1/2012 Mcdermott
2012/0013710 A1 1/2012 Ehrlich
2012/0052145 A1 3/2012 Chen
2012/0090734 A1 4/2012 Heinlein
2012/0100031 A1 4/2012 Ljungblad
2012/0106150 A1 5/2012 Vaes
2012/0107496 A1 5/2012 Thoma
2012/0119399 A1 5/2012 Fruth
2012/0126457 A1 5/2012 Abe
2012/0130525 A1 5/2012 Tsai
2012/0133928 A1 5/2012 Urano
2012/0134386 A1 5/2012 Bender
2012/0139166 A1 6/2012 Abe
2012/0145806 A1 6/2012 Yang
2012/0155606 A1 6/2012 Simon
2012/0164322 A1 6/2012 Teulet
2012/0186779 A1 7/2012 Tan
2012/0211926 A1 8/2012 Larsson
2012/0213615 A1 8/2012 Sakaue
2012/0223059 A1 9/2012 Ackelid
2012/0228492 A1 9/2012 Franzen
2012/0228807 A1 9/2012 Teulet
2012/0231175 A1 9/2012 Tan
2012/0231576 A1 9/2012 King
2012/0234671 A1 9/2012 Ackelid
2012/0235548 A1 9/2012 Cordes
2012/0251378 A1 10/2012 Abe
2012/0267347 A1 10/2012 Arjakine
2012/0308781 A1 12/2012 Abe
2012/0318777 A1 12/2012 Kwok
2013/0016400 A1 1/2013 Yamashita
2013/0064706 A1 3/2013 Schwarze
2013/0080866 A1 3/2013 Ogilvie
2013/0089642 A1 4/2013 Lipson
2013/0093866 A1 4/2013 Ohlhues
2013/0101746 A1 4/2013 Keremes
2013/0112366 A1 5/2013 Mottin
2013/0112672 A1 5/2013 Keremes
2013/0134637 A1 5/2013 Wiesner
2013/0162643 A1 6/2013 Cardle
2013/0168902 A1 7/2013 Herzog
2013/0171019 A1 7/2013 Gessler
2013/0180959 A1 7/2013 Weston
2013/0186558 A1 7/2013 Comb
2013/0218531 A1 8/2013 Deichmann
2013/0228302 A1 9/2013 Rickenbacher
2013/0256953 A1 10/2013 Teulet
2013/0270750 A1 10/2013 Green
2013/0272746 A1 10/2013 Hanson
2013/0277891 A1 10/2013 Teulet
2013/0280547 A1 10/2013 Brandl
2013/0287933 A1 10/2013 Kaiser
2013/0300035 A1 11/2013 Snis
2013/0300286 A1 11/2013 Ljungblad
2013/0312928 A1 11/2013 Mercelis
2013/0329098 A1 12/2013 Lim
2013/0330470 A1 12/2013 Gersch
2013/0341313 A1 12/2013 Himmelsbach
2014/0000836 A1 1/2014 Xu
2014/0034626 A1 2/2014 Illston
2014/0035182 A1 2/2014 Boyer
2014/0049779 A1 2/2014 Tin
2014/0049964 A1 2/2014 Mcclure
2014/0065194 A1 3/2014 Yoo
2014/0086654 A1 3/2014 Kojima
2014/0086780 A1 3/2014 Miller
2014/0123458 A1 5/2014 Fearon
2014/0147328 A1 5/2014 Abe
2014/0150992 A1 6/2014 Koontz
2014/0154088 A1 6/2014 Etter
2014/0157579 A1 6/2014 Chhabra
2014/0163717 A1 6/2014 Das
2014/0176127 A1 6/2014 Kogej
2014/0241615 A1 8/2014 Shroff
2014/0246809 A1 9/2014 Hofmann
2014/0251481 A1 9/2014 Kroll
2014/0252687 A1 9/2014 El-Dasher
2014/0265045 A1 9/2014 Cullen
2014/0271221 A1 9/2014 Soucy
2014/0271328 A1 9/2014 Burris
2014/0271965 A1 9/2014 Ferrar
2014/0287080 A1 9/2014 Scott
2014/0288890 A1 9/2014 Khainson
2014/0301883 A1 10/2014 Wiesner
2014/0302187 A1 10/2014 Pawlikowski
2014/0314609 A1 10/2014 Ljungblad
2014/0314964 A1 10/2014 Ackelid
2014/0329953 A1 11/2014 Paternoster
2014/0332507 A1 11/2014 Fockele
2014/0335313 A1 11/2014 Chou
2014/0348691 A1 11/2014 Ljungblad
2014/0348692 A1 11/2014 Bessac
2014/0348969 A1 11/2014 Scott
2014/0361464 A1 12/2014 Holcomb
2014/0363585 A1 12/2014 Pialot
2014/0370323 A1 12/2014 Ackelid
2014/0374935 A1 12/2014 Flitsch
2014/0377117 A1 12/2014 Herrmann
2015/0004046 A1 1/2015 Graham
2015/0014281 A1 1/2015 Trimmer
2015/0017013 A1 1/2015 Tozzi
2015/0021815 A1 1/2015 Albrecht
2015/0021832 A1 1/2015 Yerazunis
2015/0034606 A1 2/2015 Blackmore
2015/0035206 A1 2/2015 Maggiore
2015/0037599 A1 2/2015 Blackmore
2015/0048528 A1 2/2015 Barton
2015/0049082 A1 2/2015 Coffey
2015/0050463 A1 2/2015 Nakano
2015/0054191 A1 2/2015 Ljungblad
2015/0060042 A1 3/2015 Shilpiekandula
2015/0061170 A1 3/2015 Engel
2015/0061195 A1 3/2015 Defelice
2015/0064047 A1 3/2015 Hyde
2015/0064048 A1 3/2015 Bessac
2015/0071809 A1 3/2015 Nordkvist
2015/0076739 A1 3/2015 Batchelder
2015/0084240 A1 3/2015 Shuck
2015/0088295 A1 3/2015 Hellestam
2015/0090074 A1 4/2015 Etter
2015/0091200 A1 4/2015 Mech
2015/0093720 A1 4/2015 Beeby
2015/0097307 A1 4/2015 Batchelder
2015/0097308 A1 4/2015 Batchelder

(56) References Cited

U.S. PATENT DOCUMENTS

2015/0110910 A1 4/2015 Hartmann
2015/0115490 A1 4/2015 Reinarz
2015/0139849 A1 5/2015 Pialot, Jr.
2015/0142153 A1 5/2015 Chun
2015/0145169 A1 5/2015 Liu
2015/0145177 A1 5/2015 El-Siblani
2015/0158249 A1 6/2015 Goto
2015/0165525 A1 6/2015 Jonasson
2015/0165545 A1 6/2015 Goehler
2015/0165681 A1 6/2015 Fish
2015/0165683 A1 6/2015 Cheverton
2015/0165684 A1 6/2015 Deane
2015/0174658 A1 6/2015 Ljungblad
2015/0174822 A1 6/2015 Huang
2015/0177158 A1 6/2015 Cheverton
2015/0178286 A1 6/2015 Dhollander
2015/0185454 A1 7/2015 Kalkbrenner
2015/0197060 A1 7/2015 Carr
2015/0198052 A1 7/2015 Pavlov
2015/0210013 A1 7/2015 Teulet
2015/0246485 A1 9/2015 Guenster
2015/0251355 A1 9/2015 Rehme
2015/0258609 A1 9/2015 Teulet
2015/0268099 A1 9/2015 Craig
2015/0283610 A1 10/2015 Ljungblad
2015/0283611 A1 10/2015 Takezawa
2015/0283613 A1 10/2015 Backlund
2015/0283761 A1 10/2015 Maeda
2015/0298211 A1 10/2015 Abe
2015/0298397 A1 10/2015 Chen
2015/0306667 A1 10/2015 Yao
2015/0306820 A1 10/2015 Colin
2015/0321422 A1 11/2015 Boyer
2015/0328839 A1 11/2015 Willis
2015/0331402 A1 11/2015 Lin
2015/0336330 A1 11/2015 Herzog
2015/0367415 A1 12/2015 Buller
2015/0367416 A1 12/2015 Buller
2015/0367417 A1 12/2015 Buller
2015/0367418 A1 12/2015 Buller
2015/0367419 A1 12/2015 Buller
2015/0367446 A1 12/2015 Buller
2015/0367447 A1 12/2015 Buller
2015/0367448 A1 12/2015 Buller
2015/0367453 A1 12/2015 Herzog
2015/0367574 A1 12/2015 Araie
2015/0375456 A1 12/2015 Cheverton
2016/0001401 A1 1/2016 Dimter
2016/0022336 A1 1/2016 Bateman
2016/0026337 A1 1/2016 Wassvik
2016/0026889 A1 1/2016 Parkhomenko
2016/0052057 A1 2/2016 Xu
2016/0052212 A1 2/2016 Schmidt
2016/0054115 A1 2/2016 Snis
2016/0054121 A1 2/2016 Snis
2016/0059310 A1 3/2016 Junker
2016/0059352 A1 3/2016 Sparks
2016/0067740 A1 3/2016 Voris
2016/0067778 A1 3/2016 Liu
2016/0067779 A1 3/2016 Dautova
2016/0082666 A1 3/2016 De Pena
2016/0082668 A1 3/2016 Perret
2016/0090848 A1 3/2016 Engeli
2016/0107263 A1 4/2016 Koerber
2016/0114431 A1 4/2016 Cheverton
2016/0114432 A1 4/2016 Ferrar
2016/0114531 A1 4/2016 Chuang
2016/0114535 A1 4/2016 Kritchman
2016/0121399 A1 5/2016 Buller
2016/0121548 A1 5/2016 Nauka
2016/0129502 A1 5/2016 Varetti
2016/0129631 A1 5/2016 Chen
2016/0136730 A1 5/2016 Mcmurtry
2016/0136896 A1 5/2016 Wighton
2016/0144574 A1 5/2016 Eilken
2016/0151833 A1 6/2016 Tsao
2016/0151860 A1 6/2016 Engeli
2016/0154906 A1 6/2016 Schmidt
2016/0159010 A1 6/2016 Perez
2016/0179064 A1 6/2016 Arthur
2016/0184891 A1 6/2016 Mironets
2016/0185048 A1 6/2016 Dave
2016/0187272 A1 6/2016 Ishii
2016/0193696 A1 7/2016 Mcfarland
2016/0193785 A1 7/2016 Bell
2016/0193790 A1 7/2016 Shuck
2016/0207109 A1 7/2016 Buller
2016/0214175 A1 7/2016 Nordstrom
2016/0221264 A1 8/2016 Doherty
2016/0228987 A1 8/2016 Baudimont
2016/0236279 A1 8/2016 Ashton
2016/0236414 A1 8/2016 Reese
2016/0236419 A1 8/2016 Griffin
2016/0241885 A1 8/2016 Ström
2016/0246908 A1 8/2016 Komzsik
2016/0250717 A1 9/2016 Kruger
2016/0258045 A1 9/2016 Carter, Jr.
2016/0271698 A1 9/2016 Schmidt
2016/0271884 A1 9/2016 Herzog
2016/0271885 A1 9/2016 Shi
2016/0279706 A1 9/2016 Domrose
2016/0284123 A1 9/2016 Hare
2016/0288254 A1 10/2016 Pettit
2016/0297006 A1 10/2016 Buller
2016/0297007 A1 10/2016 Buller
2016/0299996 A1 10/2016 Huang
2016/0300356 A1 10/2016 Kitamura
2016/0303687 A1 10/2016 Ljungblad
2016/0311025 A1 10/2016 Kaneko
2016/0318129 A1 11/2016 Hu
2016/0320236 A1 11/2016 Fortin
2016/0320771 A1 11/2016 Huang
2016/0321384 A1 11/2016 Pal
2016/0326880 A1 11/2016 Slavens
2016/0332384 A1 11/2016 De Pena
2016/0339639 A1 11/2016 Chivel
2016/0361874 A1 12/2016 Park
2017/0001371 A1 1/2017 Sobue
2017/0001379 A1 1/2017 Long
2017/0008126 A1 1/2017 Long
2017/0008776 A1 1/2017 Zemmouri
2017/0014902 A1 1/2017 Tanaka
2017/0015066 A1 1/2017 Herrmann
2017/0021420 A1 1/2017 Buller
2017/0021455 A1 1/2017 Dallarosa
2017/0036404 A1 2/2017 Rengers
2017/0056975 A1 3/2017 Carter
2017/0066052 A1 3/2017 Abe
2017/0066084 A1 3/2017 Ladewig
2017/0087769 A1 3/2017 Lancaster-Larocque
2017/0090461 A1 3/2017 Chong
2017/0100885 A1 4/2017 Desimone
2017/0102689 A1 4/2017 Khajepour
2017/0106603 A1 4/2017 Pobihun
2017/0123222 A1 5/2017 Demuth
2017/0129052 A1 5/2017 Buller
2017/0129185 A1 5/2017 Buller
2017/0136574 A1 5/2017 Zenzinger
2017/0136703 A1 5/2017 Hayes
2017/0144248 A1 5/2017 Yoshimura
2017/0144254 A1 5/2017 Buller
2017/0144374 A1 5/2017 Ono
2017/0144874 A1 5/2017 Huebinger
2017/0145586 A1 5/2017 Xiao
2017/0157704 A1 6/2017 Ladewig
2017/0157845 A1 6/2017 Bihari
2017/0165751 A1 6/2017 Buller
2017/0165752 A1 6/2017 Buller
2017/0165753 A1 6/2017 Buller
2017/0165754 A1 6/2017 Buller
2017/0165792 A1 6/2017 Buller
2017/0173883 A1 6/2017 Gray
2017/0189963 A1 7/2017 Buller
2017/0216917 A1 8/2017 Zhang

(56) References Cited

U.S. PATENT DOCUMENTS

2017/0217095 A1 8/2017 Buller
2017/0225198 A1 8/2017 Nevarez
2017/0232515 A1 8/2017 Demuth
2017/0239719 A1 8/2017 Buller
2017/0239720 A1 8/2017 Levin
2017/0239721 A1 8/2017 Buller
2017/0239752 A1 8/2017 Buller
2017/0239891 A1 8/2017 Buller
2017/0239892 A1 8/2017 Buller
2017/0246810 A1 8/2017 Gold
2017/0252975 A1 9/2017 Park
2017/0259337 A1 9/2017 Furukawa
2017/0259502 A1 9/2017 Chapiro
2017/0259504 A1 9/2017 Lin
2017/0266878 A1 9/2017 Furukawa
2017/0266887 A1 9/2017 Roviaro
2017/0274589 A1 9/2017 Wu
2017/0282245 A1 10/2017 Yasuda
2017/0282294 A1 10/2017 Uchida
2017/0291372 A1 10/2017 Milshtein
2017/0297110 A1 10/2017 Echigo
2017/0304894 A1 10/2017 Buller
2017/0304944 A1 10/2017 Symeonidis
2017/0305140 A1 10/2017 Wüst
2017/0320265 A1 11/2017 Baumann
2017/0333994 A1 11/2017 Schmitt
2017/0334024 A1 11/2017 Buller
2017/0341143 A1 11/2017 Abe
2017/0341183 A1 11/2017 Buller
2017/0341299 A1 11/2017 Kniola
2017/0341307 A1 11/2017 Xavier
2017/0348771 A1 12/2017 Kawada
2017/0355146 A1 12/2017 Buller
2017/0355147 A1 12/2017 Buller
2017/0361377 A1 12/2017 Guerrier et al.
2017/0368753 A1 12/2017 Yang
2018/0001553 A1 1/2018 Buller
2018/0001556 A1 1/2018 Buller
2018/0001557 A1 1/2018 Buller
2018/0015670 A1 1/2018 Gu
2018/0021855 A1 1/2018 De Lajudie
2018/0029126 A1 2/2018 Ng
2018/0029298 A1 2/2018 Takaya
2018/0056391 A1 3/2018 Buller
2018/0056392 A1 3/2018 Ichijo
2018/0071986 A1 3/2018 Buller
2018/0093373 A1 4/2018 Niederberger
2018/0093416 A1 4/2018 Prexler
2018/0093418 A1 4/2018 Lappas
2018/0093419 A1 4/2018 Lappas
2018/0095450 A1 4/2018 Lappas
2018/0099454 A1 4/2018 Hümmeler
2018/0104892 A1 4/2018 Herzog
2018/0111193 A1 4/2018 Romano
2018/0111194 A1 4/2018 Buller
2018/0111195 A1 4/2018 Romano
2018/0111196 A1 4/2018 Brezoczky
2018/0111197 A1 4/2018 Romano
2018/0111198 A1 4/2018 Vitanov
2018/0111319 A1 4/2018 Brezoczky
2018/0111320 A1 4/2018 Zhao
2018/0117837 A1 5/2018 Reese
2018/0117845 A1 5/2018 Buller
2018/0126460 A1 5/2018 Murphree
2018/0126461 A1 5/2018 Buller
2018/0126462 A1 5/2018 Murphree
2018/0126629 A1 5/2018 Staal
2018/0126649 A1 5/2018 Romano
2018/0126650 A1* 5/2018 Murphree ................. B08B 5/04
2018/0133635 A1 5/2018 Hofmann
2018/0133801 A1 5/2018 Buller
2018/0133956 A1 5/2018 Buller
2018/0133975 A1 5/2018 Zhao
2018/0141126 A1 5/2018 Buller
2018/0154442 A1 6/2018 Milshtein
2018/0154443 A1 6/2018 Milshtein
2018/0161875 A1 6/2018 Buller
2018/0178286 A1 6/2018 Martin
2018/0178292 A1 6/2018 Berggren
2018/0185915 A1 7/2018 Beauchamp
2018/0185961 A1 7/2018 Meidani
2018/0186067 A1 7/2018 Buller
2018/0186079 A1 7/2018 Vilajosana
2018/0186080 A1 7/2018 Milshtein
2018/0186081 A1 7/2018 Milshtein
2018/0186082 A1 7/2018 Randhawa
2018/0207721 A1 7/2018 Schlick
2018/0207722 A1 7/2018 Feldmann
2018/0236550 A1 8/2018 Herzog
2018/0236714 A1 8/2018 Thelakkadan
2018/0244034 A1 8/2018 Sutcliffe
2018/0250744 A1 9/2018 Symeonidis
2018/0250745 A1 9/2018 Spink
2018/0250746 A1 9/2018 Symeonidis
2018/0250771 A1 9/2018 Brown
2018/0250772 A1 9/2018 Symeonidis
2018/0250773 A1 9/2018 Symeonidis
2018/0250774 A1 9/2018 Symeonidis
2018/0250775 A1 9/2018 Spink
2018/0281067 A1 10/2018 Small
2018/0281236 A1 10/2018 Elgar
2018/0281237 A1 10/2018 Frechman
2018/0281282 A1 10/2018 Elgar
2018/0281283 A1 10/2018 Frechman
2018/0281284 A1 10/2018 Elgar
2018/0297114 A1 10/2018 Preston
2018/0318928 A1 11/2018 Christiansen
2018/0319150 A1 11/2018 Buller
2018/0326488 A1 11/2018 Lappas
2018/0361509 A1 12/2018 Reznik
2019/0022944 A1 1/2019 Döhler
2019/0054696 A1 2/2019 Alonso
2019/0061002 A1 2/2019 Symeonidis
2019/0118263 A1 4/2019 Buller
2019/0118286 A1 4/2019 Sugatani
2019/0118481 A1 4/2019 Brown
2019/0134747 A1 5/2019 Herzog
2019/0143412 A1 5/2019 Buller
2019/0230248 A1 7/2019 Mizes
2019/0232429 A1 8/2019 Buller
2019/0291184 A1 9/2019 Buller
2019/0366638 A1 12/2019 Buller
2019/0375010 A1 12/2019 Richardson
2020/0004255 A1 1/2020 Mohammadiha
2020/0039000 A1 2/2020 Sweetland
2020/0139631 A1 5/2020 Buller
2021/0138397 A1 5/2021 Schulz-Sciberras
2021/0178406 A1 6/2021 Ringwald
2021/0370403 A1 12/2021 Narita

FOREIGN PATENT DOCUMENTS

CN 101835554 A 9/2010
CN 102076456 A 5/2011
CN 102695476 A 9/2012
CN 103341625 A 10/2013
CN 103392153 A 11/2013
CN 103561891 A 2/2014
CN 103611934 A 3/2014
CN 103612393 A 3/2014
CN 103629198 A 3/2014
CN 103676588 A 3/2014
CN 203635913 U 6/2014
CN 103917348 A 7/2014
CN 204136439 2/2015
CN 105383059 3/2016
CN 105904729 A 8/2016
CN 105921747 A 9/2016
CN 113634770 A 11/2021
DE 4300478 C1 8/1994
DE 19939616 A1 3/2001
DE 102004061836 A1 7/2006
DE 102007029142 A1 1/2009
DE 102004057866 B4 6/2010

(56) References Cited

FOREIGN PATENT DOCUMENTS

| | | | |
|---|---|---|---|
| DE | 102009015130 | A1 | 10/2010 |
| DE | 102009036153 | A1 | 2/2011 |
| DE | 102010048335 | A1 | 4/2012 |
| DE | 102011112581 | A1 | 3/2013 |
| DE | 202013009787 | U1 | 12/2013 |
| DE | 102013208651 | A1 | 11/2014 |
| DE | 102013223411 | A1 | 5/2015 |
| DE | 102014000022 | A1 | 7/2015 |
| DE | 102014204528 | A1 | 9/2015 |
| DE | 102014010932 | A1 | 1/2016 |
| DE | 102015005780 | A1 | 12/2016 |
| EP | 0296818 | B1 | 4/1993 |
| EP | 1151849 | | 11/2001 |
| EP | 1466718 | A2 | 10/2004 |
| EP | 1622086 | B1 | 9/2008 |
| EP | 1992709 | A1 | 11/2008 |
| EP | 2277687 | A1 | 1/2011 |
| EP | 2361704 | A1 | 8/2011 |
| EP | 2522446 | A1 | 11/2012 |
| EP | 2583773 | A2 | 4/2013 |
| EP | 2620241 | A1 | 7/2013 |
| EP | 2789413 | A1 | 10/2014 |
| EP | 2832473 | A1 | 2/2015 |
| EP | 2832474 | A1 | 2/2015 |
| EP | 2873751 | A1 | 5/2015 |
| EP | 2992942 | A1 | 3/2016 |
| EP | 3127635 | A1 | 2/2017 |
| EP | 3165303 | A1 | 5/2017 |
| EP | 3208077 | A1 | 8/2017 |
| EP | 3263316 | A1 | 1/2018 |
| EP | 3 431 258 | A1 | 1/2019 |
| EP | 3263316 | B1 | 2/2019 |
| EP | 3441213 | | 2/2019 |
| EP | 3237177 | | 5/2019 |
| EP | 3650204 | A1 | 5/2020 |
| EP | 3 822 001 | A1 | 5/2021 |
| EP | 3822001 | | 5/2021 |
| GB | 1018656 | A | 1/1966 |
| GB | 2515287 | A | 12/2014 |
| JP | 86237109 | | 2/1987 |
| JP | 2001009921 | A | 1/2001 |
| JP | 2003502184 | A | 1/2003 |
| JP | 2003245981 | A | 9/2003 |
| JP | 2004143581 | A | 5/2004 |
| JP | 2006150977 | A | 6/2006 |
| JP | 2007111989 | | 5/2007 |
| JP | 2008291318 | A | 12/2008 |
| JP | 2008302607 | A | 12/2008 |
| JP | 2009001900 | A | 1/2009 |
| JP | 2009512579 | A | 3/2009 |
| JP | 2012502178 | A | 1/2012 |
| JP | 2012213971 | A | 11/2012 |
| JP | 2014227587 | A | 12/2014 |
| JP | 2016502603 | | 1/2016 |
| JP | 2016540109 | | 12/2016 |
| JP | 2017137563 | A | 8/2017 |
| KR | 20160059726 | A | 5/2016 |
| KR | 20160076708 | A | 7/2016 |
| NO | 317085 | B1 | 8/2004 |
| RU | 2524467 | | 7/2014 |
| SE | 524467 | C2 | 8/2004 |
| TW | 201634234 | | 10/2016 |
| WO | 9208592 | A1 | 5/1992 |
| WO | 9511100 | A1 | 4/1995 |
| WO | 9511101 | | 4/1995 |
| WO | 9711837 | A1 | 4/1997 |
| WO | 9828124 | A2 | 7/1998 |
| WO | 9933641 | A1 | 7/1999 |
| WO | 0102160 | A1 | 1/2001 |
| WO | 0177988 | A2 | 10/2001 |
| WO | 2004005014 | | 1/2004 |
| WO | 2004037469 | A1 | 5/2004 |
| WO | 2006066939 | A1 | 6/2006 |
| WO | 2008028443 | A2 | 3/2008 |
| WO | 2008049384 | A1 | 5/2008 |
| WO | 2008064620 | A1 | 6/2008 |
| WO | 2008067496 | A2 | 6/2008 |
| WO | 2008074287 | A1 | 6/2008 |
| WO | 2008096105 | A1 | 8/2008 |
| WO | 2008128502 | A2 | 10/2008 |
| WO | 2009015619 | A2 | 2/2009 |
| WO | 2009096750 | A2 | 8/2009 |
| WO | 2010026396 | A2 | 3/2010 |
| WO | 2010115588 | A2 | 10/2010 |
| WO | 2013092997 | A1 | 6/2013 |
| WO | 2013113372 | A1 | 8/2013 |
| WO | 2013160188 | A1 | 10/2013 |
| WO | 2013167903 | A1 | 11/2013 |
| WO | 2013178825 | A2 | 12/2013 |
| WO | 2013179017 | A1 | 12/2013 |
| WO | 2013189473 | A1 | 12/2013 |
| WO | 2014023657 | A1 | 2/2014 |
| WO | 2014042970 | A1 | 3/2014 |
| WO | 2014044589 | A1 | 3/2014 |
| WO | 2014049159 | A1 | 4/2014 |
| WO | 2014083292 | A1 | 6/2014 |
| WO | 2014118783 | A1 | 8/2014 |
| WO | 2014120991 | A1 | 8/2014 |
| WO | 2014135136 | A1 | 9/2014 |
| WO | 2014144255 | A2 | 9/2014 |
| WO | 2014144360 | A2 | 9/2014 |
| WO | 2014144482 | A1 | 9/2014 |
| WO | 2014144630 | A1 | 9/2014 |
| WO | 2014176536 | A1 | 10/2014 |
| WO | 2014193406 | A1 | 12/2014 |
| WO | 2015020939 | | 2/2015 |
| WO | 2015023612 | A2 | 2/2015 |
| WO | 2015025171 | A2 | 2/2015 |
| WO | 2015034362 | A1 | 3/2015 |
| WO | 2015040433 | A2 | 3/2015 |
| WO | 2015051915 | A1 | 4/2015 |
| WO | 2015053946 | A1 | 4/2015 |
| WO | 2015077077 | | 5/2015 |
| WO | 2015082677 | A1 | 6/2015 |
| WO | 2015106836 | | 7/2015 |
| WO | 2015151865 | A1 | 10/2015 |
| WO | 2015176709 | A1 | 11/2015 |
| WO | 2015183796 | A1 | 12/2015 |
| WO | 2015196149 | A1 | 12/2015 |
| WO | 2016026852 | A1 | 2/2016 |
| WO | 2016026853 | A1 | 2/2016 |
| WO | 2016049621 | | 3/2016 |
| WO | 2016055523 | A1 | 4/2016 |
| WO | 2016075025 | A1 | 5/2016 |
| WO | 2016075026 | A1 | 5/2016 |
| WO | 2016077250 | A1 | 5/2016 |
| WO | 2016079494 | A2 | 5/2016 |
| WO | 2016094827 | A1 | 6/2016 |
| WO | 2016113253 | A1 | 7/2016 |
| WO | 2016169768 | A1 | 10/2016 |
| WO | 2016196223 | A1 | 12/2016 |
| WO | 2016196382 | A1 | 12/2016 |
| WO | 2017011456 | A1 | 1/2017 |
| WO | 2017015217 | A2 | 1/2017 |
| WO | 2017039858 | | 3/2017 |
| WO | 2017054842 | A1 | 4/2017 |
| WO | 2017079091 | A1 | 5/2017 |
| WO | 2017100695 | A1 | 6/2017 |
| WO | 2017118569 | A1 | 7/2017 |
| WO | 2017143077 | A1 | 8/2017 |
| WO | 2017179001 | A1 | 10/2017 |
| WO | 2017189982 | | 11/2017 |
| WO | 2017196344 | | 11/2017 |
| WO | 2017201120 | | 11/2017 |
| WO | 2018005439 | A1 | 1/2018 |
| WO | 2018064349 | A1 | 4/2018 |
| WO | 2018075741 | A1 | 4/2018 |
| WO | 2018106586 | A1 | 6/2018 |
| WO | 2018128695 | A2 | 7/2018 |
| WO | 2018129089 | A1 | 7/2018 |
| WO | 2018160807 | A1 | 9/2018 |
| WO | 2018183396 | A1 | 10/2018 |
| WO | 2019070644 | | 4/2019 |

(56) References Cited

FOREIGN PATENT DOCUMENTS

| | | |
|---|---|---|
| WO | 2019173000 | 9/2019 |
| WO | 2019195062 A1 | 10/2019 |
| WO | 2020083531 | 4/2020 |

OTHER PUBLICATIONS

Co-pending U.S. Appl. No. 16/177,090, filed Oct. 31, 2018. 11 pages.
Co-pending U.S. Appl. No. 16/183,557, filed Nov. 7, 2018. 9 pages.
Co-pending U.S. Appl. No. 16/195,810, filed Nov. 19, 2018. 10 pages.
Co-pending U.S. Appl. No. 16/245,183, filed Jan. 10, 2019. 9 pages.
Co-pending U.S. Appl. No. 16/248,665, filed Jan. 15, 2019. 8 pages.
Co-pending U.S. Appl. No. 16/291,759, filed Mar. 4, 2019. 37 pages.
Co-pending U.S. Appl. No. 16/351,030, filed Mar. 12, 2019. 202 pages.
Co-pending U.S. Appl. No. 16/404,579, filed May 6, 2019. 9 pages.
Co-pending U.S. Appl. No. 16/419,912, filed May 22, 2019. 10 pages.
Co-pending U.S. Appl. No. 16/439,614, filed Jun. 12, 2019. 217 pages.
Co-pending U.S. Appl. No. 16/449,965, filed Jun. 24, 2019. 37 pages.
Co-pending U.S. Appl. No. 16/450,853, filed Jun. 24, 2019. 202 pages.
Co-pending U.S. Appl. No. 16/505,520, filed Jul. 8, 2019. 149 pages.
Co-pending U.S. Appl. No. 16/506,911, filed Jul. 9, 2019. 209 pages.
Co-pending U.S. Appl. No. 16/542,208, filed Aug. 15, 2019. 52 pages.
Co-pending U.S. Appl. No. 16/550,088, filed Aug. 23, 2019.
Co-pending U.S. Appl. No. 16/591,549, filed Oct. 2, 2019.
Co-pending U.S. Appl. No. 16/653,933, filed Oct. 15, 2019.
Co-pending U.S. Appl. No. 16/662,764, filed Oct. 24, 2019.
Co-pending U.S. Appl. No. 16/662,933, filed Oct. 24, 2019.
Co-pending U.S. Appl. No. 16/686,045, filed Nov. 15, 2019.
Co-pending U.S. Appl. No. 16/694,963, filed Nov. 25, 2019.
Co-pending U.S. Appl. No. 16/709,887, filed Dec. 10, 2019.
Co-pending U.S. Appl. No. 16/714,638, filed Dec. 13, 2019.
Co-pending U.S. Appl. No. 16/719,679, filed Dec. 18, 2019.
Co-pending U.S. Appl. No. 16/783,490, filed Feb. 6, 2020.
Co-pending U.S. Appl. No. 16/789,905, filed Feb. 13, 2020.
Co-pending U.S. Appl. No. 16/820,459, filed Mar. 16, 2020.
Co-pending U.S. Appl. No. 16/825,696, filed Mar. 20, 2020.
Co-pending U.S. Appl. No. 29/653,429, filed Jun. 14, 2018.
Co-pending U.S. Appl. No. 16/137,295, inventor Buller; Benyamin, filed Sep. 20, 2018. 51 pages.
Co-pending U.S. Appl. No. 16/248,665, inventor Buller; Benyamin, filed Jan. 15, 2019. 52 pages.
Co-pending U.S. Appl. No. 16/253,103, inventor Buller; Benyamin, filed Jan. 21, 2019. 195 pages.
Co-pending U.S. Appl. No. 16/431,232, inventor Buller; Benyamin, filed Jun. 4, 2019. 148 pages.
Co-pending U.S. Appl. No. 16/449,965, inventor Buller; Benyamin, filed Jun. 24, 2019. 37 pages.
Co-pending U.S. Appl. No. 16/550,088, inventors Buller; Benyamin et al., filed Aug. 23, 2019. 222 pages.
Co-pending U.S. Appl. No. 16/578,190, inventors Milshtein; Erel et al., filed Sep. 20, 2019. 217 pages.
Co-pending U.S. Appl. No. 16/586,849, inventor Buller; Benyamin, filed Sep. 27, 2019. 149 pages.
Co-pending U.S. Appl. No. 16/590,868, filed Oct. 2, 2019. 37 pages.
Co-pending U.S. Appl. No. 16/591,549, inventors Buller; Benyamin et al., filed Oct. 2, 2019. 194 pages.
Co-pending U.S. Appl. No. 16/653,933, inventors Buller; Benyamin et al., filed Oct. 15, 2019. 203 pages.
Co-pending U.S. Appl. No. 16/662,764, inventors Buller; Benyamin et al., filed Oct. 24, 2019. 149 pages.
Co-pending U.S. Appl. No. 16/686,045, inventors Lappas; Tasso et al., filed Nov. 15, 2019. 166 pages.
Co-pending U.S. Appl. No. 16/694,963, inventors Buller; Benyamin et al., filed Nov. 25, 2019. 210 pages.
Co-pending U.S. Appl. No. 16/709,887, inventors Buller; Benyamin et al., filed Dec. 10, 2019. 232 pages.
Co-pending U.S. Appl. No. 16/714,638, inventors Buller; Benyamin et al., filed Dec. 13, 2019. 219 pages.
Co-pending U.S. Appl. No. 16/716,414, inventors Buller; Benyamin et al., filed Dec. 16, 2019. 220 pages.
Extended European Search Report on EP 21817139.5 dated Apr. 29, 2024.
Co-pending U.S. Appl. No. 15/634,267, filed Jun. 27, 2017.
Co-pending U.S. Appl. No. 15/634,666, filed Jun. 27, 2017.
Co-pending U.S. Appl. No. 15/668,662, filed Aug. 3, 2017. 9 pages.
Co-pending U.S. Appl. No. 15/719,084, filed Sep. 28, 2017. 8 pages.
Co-pending U.S. Appl. No. 15/719,133, filed Sep. 28, 2017. 9 pages.
Co-pending U.S. Appl. No. 15/719,229, filed Sep. 28, 2017. 9 pages.
Co-pending U.S. Appl. No. 15/788,364, filed Oct. 19, 2017. 9 pages.
Co-pending U.S. Appl. No. 15/788,418, filed Oct. 19, 2017. 9 pages.
Co-pending U.S. Appl. No. 15/788,463, filed Oct. 19, 2017. 9 pages.
Co-pending U.S. Appl. No. 15/788,495, filed Oct. 19, 2017. 9 pages.
Co-pending U.S. Appl. No. 15/788,532, filed Oct. 19, 2017. 9 pages.
Co-pending U.S. Appl. No. 15/788,568, filed Oct. 19, 2017. 9 pages.
Co-pending U.S. Appl. No. 15/788,662, filed Oct. 19, 2017. 9 pages.
Co-pending U.S. Appl. No. 15/803,675, filed Nov. 3, 2017. 11 pages.
Co-pending U.S. Appl. No. 15/803,683, filed Nov. 3, 2017. 10 pages.
Co-pending U.S. Appl. No. 15/803,686, filed Nov. 3, 2017. 9 pages.
Co-pending U.S. Appl. No. 15/803,688, filed Nov. 3, 2017. 9 pages.
Co-pending U.S. Appl. No. 15/803,692, filed Nov. 3, 2017. 9 pages.
Co-pending U.S. Appl. No. 15/808,434, filed Nov. 9, 2017. 10 pages.
Co-pending U.S. Appl. No. 15/808,777, filed Nov. 9, 2017. 9 pages.
Co-pending U.S. Appl. No. 15/830,421, filed Dec. 4, 2017. 9 pages.
Co-pending U.S. Appl. No. 15/830,470, filed Dec. 4, 2017. 9 pages.
Co-pending U.S. Appl. No. 15/853,700, filed Dec. 22, 2017. 9 pages.
Co-pending U.S. Appl. No. 15/855,744, filed Dec. 27, 2017. 8 pages.
Co-pending U.S. Appl. No. 15/861,544, filed Jan. 3, 2018. 9 pages.
Co-pending U.S. Appl. No. 15/861,548, filed Jan. 3, 2018. 9 pages.
Co-pending U.S. Appl. No. 15/861,553, filed Jan. 3, 2018. 9 pages.
Co-pending U.S. Appl. No. 15/861,561, filed Jan. 3, 2018. 8 pages.
Co-pending U.S. Appl. No. 15/870,561, filed Jan. 12, 2018. 9 pages.
Co-pending U.S. Appl. No. 15/871,763, filed Jan. 15, 2018. 8 pages.
Co-pending U.S. Appl. No. 15/873,832, filed Jan. 17, 2018. 10 pages.
Co-pending U.S. Appl. No. 15/886,544, filed Feb. 1, 2018. 8 pages.
Co-pending U.S. Appl. No. 15/893,523, filed Feb. 9, 2018. 9 pages.
Co-pending U.S. Appl. No. 15/909,388, filed Mar. 1, 2018. 10 pages.
Co-pending U.S. Appl. No. 15/909,396, filed Mar. 1, 2018. 9 pages.
Co-pending U.S. Appl. No. 15/909,406, filed Mar. 1, 2018. 10 pages.
Co-pending U.S. Appl. No. 15/909,783, filed Mar. 1, 2018. 9 pages.
Co-pending U.S. Appl. No. 15/909,784, filed Mar. 1, 2018. 11 pages.
Co-pending U.S. Appl. No. 15/909,806, filed Mar. 1, 2018. 9 pages.
Co-pending U.S. Appl. No. 15/909,809, filed Mar. 1, 2018. 9 pages.
Co-pending U.S. Appl. No. 15/909,826, filed Mar. 1, 2018. 11 pages.
Co-pending U.S. Appl. No. 15/937,778, filed Mar. 27, 2018.
Co-pending U.S. Appl. No. 15/937,790, filed Mar. 27, 2018.
Co-pending U.S. Appl. No. 15/937,798, filed Mar. 27, 2018.
Co-pending U.S. Appl. No. 15/937,812, filed Mar. 27, 2018.
Co-pending U.S. Appl. No. 15/937,817, filed Mar. 27, 2018.
Co-pending U.S. Appl. No. 16/030,795, filed Jul. 9, 2018. 10 pages.
Co-pending U.S. Appl. No. 16/031,896, filed Jul. 10, 2018. 10 pages.

(56) References Cited

OTHER PUBLICATIONS

Co-pending U.S. Appl. No. 16/125,644, filed Sep. 7, 2018. 10 pages.
Co-pending U.S. Appl. No. 16/137,295, filed Sep. 20, 2018. 8 pages.
U.S. Appl. No. 15/909,784 Office Action dated Jul. 13, 2018.
U.S. Appl. No. 15/909,806 Office Action dated Aug. 13, 2018.
U.S. Appl. No. 15/909,806 Office Action dated Dec. 26, 2018.
U.S. Appl. No. 15/909,809 Notice of Allowance dated Feb. 14, 2019.
U.S. Appl. No. 15/909,809 Notice of Allowance dated Jun. 19, 2019.
U.S. Appl. No. 15/909,809 Notice of Allowance dated May 31, 2019.
U.S. Appl. No. 15/909,809 Office Action dated Aug. 10, 2018.
U.S. Appl. No. 15/909,826 Notice of Allowance dated Jul. 1, 2019.
U.S. Appl. No. 15/909,826 Office Action dated Feb. 13, 2019.
U.S. Appl. No. 15/909,826 Office Action dated May 2, 2018.
U.S. Appl. No. 15/937,778 Office Action dated Feb. 12, 2019.
U.S. Appl. No. 15/937,790 Office Action dated Jan. 31, 2019.
U.S. Appl. No. 15/937,790 Office Action dated Sep. 25, 2018.
U.S. Appl. No. 15/937,798 Notice of Allowance dated Jun. 12, 2019.
U.S. Appl. No. 15/937,798 Office Action dated Mar. 7, 2019.
U.S. Appl. No. 15/937,798 Office Action dated Oct. 26, 2018.
U.S. Appl. No. 15/937,812 Office Action dated Sep. 7, 2018.
U.S. Appl. No. 15/937,817 Office Action dated Nov. 23, 2018.
U.S. Appl. No. 16/195,810 Office Action dated Dec. 27, 2019.
U.S. Appl. No. 15/339,712 Notice of Allowance dated Jul. 24, 2018.
U.S. Appl. No. 15/339,712 Notice of Allowance dated Jun. 18, 2018.
U.S. Appl. No. 15/374,318 Notice of Allowance dated Apr. 20, 2018.
U.S. Appl. No. 15/374,442 Notice of Allowance dated Oct. 3, 2018.
U.S. Appl. No. 15/374,535 Notice of Allowance dated Sep. 24, 2018.
U.S. Appl. No. 15/435,065 Office Action dated Aug. 16, 2018.
U.S. Appl. No. 15/435,078 Notice of Allowance dated Sep. 4, 2019.
U.S. Appl. No. 15/435,110 Notice of Allowance dated Sep. 25, 2018.
U.S. Appl. No. 15/435,110 Office Action dated Apr. 19, 2018.
U.S. Appl. No. 15/490,219 Office Action dated Oct. 12, 2018.
U.S. Appl. No. 15/614,979 Office Action dated Jun. 8, 2018.
U.S. Appl. No. 15/634,228 Notice of Allowance dated Feb. 20, 2019.
U.S. Appl. No. 15/634,267 Office Action dated Apr. 3, 2018.
U.S. Appl. No. 15/634,267 Office Action dated Sep. 6, 2018.
U.S. Appl. No. 15/634,727 Office Action dated Sep. 20, 2018.
U.S. Appl. No. 15/668,662 Office Action dated Oct. 1, 2020.
U.S. Appl. No. 15/719,133 Office Action dated Mar. 28, 2018.
U.S. Appl. No. 15/803,688 Office Action dated Sep. 20, 2018.
U.S. Appl. No. 15/808,434 Office Action dated Feb. 21, 2020.
U.S. Appl. No. 15/808,777 Office Action dated Feb. 6, 2020.
U.S. Appl. No. 15/830,421 Office Action dated Jul. 26, 2018.
U.S. Appl. No. 15/830,421 Office Action dated Nov. 13, 2018.
U.S. Appl. No. 15/855,744 Office Action dated Apr. 27, 2018.
U.S. Appl. No. 15/861,561 Office Action dated Jun. 16, 2020.
U.S. Appl. No. 15/871,763 Notice of Allowance dated Nov. 5, 2018.
U.S. Appl. No. 15/871,763 Notice of Allowance dated Sep. 17, 2018.
U.S. Appl. No. 15/886,544 Office Action dated Mar. 21, 2019.
U.S. Appl. No. 15/886,544 Office Action dated May 14, 2020.
U.S. Appl. No. 15/886,544 Office Action dated Sep. 6, 2019.
U.S. Appl. No. 15/893,523 Notice of Allowance dated Jul. 25, 2018.
U.S. Appl. No. 15/893,523 Notice of Allowance dated Jun. 15, 2018.
Notice of allowance dated Sep. 17, 2015 for U.S. Appl. No. 14/745,081. 7 pages.
Notice of allowance dated Sep. 28, 2015 for U.S. Appl. No. 14/745,081. 2 pages.
Notice of allowance dated Nov. 30, 2015 for U.S. Appl. No. 14/745,081. 3 pages.
Notice of Allowance dated Dec. 8, 2017 for U.S. Appl. No. 15/435,128. 13 pages.
Notice of Allowance dated Dec. 9, 2016 for U.S. Appl. No. 15/188,939. 14 pages.
Notice of Allowance dated Dec. 11, 2017 for U.S. Appl. No. 15/435,120. 23 pages.
Notice of allowance dated Dec. 14, 2015 for U.S. Appl. No. 14/745,081. 3 pages.
Notice of allowance dated Dec. 15, 2015 for U.S. Appl. No. 14/745,081. 3 pages.
Notice of allowance dated Aug. 10, 2016 for U.S. Appl. No. 14/967,118. 5 pages.
Notice of Allowance dated Aug. 7, 2017 for U.S. Appl. No. 14/744,910. 9 pages.
Notice of Allowance dated Dec. 11, 2017 for U.S. Appl. No. 15/435,120. 7 pages.
Notice of Allowance dated Dec. 8, 2017 for U.S. Appl. No. 15/435,128. 4 pages.
Notice of Allowance dated Dec. 9, 2016 for U.S. Appl. No. 15/188,939. 8 pages.
Notice of Allowance dated Feb. 16, 2018 for U.S. Appl. No. 15/435,120. 2 pages.
Notice of Allowance dated Feb. 21, 2018 for U.S. Appl. No. 15/435,128. 5 pages.
Notice of Allowance dated Feb. 6, 2018 for U.S. Appl. No. 15/374,821. 4 pages.
Notice of Allowance dated Jan. 12, 2018 for U.S. Appl. No. 15/435,120. 5 pages.
Notice of allowance dated Jan. 5, 2017 for U.S. Appl. No. 15/085,884. 10 pages.
Notice of allowance dated Jun. 20, 2016 for U.S. Appl. No. 14/744,675. 2 pages.
Notice of allowance dated Mar. 1, 2016 for U.S. Appl. No. 14/745,108. 7 pages.
Notice of Allowance dated Mar. 16, 2017 for U.S. Appl. No. 15/339,775. 7 pages.
Notice of Allowance dated Mar. 20, 2017 for U.S. Appl. No. 15/339,759. 8 pages.
Notice of allowance dated May 11, 2016 for U.S. Appl. No. 14/744,955. 9 pages.
Notice of allowance dated May 25, 2016 for U.S. Appl. No. 14/744,675. 7 pages.
Notice of allowance dated Sep. 17, 2015 for U.S. Appl. No. 14/745,081. 6 pages.
Notice of allowance dated Sep. 6, 2016 for U.S. Appl. No. 14/745,032. 8 pages.
Office Action dated Jan. 2, 2018 for U.S. Appl. No. 15/288,251. 15 pages.
Office action dated Jan. 7, 2016 for U.S. Appl. No. 14/744,859. 19 pages.
Office action dated Jan. 11, 2016 for U.S. Appl. No. 14/745,032. 21 pages.
Office Action dated Jan. 24, 2018 for U.S. Appl. No. 15/615,004. 71 pages.
Office Action dated Jan. 25, 2018 for U.S. Appl. No. 15/634,727. 61 pages.
Office Action dated Feb. 7, 2017 for U.S. Appl. No. 14/744,988. 13 pages.
Office Action dated Feb. 7, 2017 for U.S. Appl. No. 15/399,712. 7 pages.
Office Action dated Feb. 7, 2018 for U.S. Appl. No. 15/614,979. 67 pages.
Office Action dated Feb. 7, 2018 for U.S. Appl. No. 15/719,229. 21 pages.
Office Action dated Feb. 8, 2017 for U.S. Appl. No. 14/744,859. 35 pages.
Office action dated Feb. 10, 2016 for U.S. Appl. No. 14/744,910. 16 pages.
Office Action dated Feb. 14, 2018 for U.S. Appl. No. 15/634,228. 29 pages.
Office action dated Feb. 16, 2016 for U.S. Appl. No. 14/744,955. 7 pages.

(56) References Cited

OTHER PUBLICATIONS

Office action dated Mar. 4, 2016 for U.S. Appl. No. 14/744,988. 17 pages.
Office Action dated Mar. 6, 2017 for U.S. Appl. No. 14/744,910. 24 pages.
Office action dated Mar. 7, 2017 for U.S. Appl. No. 15/339,712. 11 pages.
Office Action dated Mar. 7, 2018 for U.S. Appl. No. 15/399,186. 20 pages.
Office action dated Mar. 10, 2016 for U.S. Appl. No. 14/744,675. 13 pages.
Office Action dated Mar. 23, 2017 for U.S. Appl. No. 15/399,186. 54 pages.
Office Action dated Apr. 28, 2017 for U.S. Appl. No. 15/374,616. 59 pages.
Office Action dated Jun. 15, 2017 for U.S. Appl. No. 15/288,251. 14 pages.
Office action dated Jun. 29, 2016 for U.S. Appl. No. 14/744,859. 15 pages.
Office Action dated Jun. 29, 2017 for U.S. Appl. No. 15/435,128. 6 pages.
Office action dated Jul. 1, 2016 for U.S. Appl. No. 14/745,032. 10 pages.
Office Action dated Jul. 3, 2017 for U.S. Appl. No. 15/435,120. 47 pages.
Office action dated Jul. 19, 2016 for U.S. Appl. No. 15/085,884. 25 pages.
Office action dated Jul. 21, 2016 for U.S. Appl. No. 14/744,910. 14 pages.
Office Action dated Jul. 28, 2017 for U.S. Appl. No. 14/744,988. 14 pages.
Office Action dated Aug. 2, 2017 for U.S. Appl. No. 15/435,090. 52 pages.
Office Action dated Aug. 18, 2017 for U.S. Appl. No. 15/374,318. 58 pages.
Office action dated Aug. 25, 2016 for U.S. Appl. No. 14/744,988. 16 pages.
Office Action dated Aug. 25, 2017 for U.S. Appl. No. 15/339,712. 19 pages.
Office action dated Sep. 10, 2015 for U.S. Appl. No. 14/744,675. 15 pages.
Office Action dated Sep. 11, 2017 for U.S. Appl. No. 15/374,821. 30 pages.
Office action dated Sep. 13, 2016 for U.S. Appl. No. 15/188,939. 7 pages.
Office Action dated Sep. 15, 2017 for U.S. Appl. No. 15/374,616. 34 pages.
Office Action dated Sep. 18, 2017 for U.S. Appl. No. 15/634,228. 18 pages.
Office action dated Oct. 2, 2015 for U.S. Appl. No. 14/744,955. 6 pages.
Office Action dated Oct. 19, 2017 for U.S. Appl. No. 15/399,186. 36 pages.
Office action dated Nov. 1, 2016 for U.S. Appl. No. 15/085,884 . 27 pages.
Office action dated Nov. 12, 2015 for U.S. Appl. No. 14/745,108. 15 pages.
Office Action dated Nov. 16, 2017 for U.S. Appl. No. 15/634,267. 57 pages.
Office action dated Nov. 18, 2016 for U.S. Appl. No. 15/188,939. 7 pages.
Office Action dated Nov. 27, 2017 for U.S. Appl. No. 15/374,318. 17 pages.
Office Action dated Dec. 8, 2017 for U.S. Appl. No. 15/435,090. 6 pages.
Office Action dated Dec. 15, 2017 for U.S. Appl. No. 15/435,110. 74 pages.
Office Action dated Apr. 28, 2017 for U.S. Appl. No. 15/374,616. 22 pages.
Office Action dated Aug. 18, 2017 for U.S. Appl. No. 15/374,318. 10 pages.
Office Action dated Aug. 2, 2017 for U.S. Appl. No. 15/435,090. 6 pages.
Office action dated Aug. 25, 2016 for U.S. Appl. No. 14/744,988. 17 pages.
Office Action dated Aug. 25, 2017 for U.S. Appl. No. 15/339,712. 7 pages.
Office Action dated Dec. 15, 2017 for U.S. Appl. No. 15/435,110. 20 pages.
Office Action dated Dec. 8, 2017 for U.S. Appl. No. 15/435,090. 17 pages.
Office action dated Feb. 10, 2016 for U.S. Appl. No. 14/744,910. 17 pages.
Office Action dated Feb. 14, 2018 for U.S. Appl. No. 15/634,228. 28 pages.
Office Action dated Feb. 7, 2017 for U.S. Appl. No. 14/744,988. 6 pages.
Office Action dated Feb. 7, 2018 for U.S. Appl. No. 15/614,979. 12 pages.
Office Action dated Feb. 8, 2017 for U.S. Appl. No. 14/744,859. 12 pages.
Office action dated Jan. 11, 2016 for U.S. Appl. No. 14/745,032. 22 pages.
Office Action dated Jan. 2, 2018 for U.S. Appl. No. 15/288,251. 30 pages.
Office Action dated Jan. 24, 2018 for U.S. Appl. No. 15/615,004. 16 pages.
Office Action dated Jan. 25, 2018 for U.S. Appl. No. 15/634,727. 9 pages.
Office action dated Jan. 7, 2016 for U.S. Appl. No. 14/744,859. 20 pages.
Office action dated Jul. 19, 2016 for U.S. Appl. No. 15/085,884. 26 pages.
Office action dated Jul. 21, 2016 for U.S. Appl. No. 14/744,910. 15 pages.
Office Action dated Jul. 28, 2017 for U.S. Appl. No. 14/744,988. 13 pages.
Office Action dated Jul. 3, 2017 for U.S. Appl. No. 15/435,120. 6 pages.
Office Action dated Jun. 15, 2017 for U.S. Appl. No. 15/288,251. 13 pages.
De Dietrich Process Systems, Inc. Powder Pump™. Product Brochure. Created Jul. 3, 2012. 2 pages.
Direct Manufacturing: ARCAM. Uploaded on Jun. 6, 2011. 2 pages, https://www.youtube.com/watch?v=M_qSnjKN7f8.
Doxygen. CGAL 4.11.1—Kinetic Data Structures. User Manual. Web. Published Apr. 8, 2006. 4 pages. URL:<https://doc.cgal.org/latest/Manual/how_to_cite_cgal.html>.
EOS. Direct Metal Laser Sintering Published Aug. 22, 2012. https://www.youtube.com/watch?v=cRE-Pzl6uZA. 3 pages.
EP15809160.3 European Search Report dated Aug. 7, 2018. 11 pages.
EP15866668.5 European Search Report dated Aug. 7, 2018. 10 pages.
EP16862767.7 European Search Report dated Jun. 26, 2019. 9 pages.
EP16874003.3 Extended European Search Report dated Oct. 10, 2019. 10 pages.
EP17178143.8 Notice of Opposition dated Nov. 19, 2019. 3 pages.
EP18209400.3 European Search Report dated May 7, 2019. 6 pages.
European Search Report and Search Opinion dated Nov. 30, 2017 for European Patent Application No. EP17178143.8. 5 pages.
Everton et al. Review of in-situ process monitoring and in-situ metrology for metal additive manufacturing. Materials and Design 95 (2016) 431-445.
Ex Parte Quayle Action dated Apr. 19, 2017 for U.S. Appl. No. 15/374,821. 6 pages.
Extended European Search Report dated Jul. 7, 2017 for European Patent Application No. EP17156707.6. 9 pages.
Fit AG & SLM Solutions (German)—YouTube, published Nov. 16, 2016, URL: https://www.youtube.com/watch?v=xOoRL_IHfcg.

(56) References Cited

OTHER PUBLICATIONS

Flashforge 3D Printer, Flashforge Adventurer 3C FDM 3D Printer, page parent https://www.flashforgeshop.com/ was cached Nov. 8, 2019, 8 pages.
*Formlabs* v. *DWS*. Civil Action filed on Jun. 29, 2018 in the United States Court for the Eastern District of Virginia. Case No. 1:18-cv-00810-CMH-IDD. 13 pages.
Gaudin, Sharon. Researcher works to make 3D-printed metals stronger, customizable. Oct. 2014. Accessed online on Mar. 22, 2018. 4 pages. URL:<https://www.computerworld.com/article/2838780/researcher-works-to-make-3d-printed-materials-stronger-customizable.html>.
GE Additive, Concept Laser M2 Series 5, According to the wayback machine, this page was first crawled May 29, 2020; the related press release was on Nov. 19, 2019: https://www.ge.com/additive/press-releases/ge-additive-unveils-new-concept-laser-m2-series-5; https://www.ge.com/additive/additive-manufacturing/machines/m2series5.
Geiger, et al. The Mechanisms of Laser Forming. Annals of the CIRP, vol. 42, Jan. 1993, pp. 301-304.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Gibson, etal. Additive Manufacturing Technologies, Springer 2010, Chapter 5, pp. 103-142. ISBN978-1-4419-1119-3 (Print978-1-4419-1120-9 (Online). Published: Dec. 14, 2009.
Glowforge, Glowforge 3D Laser Printer, Google shows that this sub-page was first cached May 15, 2019, https://glowforge.com/products, 9 pages.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Gu et al. Laser Additive manufacturing of metallic components: materials, processes and mechanisms. International Materials Reviews 57(3):133-164 (2012).
Hauser, et al. Further Developments in Process Mapping and modelling in direct metal selective laser melting. Aug. 2004, 15th solid Free Form Fabrication Proceedings. Austin, Texas, pp. 448-459.
Hu et al. Experimental and numerical modeling of buckling instability of laser sheet forming. International Journal of Machine Tools & Manufacture, 42, Oct. 2002, pp. 1427-1439.
Hu, et al. Computer simulation and experimental investigation of sheet metal bending using laser beam scanning. International Journal of Machine Tools and Manufacture, 41, Mar. 2001, pp. 589-607.
Hussein. The development of Lightweight Cellular Structures for Metal Additive Manufacturing. Nov. 2013, thesis of University of Exeter, pp. 1-228.
integrativemodeling.org. IMP, the Integrative Modeling Platform. Web. Published Jul. 26, 2013.1 page. URL:<https://integrativemodeling.org/>.
International search report and written opinion dated Sep. 20, 2016 for PCT/US2016/034454. 12 pages.
International search report and written opinion dated Apr. 11, 2016 for PCT/US2015/065297. 17 pages.
International Search Report and Written Opinion dated Apr. 5, 2017 for International PCT Patent Application No. PCT/US2016/066000. 11 pages.
International Search Report and Written Opinion dated Aug. 30, 2017 for International PCT Patent Application No. PCT/US2017/039422. 164 pages.
International Search Report and Written Opinion dated Feb. 12, 2018 for International PCT Patent Application No. PCT/US2017/057340. 25 pages.
International Search Report and Written Opinion dated Feb. 14, 2017 for International PCT Patent Application No. PCT/US2016/042818. 14 pages.
International Search Report and Written Opinion dated Feb. 19, 2016 for International PCT Patent Application No. PCT/US2015/059790. 11 pages.
International search report and written opinion dated Feb. 19, 2016 for PCT/US2015/059790. 11 pages.
International Search Report and Written Opinion dated Jan. 16, 2017 for International PCT Patent Application No. PCT/US2016/059781. 12 pages.
International Search Report and Written Opinion dated Jan. 9, 2018 for International PCT Patent Application No. PCT/2017/054043. 14 pages.
International Search Report and Written Opinion dated May 18, 2017 for International PCT Patent Application No. PCT/US2017/018191. 17 pages.
International Search Report and Written Opinion dated Oct. 18, 2016 for International PCT Patent Application No. PCT/US2016/041895. 9 pages.
International search report and written opinion dated Oct. 30, 2015 for PCT Application No. US2015/036802. 19 pages.
International search report and written opinion dated Sep. 13, 2016 for PCT Application No. US-2016034857. 13 pages.
International search report and written opinion dated Sep. 19, 2016 for PCT Application No. PCT/US2016/034857. 13 pages.
International Search Report and Written Opinion dated Sep. 20, 2016 for International PCT Patent Application No. PCT/US2016/034454. 12 pages.
International Search Report and Written Opinion issued in App. No. PCT/US2022/052322, mailing date Apr. 14, 2023, 10 pages.
International Search Report issued in App. No. PCT/US2022/051107, mailing date Apr. 7, 2023, 13 pages.
International Search Report issued in App. No. PCT/US2022/051736, mailing date Apr. 10, 2023, 8 pages.
Office action dated Jun. 29, 2016 for U.S. Appl. No. 14/744,859. 16 pages.
Office action dated Mar. 10, 2016 for U.S. Appl. No. 14/744,675. 15 pages.
Office Action dated Mar. 23, 2017 for U.S. Appl. No. 15/399,186. 15 pages.
Office action dated Mar. 4, 2016 for U.S. Appl. No. 14/744,988. 18 pages.
Office Action dated Mar. 6, 2017 for U.S. Appl. No. 14/744,910. 12 pages.
Office Action dated Mar. 7, 2018 for U.S. Appl. No. 15/399,186. 32 pages.
Office action dated Nov. 12, 2015 for U.S. Appl. No. 14/745,108. 16 pages.
Office Action dated Nov. 16, 2017 for U.S. Appl. No. 15/634,267. 10 pages.
Office action dated Nov. 18, 2016 for U.S. Appl. No. 15/188,939. 15 pages.
Office Action dated Nov. 27, 2017 for U.S. Appl. No. 15/374,318. 10 pages.
Office Action dated Oct. 19, 2017 for U.S. Appl. No. 15/399,186. 19 pages.
Office action dated Oct. 2, 2015 for U.S. Appl. No. 14/744,955. 7 pages.
Office action dated Sep. 10, 2015 for U.S. Appl. No. 14/744,675. 17 pages.
Office Action dated Sep. 11, 2017 for U.S. Appl. No. 15/374,821. 12 pages.
Office action dated Sep. 13, 2016 for U.S. Appl. No. 15/188,939. 8 pages.
Office Action dated Sep. 15, 2017 for U.S. Appl. No. 15/374,616. 24 pages.
Office Action dated Sep. 18, 2017 for U.S. Appl. No. 15/634,228. 17 pages.
Optomec. Lens 850R 3D Printer for Structual Metals. Optomec. YouTube—Web. Published on Jun. 3, 2012. 3 pages. URL:< https://www.youtube.com/watch?v=mkUVURLkxS4>.

(56) References Cited

OTHER PUBLICATIONS

Papadakis, et al. Numerical computation of component shape distortion manufactured by selective laser melting. Procedia CIRP. Aug. 2014; 18:90-95.
PCT/US2017/060035 International Search Report and Written Opinion dated Jul. 20, 2018. 13 pages.
PCT/US2017/064474 International Search Report and Written Opinion dated Apr. 30, 2018. 14 pages.
PCT/US2018/012250 International Search Report and Written Opinion dated Apr. 30, 2018. 15 pages.
PCT/US2018/020406 International Search Report and Written Opinion dated Jun. 28, 2018. 12 pages.
PCT/US2018/024667 International Search Report and Written Opinion dated Jul. 17, 2018. 14 pages.
PCT/US2019/014635 International Search Report and Written Opinion dated May 13, 2019. 13 pages.
PCT/US2019/024402 International Search Report and Written Opinion dated Aug. 6, 2019. 11 pages.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
Proto Labs. Direct Metal Laser Sintering (DMLS). Published Sep. 10, 2014. https://www.protolabs.com/additive-manufacturing/direct-metal-laser-sintering, 2 pages.
Renishaw, "RenAM 500 metal additive manufacturing (3D printing) systems", Google shows that it was first cached Nov. 17, 2021, https://www.renishaw.com/en/renam-500-metal-additive-manufacturing-3d-printing-systems-37011, 9 pages.
Rhinehart, R.R. §2.13 Control Theory: Mode-Based Control, in Bela G. Liptak, Instrument Engineers' Handbook, vol. 2: Process Control and Optimization, 209-213. CRC Press; 4 editior (Sep. 29, 2005). ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM _2014_Riecker_3D%20Multi-Material_Metal_Printing_of_Delicate_Structures_EPMA.pdf (accessed on Jun. 29, 2015). 6 pages.
RP Photonics Consulting GmbH. Definition of "Optical Intensity". Encyclopedia of Laser Physics and Technology. Jun. 2012. 3 pages. URL:<https://www.rp-photonics.com/optical_intensity.html>.
Ryan et al. Fabrication methods of porous metals for use in orthopaedic applications. Biomaterials. May 2006; vol. 27, Issue 13, pp. 2651-2670.
Salvati et al. An Investigation of Residual Stress Gradient Effects in FIB-DIC Micro-Ring-Core Analysis. Proceedings of the International MultiConference of Engineers and Computer Scientists 2015 Vol II, IMECS 2015, Hong Kong, Mar. 18-20, 2015. 4 pages.
Sandvik Materials Technology website. Accessed Nov. 14, 2014. http://www.smt.sandvik.com/en/products/metal-powder/additive-manufacturing/. 2 pages.
Saunders, Marc. Real-time AM monitoring opens up new process control opportunities. Web: LinkedIn. Published on Jan. 3, 2018. 12 pages. URL:< https://www.linkedin.com/pulse/real-time-am-monitoring-opens-new-process-control-marc-saunders/>.
Schott. TIE-19: Temperature Coefficient of the Refractive Index. Technical Information: Advanced Optics. Schott AG. Jul. 2016. 10 pages.
Schott. TIE-19: Temperature Coefficient of the Refractive Index. Technical Information: Advanced Optics. Schott North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Shen et al. An analytical model for estimating deformation in laser forming. Computational Materials Science, 37, Oct. 2006, pp. 593-598.
Shen et al. Modelling of laser forming—An review. Computational Materials Science 46, Oct. 2009, pp. 834-840.
SLM Solutions GmbH, Operating Manual, Selective Laser Melting System, SLM 125, 2015.
SLM Solutions, Bugatti Chiron Titanium brake caliper 3D printed on SLM Solutions—YouTube, published Feb. 8, 2018, URL: https://www.youtube.com/watch?v=SRA5CFLYkUQ.
SLM Solutions, NXG XII 600 Digital Launch—YouTube, published Mar. 11, 2021, URL: https://www.youtube.com/watch?v=cPckZZTO1fc.
SLM Solutions, NXG XII 600 Digital Launch—YouTube, published Jun. 23, 2021, URL: https://freefloat.slm-solutions.com/.
IUPAC. "Inert gas". IUPAC Compendium of Chemical Terminology. Published Feb. 24, 2014.< http://goldbook.iupac.Org/html/l/l03027.html. 1 page.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.
Kant et al. An integrated FEM-ANN model for laser bending process with inverse estimation of absorptivity. Mechanics of Advanced Materials and Modern Processes. Dec. 2015, vol. 1, No. 6, 12 pages.
Kopeliovich, Dmitri. Electropolishing. SubsTech: Substances & Technologies. Web Article. Dec. 14, 2013. Printed Jan. 13, 2019. 5 pages. URL:< http://www.substech.com/dokuwiki/doku.php?id=electropolishing.
Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1) 7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Development of an electrophotographic-based layered manufacturing test bed. Project proposal. Department of Mechanical Engineering, University of Florida. 2009. http://www.cis.rit.edu/micrograants/2008/Esterman_proposal.pdf (accessed on Jun. 29, 2015). 4 pages.
Kumar. Powder deposition and sintering for a two-powder approach to solid freeform fabrication. Department of Mechanical Engineering, University of Florida. Aug. 1998; 169-173.
Laser Engineered Net Shaping (Lens) 850-R system overview. System features and example application video clips. Published Jun. 3, 2012. https://www.youtube.com/watch?v=mkUVURLkxS4. 2 pages.
Leirvag. Additive Manufacturing for Large Products. Feb. 2013, thesis. Norwegian University of Science and Technology. 76 pages.

(56) References Cited

OTHER PUBLICATIONS

Lore Thijs et al., "Fine-structured aluminium products with controllable texture by selective laser melting of pre-alloyed AlSi10Mg powder", Acta Materialia 61, 2013, 1809-1819.
Lu et al. Chapter 6: Metal-Based System via Laser Melting. Laser-Induced Materials and Processes for Rapid Prototyping. Kluwer Acad. Publ., USA, pp. 143-186 (2001).
Lyckfeldt. Powder rheology of steel powders for additive manufacturing. Swerea IVF. Oct. 24, 2013. 1 page.
Maji et al. Finite Element Analysis and Experimental Investigations on Laser Bending of AlSi304 Stainless Steel Sheet. Procedia Engineering 64, Dec. 2013, pp. 528-535.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE2014, Jul. 2-4, 2014, London, U.K. 6 pages.
Meiners, Dissertation, Direct selective laser sintering of one-component metallic materials, 1999. 266 pages.
Merriam-Webster. Definition of "reservoir". Retrieved Dec. 21, 2017. 13 pages. URL:<https://merriam-webster.com/dictionary/reservoir>.?
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):369-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Netfabb—Professional 5.2, User Manual, Netfabb GmbH 2014, Version: Jul. 29, 2014, Chapter 6: sections 6.1, 6.3, Chapter 7: section 7.7, Chapter 9: section 9.6. 237 pages.
Notice of Allowability dated Oct. 17, 2017 for U.S. Appl. No. 14/744,910. 6 pages.
Notice of Allowance (second) dated Apr. 6, 2017 for U.S. Appl. No. 15/339,759. 4 pages.
Notice of Allowance dated Jan. 12, 2018 for U.S. Appl. No. 15/435,128. 5 pages.
Notice of Allowance dated Feb. 6, 2018 for U.S. Appl. No. 15/374,821. 5 pages.
Notice of Allowance dated Feb. 16, 2018 for U.S. Appl. No. 15/435,120. 10 pages.
Notice of Allowance dated Feb. 28, 2018 for U.S. Appl. No. 15/374,821. 11 pages.
Notice of Allowance dated Mar. 16, 2017 for U.S. Appl. No. 15/339,775. 47 pages.
Notice of Allowance dated Mar. 20, 2017 for U.S. Appl. No. 15/339,759. 47 pages.
Notice of allowance dated May 25, 2016 for U.S. Appl. No. 14/744,675. 8 pages.
Notice of Allowance dated Aug. 7, 2017 for U.S. Appl. No. 14/744,910. 21 pages.
Notice of allowance dated Aug. 10, 2016 for U.S. Appl. No. 14/967,118. 6 pages.
Co-pending U.S. Appl. No. 16/719,679, inventors Buller; Benyamin et al., filed Dec. 18, 2019. 212 pages.
Co-pending U.S. Appl. No. 16/749,430, inventors Milshtein; Erel et al., filed Jan. 22, 2020. 226 pages.
Co-pending U.S. Appl. No. 16/749,899, filed Jan. 22, 2020. 46 pages.
Co-pending U.S. Appl. No. 16/783,490, inventors Buller; Benyamin et al., filed Feb. 6, 2020. 212 pages.
Co-pending U.S. Appl. No. 16/789,905, inventors Buller; Benyamin et al., filed Feb. 13, 2020. 160 pages.
Co-pending U.S. Appl. No. 16/790,129, inventors Romano; Richard Joseph et al., filed Feb. 13, 2020. 220 pages.
Co-pending U.S. Appl. No. 16/793,257, inventor Buller; Benyamin, filed Feb. 18, 2020. 158 pages.
Co-pending U.S. Appl. No. 16/820,459, inventors Buller; Benyamin et al., filed Mar. 16, 2020. 221 pages.
Co-pending U.S. Appl. No. 16/825,696, inventors Lappas; Tasso et al., filed Mar. 20, 2020. 166 pages.
Co-pending U.S. Appl. No. 16/841,161, inventors Buller; Benyamin et al., filed Apr. 6, 2020. 231 pages.
Co-pending U.S. Appl. No. 16/843,725, inventors Buller; Benyamin et al., filed Apr. 8, 2020. 221 pages.
Co-pending U.S. Appl. No. 16/846,058, inventors Buller; Benyamin et al., filed Apr. 10, 2020. 211 pages.
Co-pending U.S. Appl. No. 16/857,453, inventors Buller; Benyamin et al., filed Apr. 24, 2020. 210 pages.
Co-pending U.S. Appl. No. 16/866,949, inventors Milshtein; Erel et al., filed May 5, 2020. 227 pages.
Co-pending U.S. Appl. No. 16/872,646, inventors Buller; Benyamin et al., filed May 12, 2020. 46 pages.
Co-pending U.S. Appl. No. 16/872,714, inventors Buller; Benyamin et al., filed May 12, 2020. 196 pages.
Co-pending U.S. Appl. No. 16/876,608, filed May 18, 2020. 155 pages.
Co-pending U.S. Appl. No. 16/877,029, filed May 18, 2020. 213 pages.
Co-pending U.S. Appl. No. 16/883,262, inventors Buller; Benyamin et al., filed May 26, 2020. 160 pages.
Co-pending U.S. Appl. No. 16/890,895, inventor Buller; Benyamin, filed Jun. 2, 2020. 158 pages.
Co-pending U.S. Appl. No. 16/917,927, inventors Buller; Benyamin et al., filed Jul. 1, 2020. 222 pages.
Co-pending U.S. Appl. No. 16/917,933, filed Jul. 1, 2020. 166 pages.
Co-pending U.S. Appl. No. 16/917,937, inventors Buller; Benyamin et al., filed Jul. 1, 2020. 210 pages.
Co-pending U.S. Appl. No. 16/933,188, inventors Christiansen; Daniel et al., filed Jul. 20, 2020. 202 pages.
Co-pending U.S. Appl. No. 16/939,847, inventors Buller; Benyamin et al., filed Jul. 27, 2020. 148 pages.
Co-pending U.S. Appl. No. 17/009,608, inventors Buller; Benyamin et al., filed Sep. 1, 2020. 155 pages.
Co-pending U.S. Appl. No. 17/011,950, inventors Buller; Benyamin et al., filed Sep. 3, 2020. 160 pages.
Co-pending U.S. Appl. No. 17/020,714, filed Sep. 14, 2020. 47 pages.
Co-pending U.S. Appl. No. 17/022,334, filed Sep. 16, 2020. 161 pages.
Co-pending U.S. Appl. No. 29/653,429, inventors Coulier; Pieter et al., filed Jun. 14, 2018. 63 pages.
Co-pending U.S. Appl. No. 16/253.103, filed Jan. 21, 2019. 10 pages.
Co-pending U.S. Appl. No. 16/578.190, filed Sep. 20, 2019.
Co-pending U.S. Appl. No. 16/590,868, filed Oct. 2, 2019.
Co-pending U.S. Appl. No. 16/716,414, filed Dec. 16, 2019.
Co-pending U.S. Appl. No. 16/749,430, filed Jan. 22, 2020.
Co-pending U.S. Appl. No. 16/749,899, filed Jan. 22, 2020.
Co-pending U.S. Appl. No. 16/790,129, filed Feb. 13, 2020.
Co-pending U.S. Appl. No. 16/843,725, filed Apr. 8, 2020. 10 pages.
Co-pending U.S. Appl. No. 16/857,453, filed Apr. 24, 2020. 10 pages.
Co-pending U.S. Appl. No. 16/872,646, filed May 12, 2020. 9 pages.
Co-pending U.S. Appl. No. 16/917,927, filed Jul. 1, 2020. 10 pages.
Co-pending U.S. Appl. No. 17/020,714, filed Sep. 14, 2020. 8 pages.
Co-pending U.S. Appl. No. 15/435,110, filed Feb. 16, 2017.
Co-pending U.S. Appl. No. 15/435,120, filed Feb. 16, 2017.
Co-pending U.S. Appl. No. 15/435,128, filed Feb. 16, 2017.
Craeghs, et al. Feedback control of layerwise laser melting using optical sensors. Physics Procedia. Dec. 2010; 5:505-514.

(56) References Cited

OTHER PUBLICATIONS

Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.

Dahotre et al. Laser Fabrication and Machining of Materials. Springer; 2008 edition (Nov. 26, 2007).561 pages. DOI: 10.1007/978-0-387-72344-0.

Das et al. Producing metal parts with selective laser sintering/hot isostatic pressing. JOM; Dec. 1998, vol. 50, Issue 12, pp. 17-20.

David et al. Welding: Solidification and microstructure. The Journal of the Minerals, Metals & Materials Society (TMS). Jun. 2003, vol. 55, Issue 6, pp. 14-20.

“Active”, definition by the Merriam-Webster dictionary at https://www.merriam-webster.com/dictionary/active published Nov. 3, 2017. 9 pages.

“Passive”, definition by the Merriam-Webster dictionary at https://www.merriam-webster.com/dictionary/passive?pronunciation&lang=en_us&dir=p&file=passiv03 first viewed Aug. 16, 2022. 9 pages.

3D Systems, 3D Printers, Google shows that this page was cached on Jun. 23, 2013, https://www.3dsystems.com/3d-printers, 5 pages.

3D Systems, DMP Factory 350 and DMP Factory 350 Dual, Google shows that this page was cached on Nov. 13, 2018, https://www.3dsystems.com/3d-printers/dmp-factory-350, 13 pages.

Adam, et al. Design for additive manufacturing—element transitions and aggregated structures. CIRP Journal of Manufacturing Science and Technology. Nov. 2014; 7:20-28.

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

Anusci, Victor. Aerosint Is Developing the First Commercial Multipowder SLS 3d Printer. 3D Printing Media Network. Web. Published Jan. 28, 2018. 4 pages. URL: <https://www.3dprintingmedia.network/aerosint-multi-powder-SLS-3d-printer/>.

Arcam AB (Arcm.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR KR6uaOGOMlyJ1mpCKh3 42il_1.

Arnet et al. Extending Laser Bending for the Generation of Convex Shapes. Proc. Instn. Mech. Engrs., vol. 209, Dec. 1, 1995, pp. 433-442.

Ashby, Mike. Teach Yourself: Phase Diagrams and Phase Transformations. 5th Edition, Mar. 2009, Cambridge. 55 pages.

Barriobero-Vila et al. Inducing Stable a + p Microstructures during Selective Laser Melting of Ti—6Al—4V Using Intensified Intrinsic Heat Treatments. Materials (Basel). vol. 10, No. 3, Mar. 2017, 14 pages.

Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.

Bohnet, M. Advances in the Design of Pneumatic Conveyors. International Chemical Engineering, vol. 25, No. 3, Jul. 1985, pp. 387-405.

Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.

Bremen et al. Selective Laser Melting. Laser Technik Journal 9(2); Apr. 2012. 6 pages.

Calvert, Jack G. Glossary of Atmospheric Chemistry Terms (Recommendations 1990). Pure &Appl. Chem., vol. 62, No. 11, Jan. 1, 1990, pp. 2167-2219.

Cheng, et al. Thermal Stresses Associated with Part Overhang Geometry in Electron Beam Additive Manufacturing: Process Parameter Effects. 25th Annual International Solid Freeform Fabrication Symposium-An Additive Manufacturing Conference, Austin, TX, USA. Aug. 4-6, 2014. 1076-1087.

Childs, et al. Raster scan of selective laser melting of the surface layer of a tool steel powder bed. Proc. IMechE. Jan. 26, 2005; vol. 219, Part B, pp. 379-384.

Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.

Chivel, et al. On-line temperature monitoring in selective laser sintering/melting. Physics Procedia. Dec. 31, 2010; (5):515-521.

Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.

Co-pending International PCT Patent Application No. PCT/US17/39422, filed Jun. 27, 2017. 3 pages.

Co-pending PCT patent application No. PCT/US2019/024402, filed on Mar. 27, 2019.

Co-pending U.S. Appl. No. 14/967,118, filed Dec. 11, 2015. 7 pages.

Co-pending U.S. Appl. No. 15/085,884, filed Mar. 30, 2016. 9 pages.

Co-pending U.S. Appl. No. 15/188,885, filed Jun. 21, 2016. 10 pages.

Co-pending U.S. Appl. No. 15/188,939, filed Jun. 21, 2016. 9 pages.

Co-pending U.S. Appl. No. 15/288,251, filed Oct. 7, 2016. 9 pages.

Co-pending U.S. Appl. No. 15/339,712, filed Oct. 31, 2016. 19 pages.

Co-pending U.S. Appl. No. 15/339,759, filed Oct. 31, 2016. 150 pages.

Co-pending U.S. Appl. No. 15/339,775, filed Oct. 31, 2016. 148 pages.

Co-pending U.S. Appl. No. 15/374,318, filed Dec. 9, 2016. 188 pages.

Co-pending U.S. Appl. No. 15/374,442, filed Dec. 9, 2016. 189 pages.

Co-pending U.S. Appl. No. 15/374,535, filed Dec. 9, 2016. 189 pages.

Co-pending U.S. Appl. No. 15/374,616, filed Dec. 9, 2016. 188 pages.

Co-pending U.S. Appl. No. 15/374,821, filed Dec. 9, 2016. 30 pages.

Co-pending U.S. Appl. No. 15/399,186, filed Jan. 5, 2017. 214 pages.

Co-pending U.S. Appl. No. 15/435,065, filed Feb. 16, 2017. 223 pages.

Co-pending U.S. Appl. No. 15/435,078, filed Feb. 16, 2017. 224 pages.

Co-pending U.S. Appl. No. 15/435,090, filed Feb. 16, 2017. 223 pages.

Co-pending U.S. Appl. No. 15/435,110, filed Feb. 16, 2017. 223 pages.

Co-pending U.S. Appl. No. 15/435,120, filed Feb. 16, 2017. 222 pages.

Co-pending U.S. Appl. No. 15/435,128, filed Feb. 16, 2017. 223 pages.

Co-pending U.S. Appl. No. 15/436,558, filed Feb. 17, 2017. 212 pages.

Co-pending U.S. Appl. No. 15/490,219, filed Apr. 18, 2017. 10 pages.

Co-pending U.S. Appl. No. 15/614,979, filed Jun. 6, 2017. 8 pages.

Co-pending U.S. Appl. No. 15/615,004, filed Jun. 6, 2017. 8 pages.

Co-pending U.S. Appl. No. 15/615,029, filed Jun. 6, 2017.

Co-pending U.S. Appl. No. 15/634,228, filed Jun. 27, 2017.

U.S. Appl. No. 15/909,406 Notice of Allowance dated Apr. 4, 2019.

U.S. Appl. No. 15/909,826 Notice of Allowance dated Aug. 30, 2018.

(56) References Cited

OTHER PUBLICATIONS

U.S. Appl. No. 15/937,778 Office Action dated Sep. 21, 2018.
U.S. Appl. No. 15/937,812 Office Action dated Feb. 7, 2019.
U.S. Appl. No. 16/025,915 Office Action dated Nov. 2, 2020.
U.S. Appl. No. 16/030,795 Office Action dated Dec. 21, 2020.
U.S. Serial No. 16/245,183 Office Action dated Jan. 6, 2021.
U.S. Appl. No. 16/404,579 Office Action dated Oct. 16, 2020.
U.S. Appl. No. 29/653,429 Office Action dated Oct. 7, 2020.
U.S. Appl. No. 15/374,616 Notice of Allowance dated Apr. 2, 2019.
U.S. Appl. No. 15/615,029 Office Action dated Apr. 30, 2020.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484, DOI 10.1007/s00170-012-4271-4. Published online: Jun. 16, 2012.
Wilkes, et al. Emerald Artide: Additive manufacturing of Zr02—Al203 ceramic components by selective laser melting. Rapid Prototyping Journal, vol. 19, Issue 1, Aug. 7, 2012. 13 pages.
Wohlfart, Michael. Can you Build a 100 mm Support-free Horizontal Disk? Linkedin. Web article. Published Mar. 11, 2019. 14 pages. URL: https://www.linkedin.com/pulse/can-you-build-100-mm-support-free-horizontal-disk-michael-wohlfart/>.
Wright, Roger. Wire Technology, Process Engineering and Metallurgry, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008.10 pages.
Xu et al. In situ tailoring microstructure in additively manufactured Ti—6Al—4V for superior mechanical performance. Acta Materialia. vol. 125, Feb. 15, 2017, pp. 390-400.
Yin. Accurately quantifying process-relevant powder properties for AMPM applications. Freeman Technology. May 2014. 39 pages.
SLM Solutions, NXG XII 600, publication date Oct. 15, 2020, URL: https://www.slm-pushing-the-limits.com/.
SLM Solutions, SLM 280 2.0, Google shows that it was first cached Nov. 14, 2016, https://www.slm-solutions.com/products-and-solutions/machines/slm-280/, 7 pages.
SLM®—Selective Laser Melting Technology—The Elements (english)—YouTube, published Nov. 23, 2017, URL: https://www.youtube.com/watch?v=R5WCyafMPLs.
Spears, et al. In-process sensing in selective laser melting (SLM) additive manufacturing. Integrating Materials and Manufacturing Innovation. Feb. 11, 2016; 5:2. DOI: 10.1186/S40192-016-0045-4. 25 pages.
Strano, et al. A new approach to the design and optimisation of support structures in additive manufacturing. Int J Adv Manuf Technol (2013) 66:1247-1254, DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Symeonidis, Kimon. The Controlled Diffusion Solidification Process: Fundamentals and Principles. Ph.D. Thesis. Worcester Polytechnic Institute. Apr. 2009. 137 pages.
Third Party Observations concerning the International Application PCT/US2020/042596, published as WO 2021/021469, dated Nov. 19, 2021. 20 pages.
Third Party Observations concerning the International Application PCT/US2021/035350, published as WO 2021/247640, dated Dec. 8, 2022. 6 pages.
Thomas Niendorf et al., "Functionally Graded Alloys Obtained by Additive Manufacturing", Advanced Engineering Materials 2014, 16, No. 7, 5 pages.
Thomas Niendorf et al., "Highly Anisotropic Steel Processed by Selective Laser Melting", Metallurgical and Materials Transactions, vol. 44B, Aug. 2013, 5 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id=7794>.
U.S. Appl. No. 15/803,686 Notice of Allowance dated Jan. 23, 2020.
U.S. Appl. No. 15/861,544 Notice of Allowance dated Feb. 4, 2020.
U.S. Appl. No. 15/873,832 Office Action dated Jun. 12, 2020.
U.S. Appl. No. 16/195,810 Notice of Allowance dated Apr. 8, 2020.
U.S. Appl. No. 16/195,810 Notice of Allowance dated May 11, 2020.
U.S. Appl. No. 14/744,675, filed Jun. 19, 2015, Buller et al.
U.S. Appl. No. 14/744,859, filed Jun. 19, 2015 Buller et al.
U.S. Appl. No. 14/744,910, filed Jun. 19, 2015 Buller et al.
U.S. Appl. No. 14/744,955, filed Jun. 19, 2015 Buller et al.
U.S. Appl. No. 14/744,988, filed Jun. 19, 2015 Buller et al.
U.S. Appl. No. 14/745,032, filed Jun. 19, 2015 Buller et al.
U.S. Appl. No. 14/745,081, filed Jun. 19, 2015 Buller et al.
U.S. Appl. No. 14/745,108, filed Jun. 19, 2015 Buller et al.
U.S. Appl. No. 15/188,885 Notice of Allowance dated Jul. 29, 2019.
U.S. Appl. No. 15/188,885 Office Action dated Apr. 9, 2019.
U.S. Appl. No. 15/339,712 Notice of Allowance dated Jul. 10, 2018.
U.S. Appl. No. 15/339,712 Notice of Allowance dated May 23, 2018.
U.S. Appl. No. 15/339,712 Office Action dated Jan. 10, 2018.
U.S. Appl. No. 15/374,442 Office Action dated May 21, 2018.
U.S. Appl. No. 15/374,535 Office Action dated Apr. 20, 2018.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/374,616 Office Action dated Aug. 15, 2018.
U.S. Appl. No. 15/374,616 Office Action dated Mar. 26, 2018.
U.S. Appl. No. 15/374,821 Notice of Allowance dated Apr. 4, 2018.
U.S. Appl. No. 15/399,186 Notice of Allowance dated Dec. 20, 2018.
U.S. Appl. No. 15/399,186 Notice of Allowance dated Sep. 17, 2018.
U.S. Appl. No. 15/435,078 Notice of Allowance dated Aug. 21, 2019.
U.S. Appl. No. 15/435,078 Notice of Allowance dated Jul. 10, 2019.
U.S. Appl. No. 15/435,078 Notice of Allowance dated May 20, 2019.
U.S. Appl. No. 15/435,078 Office Action dated Aug. 16, 2018.
U.S. Appl. No. 15/435,078 Office Action dated Jan. 10, 2019.
U.S. Appl. No. 15/435,090 Office Action dated May 18, 2018.
U.S. Appl. No. 15/435,110 Notice of Allowance dated Dec. 20, 2018.
U.S. Appl. No. 15/436,558 Notice of Allowance dated Aug. 21, 2019.
U.S. Appl. No. 15/436,558 Office Action dated May 23, 2019.
U.S. Appl. No. 15/479,531 Office Action dated Jan. 9, 2019.
U.S. Appl. No. 15/490,219 Notice of Allowance dated Apr. 10, 2019.
U.S. Appl. No. 15/523,524 Office Action dated Jun. 7, 2019.
U.S. Appl. No. 15/614,979 Office Action dated Nov. 5, 2018.
U.S. Appl. No. 15/615,004 Office Action dated Jun. 8, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,228 Office Action dated Jun. 14, 2018.
U.S. Appl. No. 15/634,267 Notice of Allowance dated Dec. 28, 2018.
U.S. Appl. No. 15/634,666 Office Action dated Oct. 18, 2018.
U.S. Appl. No. 15/634,727 Notice of Allowance dated Feb. 7, 2019.
U.S. Appl. No. 15/634,727 Office Action dated May 25, 2018.
U.S. Appl. No. 15/719,084 Office Action dated Feb. 8, 2019.
U.S. Appl. No. 15/719,084 Office Action dated Jul. 12, 2018.
U.S. Appl. No. 15/719,133 Office Action dated Sep. 24, 2018.
U.S. Appl. No. 15/719,229 Office Action dated May 16, 2019.

(56) References Cited

OTHER PUBLICATIONS

U.S. Appl. No. 15/719,229 Office Action dated Oct. 5, 2018.
U.S. Appl. No. 15/788,418 Office Action dated Jul. 8, 2019.
U.S. Appl. No. 15/788,495 Office Action dated Oct. 3, 2018.
U.S. Appl. No. 15/803,683 Office Action dated Jun. 19, 2019.
U.S. Appl. No. 15/803,686 Notice of Allowance dated Feb. 19, 2019.
U.S. Appl. No. 15/803,686 Office Action dated Sep. 19, 2018.
U.S. Appl. No. 15/830,470 Office Action dated Jul. 5, 2018.
U.S. Appl. No. 15/853,700 Office Action dated Apr. 6, 2018.
U.S. Appl. No. 15/853,700 Office Action dated Sep. 11, 2018.
U.S. Appl. No. 15/855,744 Notice of Allowance dated Feb. 15, 2019.
U.S. Appl. No. 15/855,744 Office Action dated Nov. 19, 2018.
U.S. Appl. No. 15/861,544 Office Action dated Feb. 15, 2019.
U.S. Appl. No. 15/861,544 Office Action dated Jul. 11, 2019.
U.S. Appl. No. 15/861,548 Office Action dated Sep. 6, 2018.
U.S. Appl. No. 15/861,553 Office Action dated Aug. 7, 2018.
U.S. Appl. No. 15/861,553 Office Action dated Dec. 14, 2018.
U.S. Appl. No. 15/870,561 Office Action dated Jun. 15, 2018.
U.S. Appl. No. 15/870,561 Office Action dated Nov. 19, 2018.
U.S. Appl. No. 15/871,763 Notice of Allowance dated Aug. 15, 2018.
U.S. Appl. No. 15/871,763 Office Action dated Apr. 19, 2018.
U.S. Appl. No. 15/886,544 Office Action dated Aug. 27, 2018.
U.S. Appl. No. 15/893,523 Notice of Allowance dated May 7, 2018.
U.S. Appl. No. 15/909,388 Office Action dated Dec. 14, 2018.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,406 Notice of Allowance dated May 6, 2019.
U.S. Appl. No. 15/909,406 Office Action dated Aug. 27, 2018.
U.S. Appl. No. 15/909,784 Notice of Allowance dated Jun. 27, 2019.
U.S. Appl. No. 15/909,784 Notice of Allowance dated Mar. 27, 2019.
U.S. Appl. No. 15/909,784 Office Action dated Jan. 18, 2019.

* cited by examiner

MATERIAL MANIPULATION IN THREE-DIMENSIONAL PRINTING

RELATED APPLICATIONS

This application is a continuation application of U.S. Patent Application Ser. No. 63/034,002 filed Jun. 3, 2020; and of International Patent Application Serial No. PCT/US21/35350 filed Jun. 2, 2021; each of which is entirely incorporated herein by reference.

BACKGROUND

Three-dimensional (3D) printing (e.g., additive manufacturing) is a process for making a three-dimensional object of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of another. This process may be controlled (e.g., computer controlled, manually controlled, or both). A 3D printer can be an industrial robot.

3D printing can generate custom parts. A variety of materials can be used in a 3D printing process including elemental metal, metal alloy, ceramic, elemental carbon, or polymeric material. In some 3D printing processes (e.g., additive manufacturing), a first layer of hardened material is formed (e.g., by welding powder), and thereafter successive layers of hardened material are added one by one, wherein each new layer of hardened material is added on a pre-formed layer of hardened material, until the entire designed three-dimensional structure (3D object) is layer-wise materialized.

3D models may be created with a computer aided design package, via 3D scanner, or manually. The manual modeling process of preparing geometric data for 3D computer graphics may be similar to plastic arts, such as sculpting or animating. 3D scanning is a process of analyzing and collecting digital data on the shape and appearance of a real object (e.g., real-life object). Based on this data, 3D models of the scanned object can be produced.

A number of 3D printing processes are currently available. They may differ in the manner layers are deposited to create the materialized 3D structure (e.g., hardened 3D structure). They may vary in the material or materials that are used to materialize the designed 3D object. Some methods melt, sinter, or soften material to produce the layers that form the 3D object. Examples for 3D printing methods include selective laser melting (SLM), selective laser sintering (SLS), direct metal laser sintering (DMLS) or fused deposition modeling (FDM). Other methods cure liquid materials using different technologies such as stereo lithography (SLA). In the method of laminated object manufacturing (LOM), thin layers (made inter alia of paper, polymer, or metal) are cut to shape and joined together.

At times, forming parts from reactive materials (e.g. metals such as titanium, aluminum, copper or magnesium), may generate debris (e.g., soot). The debris may comprise micro-particles or nano-particles. The debris may be captured in a filter. The filter may experience accumulation of debris having non-continuous oxide surface (e.g., skin) coverage and/or thickness, which debris may comprise (e.g., micro and/or nano sized) particles high surface area. Such uneven and/or discontinuous oxidation of the debris may form incomplete passivation of the debris, which may (e.g., violently) react with oxygen and/or water. Such reactivity may elevate to a hazardous level (e.g., and may become a safety concern). The debris may be a byproduct of the 3D printing and may be formed from a starting material for the 3D printing. A practice of drenching a filled filter with water, may potentially create a runaway thermal exothermic reaction. During machine operation it may be possible for oxygen and/or water to be introduced into the filter, which may produce an (e.g., undesirable) exothermic reaction. A cellulose filter in such a scenario, may release oxygen and/or water molecules, e.g., when heated. Such release of water and/or oxygen from the cellulose filter may potentially create an undesirable and/or uncontrollable (e.g., exothermic) reaction with the debris.

SUMMARY

Various aspects of the present disclosure seek to alleviate the above referenced shortcomings, such as the exothermic, violent, and/or runway reaction between metal (e.g., elemental metal and/or metal alloy) and oxygen during and/or after the 3D printing.

In various aspects disclosed herein, passivation of the debris is accomplished by slowly and/or controllably introducing oxygen $O_2$ gas (e.g., in requested concentrations and/or rate) in a gas mixture with an inert gas (such as Argon and/or Nitrogen) into the circulating gas flow of a system. The system can be a 3D printing system, or a filtration passivation system. The system may include a filter (that captures the debris such as soot) and/or a processing chamber (where the 3D object is fabricated).

In an aspect, a method of passivating debris generated by three-dimensional printing comprises: (a) introducing a passivation mixture to a passivation chamber having debris generated by the three-dimensional printing in which a three-dimensional object is generated from a material comprising elemental metal or metal alloy, which passivation mixture includes a diluent and an oxidizing agent in an amount within a threshold window; (b) during passivation, controlling a relative amount of the diluent and the oxidizing agent; and (c) using sensor data to indicate that the debris has been passivated to a safe level.

In some embodiments, during passivation comprises during the three-dimensional printing. In some embodiments, the debris generated by the three-dimensional printing is accumulated in a filter disposed in the passivation chamber. In some embodiments, the diluent is an inert gas and the oxidizing agent comprises oxygen or water. In some embodiments, the threshold window comprises a threshold maximum of at most about 2000 ppm oxidizing agent in the passivation mixture. In some embodiments, the threshold window comprises a threshold minimum of at least about one (1) ppm oxidizing agent in the passivation mixture. In some embodiments, the method further comprising during passivation, using one or more sensors to sense a level of oxidizing agent, diluent, passivation reaction product, gas flow, and/or temperature. In some embodiments, controlling the relative amount of oxidizing agent to diluent utilizes readings by the one or more sensors. In some embodiments, controlling the relative amount of oxidizing agent to diluent comprises adjusting a valve.

In another aspect, an apparatus for passivating debris generated by three-dimensional printing comprises at least one controller having circuitry, which at least one controller is configure to: (a) introduce, or direct introduction of, a passivation mixture to a passivation chamber having debris generated by the three-dimensional printing in which a three-dimensional object is generated from a material comprising elemental metal or metal alloy, which passivation mixture includes a diluent and an oxidizing agent in an amount within a threshold window; (b) during passivation, control a relative amount of the diluent and the oxidizing agent; and (c) utilize sensor data to indicate that the debris has been passivated to a safe level.

In another aspect, a non-transitory computer readable medium for passivating debris generated by three-dimensional printing, the medium, when read by at least one processor, causes the at least one processor to direct operations comprising: (a) introducing a passivation mixture to a passivation chamber having debris generated by the three-dimensional printing in which a three-dimensional object is generated from a material comprising elemental metal or metal alloy, which passivation mixture includes a diluent and an oxidizing agent in an amount within a threshold window; (b) during passivation, controlling a relative amount of the diluent and the oxidizing agent; and (c) using sensor data to indicate that the debris has been passivated to a safe level.

In another aspect, an apparatus for passivating three-dimensional printing material comprising: a passivation chamber; at least one valve configured to: (a) introduce a passivation mixture to a passivation chamber having debris generated by the three-dimensional printing in which a three-dimensional object is generated from a material comprising elemental metal or metal alloy, which passivation mixture includes a diluent and an oxidizing agent in an amount within a threshold window, (b) during passivation, adjust a relative amount of the diluent and the oxidizing agent; and at least one sensor configured to indicate that the debris has been passivated to a safe level.

In some embodiments, the passivation chamber is a processing chamber in which the three-dimensional object is generated. In some embodiments, the passivation chamber is a filter housing that is configured to house a filter utilized in the three-dimensional printing. In some embodiments, the at least one sensor comprises a temperature sensor, oxygen sensor, hydrogen sensor, or moisture sensor.

Another aspect of the present disclosure provides systems, apparatuses (e.g., controllers), and/or non-transitory computer-readable medium (e.g., software) that implement any of the methods disclosed herein.

In another aspect, a method that directs operations facilitated by any of the apparatuses disclosed herein. In another aspect, a method that directs operations facilitated by any of the non-transitory computer readable media disclosed herein.

In another aspect, an apparatus comprises a controller that is programmed to direct a mechanism to implement (e.g., effectuate) any of the method disclosed herein, wherein the controller is operatively coupled to the mechanism. The controller may implement any of the methods disclosed herein.

In another aspect, an apparatus comprises at least one controller that is programmed to implement (e.g., effectuate) the method disclosed herein. The controller may implement any of the methods disclosed herein.

In another aspect, a system comprises an apparatus and at least one controller that is programmed to direct operation of the apparatus, wherein the at least one controller is operatively coupled to the apparatus. The apparatus may include any apparatus disclosed herein. The at least one controller may implement any of the methods disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method disclosed herein, wherein the non-transitory computer-readable medium is operatively coupled to the mechanism. Wherein the mechanism comprises an apparatus or an apparatus component.

Another aspect of the present disclosure provides a non-transitory computer-readable medium comprising machine-executable code that, upon execution by one or more computer processors, implements any of the methods disclosed herein.

Another aspect of the present disclosure provides a non-transitory computer-readable medium comprising machine-executable code that, upon execution by one or more computer processors, effectuates directions of the controller(s) (e.g., as disclosed herein).

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

Figure 1:
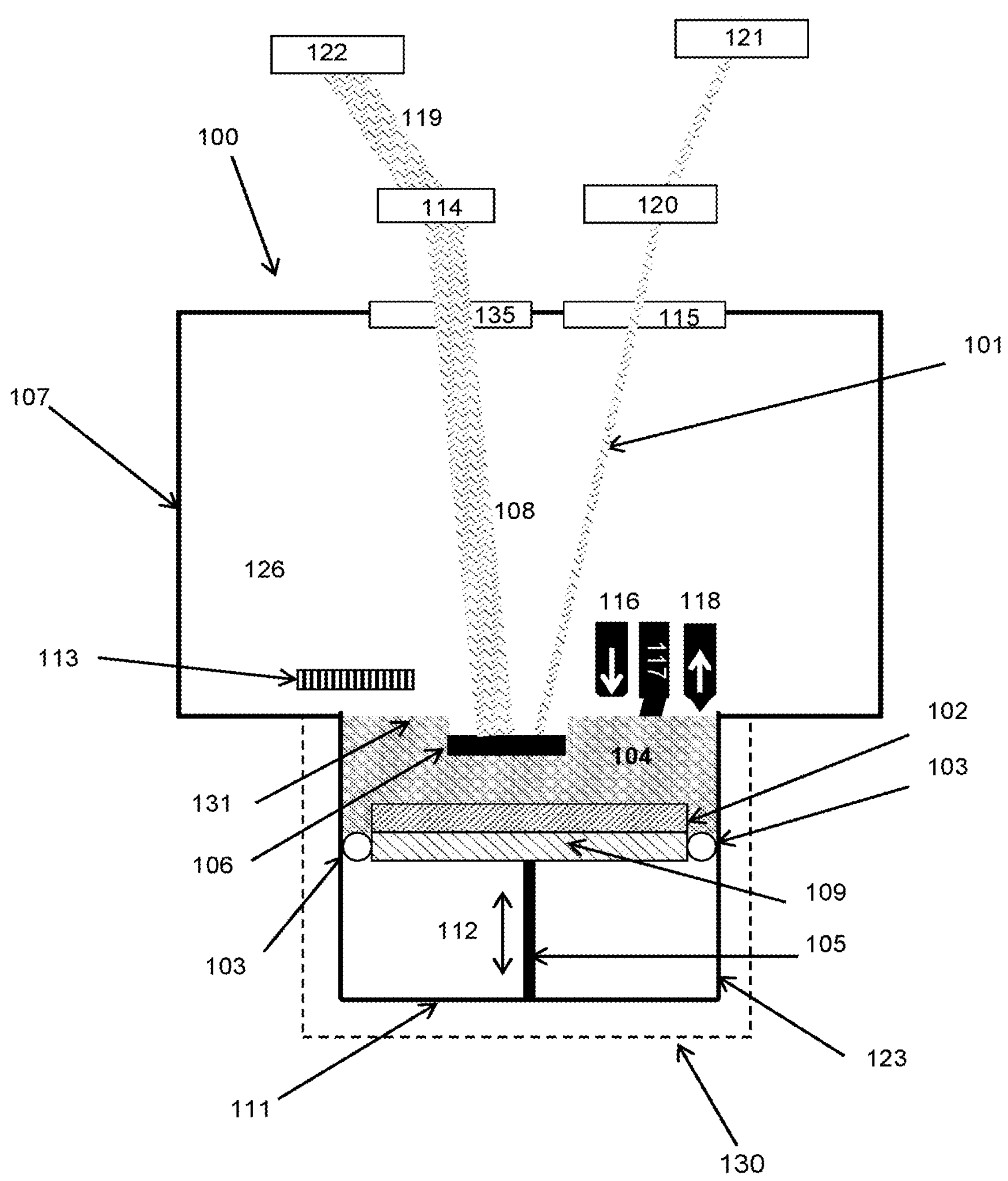
FIG. 1 schematically illustrates a vertical cross-sectional view of a three-dimensional (3D) printing system and its components.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a", "an" and "the" are not intended to refer to only a singular entity, but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes 'next to', 'adjoining', 'in contact with', and 'in proximity to.'

The term "operatively coupled" or "operatively connected" refers to a first mechanism that is coupled (or connected) to a second mechanism to allow the intended operation of the second and/or first mechanism. The coupling may comprise physical or non-physical coupling. The non-physical coupling may comprise signal induced coupling (e.g., wireless coupling).

The present disclosure provides three-dimensional (3D) printing apparatuses, systems, software, and methods for forming a 3D object. For example, a 3D object may be formed by sequential addition of material or joining of pre-transformed material to form a structure in a controlled manner (e.g., under manual or automated control). Pre-transformed material, as understood herein, is a material before it has been transformed during the 3D printing process. The transformation can be effectuated by utilizing an energy beam and/or flux. The pre-transformed material may be a material that was, or was not, transformed prior to its use in a 3D printing process. The pre-transformed material may be a starting material for the 3D printing process. The pre-transformed material may comprise a particulate material. The pre-transformed material may comprise a liquid, solid, or semi-solid. The particulate material may comprise solid particles, semi-solid particles, or vesicles (e.g., comprising liquid or semi-liquid material). Pre-transformed material as understood herein is a material before it has been transformed by an energy beam during the 3D printing process. The pre-transformed material may be a material that was, or was not, transformed prior to its use in the 3D printing process.

In some embodiments of a 3D printing process, the deposited pre-transformed material is fused, (e.g., sintered or melted), bound or otherwise connected to form at least a portion of the desired 3D object. Fusing, binding or otherwise connecting the material is collectively referred to herein as "transforming" the material. Fusing the material may refer to melting, smelting, or sintering a pre-transformed material.

At times, melting comprises liquefying the material (i.e., transforming to a liquefied state). A liquefied state refers to a state in which at least a portion of a transformed material is in a liquid state. Melting may comprise liquidizing the material (i.e., transforming to a liquidus state). A liquidus state refers to a state in which an entire transformed material is in a liquid state. The apparatuses, methods, software, and/or systems provided herein are not limited to the generation of a single 3D object, but are may be utilized to generate one or more 3D objects simultaneously (e.g., in parallel) or separately (e.g., sequentially). The multiplicity of 3D object may be formed in one or more material beds (e.g., powder bed). In some embodiments, a plurality of 3D objects is formed in one material bed. The fundamental length scale (FLS) (e.g., width, depth, and/or height) of the material bed can be at least about 50 millimeters (mm), 60 mm, 70 mm, 80 mm, 90 mm, 100 mm, 200 mm, 250 mm, 280 mm, 320 mm, 400 mm, 500 mm, 800 mm, 900 mm, 1 meter (m), 2 m or 5 m. The FLS (e.g., width, depth, and/or height) of the material bed can be at most about 50 millimeters (mm), 60 mm, 70 mm, 80 mm, 90 mm, 100 mm, 200 mm, 250 mm, 280 mm, 320 mm, 400 mm, 500 mm, 800 mm, 900 mm, 1 meter (m), 2 m or 5 m. The FLS of the material bed can be between any of the afore-mentioned values (e.g., from about 50 mm to about 5 m, from about 250 mm to about 500 mm, from about 280 mm to about 1 m).

In some embodiments, debris is formed during the 3D printing process. The debris may comprise soot, fumes, or splatter. The debris may comprise a nano or a micro sized particle. The debris particle may have a FLS of at least about 10 nanometers (nm) 30, 50 nm, 80 nm, 100 nm, 150 nm, or 200 nm. The debris particle may have a FLS (e.g., diameter of a bounding circle) of at most about 50 micrometers (μm), 30 μm, 20 μm, 15 μm, 10 μm, 5 μm, 3 μm, 1 μm, or 0.5 μm. The debris particle may have a FLS of any value between the aforementioned values (e.g., from about 50 nm to about 50 μm, from about 10 nm to about 200 nm, from about 30 nm to about 100 nm, from about 150 nm to about 5 μm, or from about 5 μm to about 50 μm).

In some embodiments, 3D printing methodologies comprises extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

In some embodiments, the 3D printing methodologies differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

In some embodiments, the deposited pre-transformed material within the enclosure comprises a liquid material, semi-solid material (e.g., gel), or a solid material (e.g., powder). The deposited pre-transformed material within the enclosure can be in the form of a powder, wires, sheets, or droplets. The material (e.g., pre-transformed, transformed, and/or hardened) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball, or a carbon nanotube. The ceramic material may comprise cement. The ceramic material may comprise alumina, zirconia, or carbide (e.g., silicon carbide, or tungsten carbide). The ceramic material may include high performance material (HPM). The ceramic material may include a nitride (e.g., boron nitride or aluminum nitride). The material may comprise sand, glass, or stone. In some embodiments, the material may comprise an organic material, for example, a polymer or a resin (e.g., 114 W resin). The organic material may comprise a hydrocarbon. The polymer may comprise styrene or nylon (e.g., nylon 11). The polymer may comprise a thermoplast. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) and/or wires. The bound material can comprise chemical bonding. Transforming can comprise chemical bonding. Chemical bonding can comprise covalent bonding. The pre-transformed material may be pulverous. The printed 3D object can be made of a single material (e.g., single material type) or multiple materials (e.g., multiple material types). Sometimes one portion of the 3D object and/or of the material bed may comprise one material, and another portion may comprise a second material different from the first material. The material may be a single material type (e.g., a single alloy or a single elemental metal). The material may comprise one or more material types. For example, the material may comprise two alloys, an alloy and an elemental metal, an alloy and a ceramic, or an alloy and an elemental carbon. The material may comprise an alloy and alloying elements (e.g., for inoculation). The material may comprise blends of material types. The material may comprise blends with elemental metal or with metal alloy. The material may comprise blends excluding (e.g., without) elemental metal or including (e.g., with) metal alloy. The material may comprise a stainless steel. The material may comprise a titanium alloy, aluminum alloy, and/or nickel alloy.

In some cases, a layer within the 3D object comprises a single type of material. In some examples, a layer of the 3D object may comprise a single elemental metal type, or a single alloy type. In some examples, a layer within the 3D object may comprise several types of material (e.g., an elemental metal and an alloy, an alloy and a ceramic, an alloy, and an elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member of elemental carbon (e.g., graphite). In some cases, a layer of the 3D object comprises more than one type of material. In some cases, a layer of the 3D object comprises more than member of a type of material.

In some examples the material bed, platform, or both material bed and platform comprise a material type which constituents (e.g., atoms) readily lose their outer shell electrons, resulting in a free-flowing cloud of electrons within their otherwise solid arrangement. In some examples the powder, the base, or both the powder and the base comprise a material characterized in having high electrical conductivity, low electrical resistivity, high thermal conductivity, or high density. The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times." The high electrical conductivity can be between any of the afore-mentioned electrical conductivity values (e.g., from about $1*10^5$ S/m to about $1*10^8$ S/m). The thermal conductivity, electrical resistivity, electrical conductivity, and/or density can be measured at ambient temperature (e.g., at R.T., or 20° C.). The low electrical resistivity may be at most about $1*10^{-5}$ ohm times meter (Ω*m), $5*10^{-8}$ Ω*m, $1*10^{-8}$ Ω*m, $5*10^{-7}$ Ω*m, $1*10^{-7}$ Ω*m, $5*10^{-8}$ or $1*10^{-8}$ frm. The low electrical resistivity can be between any of the afore-mentioned values (e.g., from about $1\times10^{-5}$ Ω*m to about $1\times10^{-8}$ Ω*m). The high thermal conductivity may be at least about 10 Watts per meter times Kelvin (W/mK), 15 W/mK, 20 W/mK, 35 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be between any of the afore-mentioned thermal conductivity values (e.g., from about 20 W/mK to about 1000 W/mK). The high density may be at least about 1.5 grams per cubic centimeter (g/cm$^3$), 1.7 g/cm$^3$, 2 g/cm$^3$, 2.5 g/cm$^3$, 2.7 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore mentioned values (e.g., from about 1 g/cm$^3$ to about 25 g/cm$^3$).

In some embodiments, the elemental metal comprises an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium or Osmium. The transition metal can be mercury. The rare earth metal can be a lanthanide or an actinide. The antinode metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth. The material may comprise a precious metal. The precious metal may comprise gold, silver, palladium, ruthenium, rhodium, osmium, iridium, or platinum. The material may comprise at least about 40%, 50%, 60%, 70%, 80%, 90%, 95%, 97%, 98%, 99%, 99.5% or more precious metal. The material may comprise at most about 40%, 50%, 60%, 70%, 80%, 90%, 95%, 97%, 98%, 99%, 99.5% or less precious metal. The material may comprise precious metal with any value in between the afore-mentioned values. The material may comprise at least a minimal percentage of precious metal according to the laws in the particular jurisdiction.

In some embodiments, the metal alloy comprises iron based alloy, nickel based alloy, cobalt based alloy, chrome based alloy, cobalt chrome based alloy, titanium based alloy, magnesium based alloy, scandium alloy or copper based alloy. The alloy may comprise an oxidation or corrosion resistant alloy. The alloy may comprise a super alloy (e.g., Inconel). The super alloy may comprise Inconel 600, 617, 625, 690, 718 or X-750. The alloy may comprise an alloy used for aerospace applications, automotive application, surgical application, or implant applications. The metal may include a metal used for aerospace applications, automotive application, surgical application, or implant applications. The super alloy may comprise IN 738 LC, IN 939, Rene 80, IN 6203 (e.g., IN 6203 DS), PWA 1483 (e.g., PWA 1483 SX), or Alloy 247.

In some embodiments, the metal alloys comprise Refractory Alloys. The refractory metals and alloys may be used for heat coils, heat exchangers, furnace components, or welding electrodes. The Refractory Alloys may comprise a high melting point, low coefficient of expansion, mechanically strong, low vapor pressure at elevated temperatures, high thermal conductivity, or high electrical conductivity.

At times, the material (e.g., alloy or elemental) comprises a material used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The material may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, tablet, i-pad), air conditioning, generators, furniture, musical equipment, art, jewelry, cooking equipment, or sport gear. The material may comprise an alloy used for products for human or veterinary applications comprising implants, or prosthetics. The metal alloy may comprise an alloy used for applications in the fields comprising human or veterinary surgery, implants (e.g., dental), or prosthetics.

At times, the alloy includes a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron-based alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron-based alloy may include cast iron or pig iron. The steel may include Bulat steel, Chromoly, Crucible steel, Damascus steel, Hadfield steel, High speed steel, HSLA steel, Maraging steel, Maraging steel (M300), Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 317L, 2205, 409, 904L, 321, 254SMO, 316Ti, 321H, 17-4, 15-5, 420 or 304H. The steel may comprise stainless steel of at least one crystalline structure selected from the group consisting of austenitic, superaustenitic, ferritic, martensitic, duplex and precipitation-hardening martensitic. Duplex stainless steel may be lean duplex, standard duplex, super duplex or hyper duplex. The stainless steel may comprise surgical grade stainless steel (e.g., austenitic 316, martensitic 420 or martensitic 440). The austenitic 316 stainless steel may include 316L or 316LVM. The steel may include 17-4 Precipitation Hardening steel (also known as type 630 is a chromium-copper precipitation hardening stainless steel; 17-4PH steel). The stainless steel may comprise 360L stainless steel.

At times, the titanium-based alloys include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38 or higher. In some instances, the titanium base alloy includes $TiAl_6V_4$ or $TiAl_6Nb_7$.

At times, the Nickel based alloy include Alnico, Alumel, Chromel, Cupronickel, Ferronickel, German silver, Hastelloy, Inconel, Monel metal, Nichrome, Nickel-carbon, Nicrosil, Nisil, Nitinol, Hastelloy X, Cobalt-Chromium or Magnetically "soft" alloys. The magnetically "soft" alloys may comprise Mu-metal, Permalloy, Supermalloy, or Brass. The Brass may include nickel hydride, stainless or coin silver. The cobalt alloy may include Megallium, Stellite (e. g. Talonite), Ultimet, or Vitallium. The chromium alloy may include chromium hydroxide, or Nichrome.

At times, the aluminum-based alloy includes AA-8000, Al—Li (aluminum-lithium), Alnico, Duralumin, Hiduminium, Kryron Magnalium, Nambe, Scandium-aluminum, or, Y alloy. The magnesium alloy may be Elektron, Magnox or T-Mg—Al—Zn (Bergman phase) alloy. At times, the material excludes at least one aluminum-based alloy (e.g., $AlSi_{10}Mg$).

At times, the copper based alloy comprises Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84). The elemental carbon may comprise graphite, Graphene, diamond, amorphous carbon, carbon fiber, carbon nanotube, or fullerene.

Any of the apparatuses and/or their components disclosed herein may be built by a material disclosed herein. The apparatuses and/or their components comprise a transparent or non-transparent (e.g., opaque) material. For example, the apparatuses and/or their components may comprise an organic or an inorganic material. For example, may comprise the apparatuses and/or their components may comprise an elemental metal, metal alloy, ceramic, or an allotrope of elemental carbon. For example, the enclosure, platform, recycling system, or any of their components may comprise an elemental metal, metal alloy, ceramic, or an allotrope of elemental carbon.

In some embodiments, the pre-transformed material (e.g., particulate material, such as powder material, (also referred to herein as a "pulverous material")) comprises a solid. The particulate material may comprise fine particles. The pre-transformed material may be a granular material. The pre-transformed material (e.g., powder) can be composed of individual particles. At least some of the particles can be spherical, oval, prismatic, cubic, or irregularly shaped. At least some of the particles can have a fundamental length scale (e.g., diameter, spherical equivalent diameter, length, width, or diameter of a bounding sphere). The fundamental length scale (abbreviated herein as "FLS") of at least some of the particles can be from about 1 nanometers (nm) to about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, or 5 nm. At least some of the particles can have a FLS of at least about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nanometers (nm) or more. At least some of the particles can have a FLS of at most about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nm or less. In some cases, at least some of the pre-transformed material particles may have a FLS in between any of the aforementioned FLSs.

In some embodiments, the pre-transformed (e.g., particulate) material is composed of a homogenously shaped particle mixture such that all of the particles have substantially the same shape and FLS magnitude within at most about 1%, 5%, 8%, 10%, 15%, 20%, 25%, 30%, 35%, 40%, 50%, 60%, 70%, or less distribution of FLS. In some cases, the powder can be a heterogeneous mixture such that the particles have variable shape and/or FLS magnitude. In some examples, at least about 30%, 40%, 50%, 60%, or 70% (by weight) of the particles within the powder material have a largest FLS that is smaller than the median largest FLS of the powder material. In some examples, at least about 30%, 40%, 50%, 60%, or 70% (by weight) of the particles within the powder material have a largest FLS that is smaller than the mean largest FLS of the powder material.

In some examples, the size of the largest FLS of the transformed material (e.g., height) is greater than the average largest FLS of the powder material by at least about 1.1 times, 1.2 times, 1.4 times, 1.6 times, 1.8 times, 2 times, 4 times, 6 times, 8 times, or 10 times. In some examples, the size of the largest FLS of the transformed material is greater than the median largest FLS of the powder material by at most about 1.1 times, 1.2 times, 1.4 times, 1.6 times, 1.8 times, 2 times, 4 times, 6 times, 8 times, or 10 times. The powder material can have a median largest FLS that is at least about 1 μm, 5 μm, 10 μm, 20 μm, 30 μm, 40 μm, 50 μm, 100 μm, or 200 μm. The powder material can have a median largest FLS that is at most about 1 μm, 5 μm, 10 μm, 20 μm, 30 μm, 40 μm, 50 μm, 100 μm, or 200 μm. In some cases, the powder particles may have a FLS in between any of the FLS listed above (e.g., from about 1 μm to about 200 μm, from about 1 μm to about 50 μm, or from about 5 μm to about 40 μm).

In another aspect provided herein is a system for generating a 3D object comprising: an enclosure for accommodating at least one layer of pre-transformed material (e.g., powder); an energy (e.g., energy beam) capable of transforming the pre-transformed material to form a transformed material; and a controller that directs the energy to at least a portion of the layer of pre-transformed material according to a path (e.g., as described herein). The transformed material may be capable of hardening to form at least a portion of a 3D object. The system may comprise an energy source, an optical system, a temperature control system, a material delivery mechanism (e.g., a recoater), a pressure control system, an atmosphere control system, an atmosphere, a pump, a nozzle, a valve, a sensor, a central processing unit, a display, a chamber, or an algorithm. The chamber may comprise a building platform. The system for generating a 3D object and its components may be any 3D printing system such as, for example, the one described in Patent Application serial number PCT/US15/36802 filed on Jun. 19, 2015, titled "APPARATUSES, SYSTEMS AND METHODS FOR THREE-DIMENSIONAL PRINTING;" in Patent Application serial number PCT/US17/18191 filed on Feb. 16, 2017, titled "ACCURATE THREE-DIMEN- SIONAL PRINTING;" in Patent Application serial number EP17156707.6 filed on Feb. 17, 2017, titled "ACCURATE THREE-DIMENSIONAL PRINTING;" or in patent application Ser. No. 15/435,065 filed on Feb. 16, 2017, titled "ACCURATE THREE-DIMENSIONAL PRINTING," each of which is entirely incorporated herein by reference.

In some embodiments, the 3D printing system comprises a chamber (e.g., FIG. 1, 126). The chamber may be referred herein as the "processing chamber." The processing chamber may comprise an energy beam (e.g., FIG. 1, 101; 108). The energy beam may be directed towards an exposed surface (e.g., FIG. 1, 131) of a material bed (e.g., FIG. 1, 104). The 3D printing system may comprise one or more modules. The one or more modules may be referred herein as the "build modules." At times, at least one build module (e.g., FIG. 1, 130) may be situated in the enclosure comprising the processing chamber (e.g., FIG. 1, 126). At times, at least one build module may engage with the processing chamber (e.g., FIG. 1). At times, at least one build module may not engage with the processing chamber. At times, a plurality of build modules may be situated in an enclosure comprising the processing chamber. At times, the build module may be connected to, or may comprise an autonomous guided vehicle (AGV). The AGV may have at least one of the following: a movement mechanism (e.g., wheels), positional (e.g., optical) sensor, and controller. The controller may enable self-docking (e.g., to a docking station) and/or self-driving of the AGV. The self-docking and/or self-driving may be to and from the processing chamber. The build module may reversibly engage with (e.g., couple to) the processing chamber. The engagement of the build module with the processing chamber may be controlled (e.g., by a controller). The control may be automatic and/or manual. The engagement of the build module with the processing chamber may be reversible. In some embodiments, the engagement of the build module with the processing chamber may be permanent.

In some embodiments, at least one of the build modules has at least one controller. The controller may be its own controller. The controller may be different than the controller controlling the 3D printing process and/or the processing chamber. The translation facilitator (e.g., build module delivery system) may comprise a controller (e.g., its own controller). The controller of the translation facilitator may be different than the controller controlling the 3D printing process and/or the processing chamber. The controller of the translation facilitator may be different than the controller of the build module. The build module controller and/or the translation facilitator controller may be a microcontroller. At times, the controller of the 3D printing process and/or the processing chamber may not interact with the controller of the build module and/or translation facilitator. At times, the controller of the build module and/or translation facilitator may not interact with the controller of the 3D printing process and/or the processing chamber. For example, the controller of the build module may not interact with the controller of the processing chamber. For example, the controller of the translation facilitator may not interact with the controller of the processing chamber. The controller of the 3D printing process and/or the processing chamber may be able to interpret one or more signals emitted from (e.g., by) the build module and/or translation facilitator. The controller of the build module and/or translation facilitator may be able to interpret one or more signals emitted from (e.g., by) the processing chamber. The one or more signals may be electromagnetic, electronic, magnetic, pressure, or sound signals. The electromagnetic signals may comprise visible light, infrared, ultraviolet, or radio frequency signals. The electromagnetic signals may comprise a radio frequency identification signal (RFID). The RFID may be specific for a build module, user, entity, 3D object model, processor, material type, printing instruction, 3D print job, or any combination thereof.

In some embodiments, the build module controller controls the translation of the build module, sealing status of the build module, atmosphere of the build module, engagement of the build module with the processing chamber, exit of the build module from the enclosure, entry of the build module into the enclosure, or any combination thereof. Controlling the sealing status of the build module may comprise opening or closing of the build module shutter. The build module controller may be able to interpret signals from the 3D printing controller and/or processing chamber controller. The processing chamber controller may be the 3D printing controller. For example, the build module controller may be able to interpret and/or respond to a signal regarding the atmospheric conditions in the load lock. For example, the build module controller may be able to interpret and/or respond to a signal regarding the completion of a 3D printing process (e.g., when the printing of a 3D object is complete). The build module may be connected to an actuator. The actuator may be translating or stationary. The controller of the build module may direct the translation facilitator (e.g., actuator) to translate the build module from one position to another, when translation is possible. The translation facilitator may be a build module delivery system. The translation facilitator may be autonomous. The translation facilitator may operate independently of the 3D printer (e.g., mechanisms directed by the 3D printing controller). The translation facilitator (e.g., build module delivery system) may comprise a controller and/or a motor. The translation facilitator may comprise a machine or a human. The translation is possible, for example, when the destination position of the build module is empty. The controller of the 3D printing and/or the processing chamber may be able to sense signals emitted from the controller of the build module. For example, the controller of the 3D printing and/or the processing chamber may be able to sense a signal from the build module that is emitted when the build module is docked into engagement position with the processing chamber. The signal from the build module may comprise reaching a certain position in space, reaching a certain atmospheric characteristic threshold, opening, or shutting the build platform closing, or engaging or disengaging (e.g., docking or undocking) from the processing chamber. The build module may comprise one or more sensors. For example, the build module may comprise a proximity, movement, light, sounds, or touch sensor.

In some embodiments, the build module is included as part of the 3D printing system. In some embodiments, the build module is separate from the 3D printing system. The build module may be independent (e.g., operate independently) from the 3D printing system. For example, build module may comprise their own controller, motor, elevator, build platform, valve, channel, or shutter. In some embodiments, one or more conditions differ between the build module and the processing chamber, and/or among the different build modules. The difference may comprise different pre-transformed materials, atmospheres, platforms, temperatures, pressures, humidity levels, oxygen levels, gas (e.g., inert), traveling speed, traveling method, acceleration speed, or post processing treatment. For example, the relative velocity of the various build modules with respect to the processing chamber may be different, similar, or substantially similar. The build platform may undergo different, similar, or substantially similar post processing treatment (e.g., further processing of the 3D object and/or material bed after the generation of the 3D object in the material bed is complete).

In some examples, a build module translates relative to the processing chamber. The translation may be parallel or substantially parallel to the bottom surface of the build module (e.g., build chamber). The bottom surface of the build module is the one closest to the gravitational center. The translation may be at an angle (e.g., planar or compound) relative to the bottom surface of the build module. The translation may use any device that facilitates translation (e.g., an actuator). For example, the translation facilitator may comprise a robotic arm, conveyor (e.g., conveyor belt), rotating screw, or a moving surface (e.g., platform). The translation facilitator may comprise a chain, rail, motor, or an actuator. The translation facilitator may comprise a component that can move another. The movement may be controlled (e.g., using a controller). The movement may comprise using a control signal and source of energy (e.g., electricity). The translation facilitator may use electricity, pneumatic pressure, hydraulic pressure, or human power.

In some embodiments, the 3D printing system comprises at least 1, 2, 3, 4, 5, 6, 7, 8, 9, or 10 build modules. At least one build module may engage with the processing chamber to expand the interior volume of the processing chamber. During at least a portion of the 3D printing process, the atmospheres of the chamber and enclosure may merge. At times, during at least a portion of the 3D printing process, the atmospheres of the chamber and enclosure may remain separate. During at least a portion of the 3D printing process, the atmospheres of the build module and processing chamber may be separate. The build module may be mobile or stationary. The build module may comprise an elevator. The elevator may be connected to a platform (e.g., building platform). The elevator may be reversibly connected to at least a portion of the platform (e.g., to the base). The elevator may be irreversibly connected to at least a portion of the platform (e.g., to the substrate). The platform may be separated from one or more walls (e.g., side walls) of the build module by a seal (e.g., FIG. 1, 103).

In some embodiments, the 3D printing process initiates after merging of the build module with the processing chamber. At the beginning of the 3D printing process, the build platform may be at an elevated position. At the end of the 3D printing process, the build platform may be at a vertically reduced position. The building module may translate between three positions during a 3D printing run. The build module may enter to the enclosure from a position away from the engagement position with the processing chamber. The build module may then advance toward the processing chamber, and engage with the processing chamber. The layer dispensing mechanism and energy beam will translate and form the 3D object within the material bed (e.g., as described herein), while the platform gradually lowers its vertical position. The layer dispensing mechanism can dispense material at a dispensing rate of at least about at 50 grams/second (g/s), 55 g/s, 60 g/s, 70 g/s, 80 g/s, 84 g/s, 90 g/s, 100 g/s, 120 g/s, 150 g/s, 200 g/s, or 500 g/s. The dispensing rate can be between any of the afore-mentioned dispensing rates (e.g., from about 50 g/s to about 100 g/s, from about 80 g/s to about 120 g/s, from about 84 g/s to about 500 g/s, from about 55 g/s to about 500 g/s or from about 60 g/s to about 200 g/s). The layer dispenser mechanism can dispense a layer of a height of at least about 100 microns (μm), 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm or 950 μm. The height of material dispensed in a layer of material can be between any of the afore-mentioned amounts (e.g., from about 100 μm to about 650 μm, from about 200 μm to about 950 μm, from about 350 μm to about 800 μm, from about 100 μm to about 950 μm). The time taken to dispense a layer of material can be at least about 0.1 seconds (sec), 0.2 sec, 0.3 sec, 0.5 sec, 1 sec, 2 sec, 3 sec, 4 sec, 5 sec, 8 sec, 9 sec, 10 sec, 15 sec or 20 sec. The time taken to dispense a layer of material can be between any of the afore-mentioned times (e.g., from about 0.1 seconds to about 20 seconds, from about 0.2 seconds to about 1 second, from about 3 seconds to about 5 seconds, from about 0.5 seconds to about 20 seconds).

In some embodiments, once and/or after the 3D object printing is complete, the build module disengages from the processing chamber and translate away from the processing chamber engagement position. Disengagement of the build module from the processing chamber may include closing the processing chamber with its shutter, closing the build module with its shutter, or both closing the processing chamber shutter and closing the build module shutter. Disengagement of the build module from the processing chamber may include maintaining the processing chamber atmosphere to be separate from the enclosure atmosphere, maintaining the build module atmosphere to be separate from the enclosure atmosphere, or maintaining both the processing chamber atmosphere and the build atmosphere separate from the enclosure atmosphere. Disengagement of the build module from the processing chamber may include maintaining the processing chamber atmosphere to be separate from the ambient atmosphere, maintaining the build module atmosphere to be separate from the ambient atmosphere, or maintaining both the processing chamber atmosphere and the build atmosphere separate from the ambient atmosphere. The building platform that is disposed within the build module before engagement with the processing chamber, may be at its top most position, bottom most position, or anywhere between its top most position and bottom most position within the build module.

At times, the usage of sealable build modules, processing chamber, and/or unpacking chamber allows a small degree of operator intervention, low degree of operator exposure to the pre-transformed material, and/or low down time of the 3D printer. The 3D printing system may operate most of the time without an intermission. The 3D printing system may be utilized for 3D printing most of the time. Most of the time may be at least about 50%, 70%, 80%, 90%, 95%, 96%, 97%, 98%, or 99% of the time. Most of the time may be between any of the aforementioned values (e.g., from about 50% to about 99%, from about 80% to about 99%, from about 90% to about 99%, or from about 95% to about 99% of the time. The entire time includes the time during which the 3D printing system prints a 3D object, and time during which it does not print a 3D object. Most of the time may include operation during seven days a week and/or 24 hours during a day.

In some embodiments, the 3D printing requires assistance by one or more operators. At times, the 3D printing system requires operation of maximum a single standard daily work shift. The 3D printing system may require operation by a human operator working at most of about 8 hours (h), 7 h, 6 h, 5 h, 4 h, 3 h, 2 h, 1 h, or 0.5 h a day. The 3D printing system may require operation by a human operator working between any of the afore-mentioned time frames (e.g., from about 8 h to about 0.5 h, from about 8 h to about 4 h, from about 6 h to about 3 h, from about 3 h to about 0.5 h, or from about 2 h to about 0.5 h a day). The 3D printing system may require operation of maximum a single standard work week shift. The 3D printing system may require operation by a human operator working at most of about 50 h, 40 h, 30 h, 20 h, 10 h, 5 h, or 1 h a week. The 3D printing system may require operation by a human operator working between any of the afore-mentioned time frames (e.g., from about 40 h to about 1 h, from about 40 h to about 20 h, from about 30 h to about 10 h, from about 20 h to about 1 h, or from about 10 h to about 1 h a week). A single operator may support during his daily and/or weekly shift at least 1, 2, 3, 4, 5, 6, 7, 8, 9, or 10 3D printers (i.e., 3D printing systems).

In some embodiments, the enclosure and/or processing chamber of the 3D printing system is opened to the ambient environment sparingly (e.g., during, before, and/or after the 3D printing). In some embodiments, the enclosure and/or processing chamber of the 3D printing system may be opened by an operator (e.g., human) sparingly. Sparing opening may be at most once in at most every 1, 2, 3, 4, or 5 weeks. The weeks may comprise weeks of standard operation of the 3D printer.

In some embodiments, the 3D printer has a capacity of 1, 2, 3, 4, or 5 full prints in terms of pre-transformed material (e.g., powder) reservoir capacity. The 3D printer may have the capacity to print a plurality of 3D objects in parallel. For example, the 3D printer may be able to print at least 2, 3, 4, 5, 6, 7, 8, 9, or 10 3D objects in parallel.

In some embodiments, the printed 3D object is retrieved soon after terminating the last ptransformation operation of at least a portion of the material bed. Soon after terminating may be at most about 1 day, 12 hours, 6 hours, 3 hours, 2 hours, 1 hour, 30 minutes, 15 minutes, 5 minutes, 240 seconds (sec), 220 sec, 200 sec, 180 sec, 160 sec, 140 sec, 120 sec, 100 sec, 80 sec, 60 sec, 40 sec, 20 sec, 10 sec, 9 sec, 8 sec, 7 sec, 6 sec, 5 sec, 4 sec, 3 sec, 2 sec, or 1 sec. Soon after terminating may be between any of the afore-mentioned time values (e.g., from about 1 s to about 1 day, from about 1 s to about 1 hour, from about 30 minutes to about 1 day, or from about 20 s to about 240 s).

In some embodiments, the 3D printer has a capacity of 1, 2, 3, 4, or 5 full prints before requiring human intervention. Human intervention may be required for refilling the pre-transformed (e.g., powder) material, unloading the build modules, unpacking the 3D object, or any combination thereof. The 3D printer operator may condition the 3D printer at any time during operation of the 3D printing system (e.g., during the 3D printing process). Conditioning of the 3D printer may comprise refilling the pre-transformed material that is used by the 3D printer, replacing gas source, or replacing filters. The conditioning may be with or without interrupting the 3D printing system. For example, refilling and unloading from the 3D printer can be done at any time during the 3D printing process without interrupting the 3D printing process. Conditioning may comprise refreshing the 3D printer.

In some embodiments, the time lapse between the end of printing in a first material bed, and the beginning of printing in a second material bed is at most about 60 minutes (min), 40 min, 30 min, 20 min, 15 min, 10 min, or 5 min. The time lapse between the end of printing in a first material bed, and the beginning of printing in a second material bed may be between any of the afore-mentioned times (e.g., from about 60 min to abo 5 min, from about 60 min to about 30 min, from about 30 min to about 5 min, from about 20 min to about 5 min, from about 20 min to about 10 min, or from about 15 min to about 5 min). The speed during which the 3D printing process proceeds is disclosed in Patent Application serial number PCT/US15/36802 that is incorporated herein in its entirety.

In some embodiments, the 3D object is removed from the material bed after the completion of the 3D printing process. For example, the 3D object may be removed from the material bed when the transformed material that formed the 3D object hardens. For example, the 3D object may be removed from the material bed when the transformed material that formed the 3D object is no longer susceptible to deformation under standard handling operation (e.g., human and/or machine handling).

At times, the generated 3D object requires very little or no further processing after its retrieval. Further processing may be post printing processing. Further processing may comprise trimming, as disclosed herein. Further processing may comprise polishing (e.g., sanding). In some cases, the generated 3D object can be retrieved and finalized without removal of transformed material and/or auxiliary support features.

In some examples, the generated 3D object adheres (e.g., substantially) to a requested model of the 3D object. The 3D object (e.g., solidified material) that is generated can have an average deviation value from the intended dimensions (e.g., of a desired 3D object) of at most about 0.5 microns (μm), 1 μm, 3 μm, 10 μm, 30 μm, 100 μm, 300 μm or less from a requested model of the 3D object. The deviation can be any value between the afore-mentioned values. The average deviation can be from about 0.5 μm to about 300 μm, from about 10 μm to about 50 μm, from about 15 μm to about 85 μm, from about 5 μm to about 45 μm, or from about 15 μm to about 35 μm. The 3D object can have a deviation from the intended dimensions in a specific direction, according to the formula $Dv+L/K_{dv}$, wherein Dv is a deviation value, L is the length of the 3D object in a specific direction, and $K_{dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, 300 μm or less. Dv can have any value between the afore-mentioned values. For example, Dv can have a value that is from about 0.5 μm to about 300 μm, from about 10 μm to about 50 μm, from about 15 μm to about 85 μm, from about 5 μm to about 45 μm, or from about 15 μm to about 35 μm. $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the afore-mentioned values. For example, $K_{dv}$ can have a value that is from about 3000 to about 500, from about 1000 to about 2500, from about 500 to about 2000, from about 1000 to about 3000, or from about 1000 to about 2500.

At times, the generated 3D object (i.e., the printed 3D object) does not require further processing following its generation by a method described herein. The printed 3D object may require reduced amount of processing after its generation by a method described herein. For example, the printed 3D object may not require removal of auxiliary support (e.g., since the printed 3D object was generated as a 3D object devoid of auxiliary support). The printed 3D object may not require smoothing, flattening, polishing, or leveling. The printed 3D object may not require further machining. In some examples, the printed 3D object may require one or more treatment operations following its generation (e.g., post generation treatment, or post printing treatment). The further treatment step(s) may comprise surface scraping, machining, polishing, grinding, blasting (e.g., sand blasting, bead blasting, shot blasting, or dry ice blasting), annealing, or chemical treatment. The further treatment may comprise physical or chemical treatment. The further treatment step(s) may comprise electrochemical treatment, ablating, polishing (e.g., electro polishing), pickling, grinding, honing, or lapping. In some examples, the printed 3D object may require a single operation (e.g., of sand blasting) following its formation. The printed 3D object may require an operation of sand blasting following its formation. Polishing may comprise electro polishing (e.g., electrochemical polishing or electrolytic polishing). The further treatment may comprise the use of abrasive(s). The blasting may comprise sand blasting or soda blasting. The chemical treatment may comprise use or an agent. The agent may comprise an acid, a base, or an organic compound. The further treatment step(s) may comprise adding at least one added layer (e.g., cover layer). The added layer may comprise lamination. The added layer may be of an organic or inorganic material. The added layer may comprise elemental metal, metal alloy, ceramic, or elemental carbon. The added layer may comprise at least one material that composes the printed 3D object. When the printed 3D object undergoes further treatment, the bottom most surface layer of the treated object may be different than the original bottom most surface layer that was formed by the 3D printing (e.g., the bottom skin layer).

At times, the methods described herein are performed in the enclosure (e.g., container, processing chamber, and/or build module). One or more 3D objects can be formed (e.g., generated, and/or printed) in the enclosure (e.g., simultaneously, and/or sequentially). The enclosure may have a predetermined and/or controlled pressure. The enclosure may have a predetermined and/or controlled atmosphere. The control may be manual or via a control system. The atmosphere may comprise at least one gas (e.g., a gas mixture). The gas mixture may comprise any gas disclosed herein.

In some examples, the enclosure comprises ambient pressure (e.g., 1 atmosphere), negative pressure (i.e., vacuum) or positive pressure. Different portions of the enclosure may have different atmospheres. The different atmospheres may comprise different gas compositions. The different atmospheres may comprise different atmosphere temperatures. The different atmospheres may comprise ambient pressure (e.g., 1 atmosphere), negative pressure (i.e., vacuum) or positive pressure. The different portions of the enclosure may comprise the processing chamber, build module, or enclosure volume excluding the processing chamber and/or build module. The vacuum may comprise pressure below 1 bar, or below 1 atmosphere. The positively pressurized environment may comprise pressure above 1 bar or above 1 atmosphere. The pressure in the enclosure can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or 1100 bar. The pressure in the enclosure can be at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the enclosure can be between any of the afore-mentioned enclosure pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The chamber can be pressurized to a pressure of at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The chamber can be pressurized to a pressure of at most $10^{-7}$ Torr, $10^{-6}$ Torr, $10^{-6}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The pressure in the chamber can be at a range between any of the afore-mentioned pressure values (e.g., from about $10^{-7}$ Torr to about 1000 bar, from about $10^{-7}$ Torr to about 1 Torr, from about 1 Torr to about 100 Barr, from about 1 bar to about 10 bar, from about 1 bar to about 100 bar, or from about 100 bar to about 1000 bar). In some cases, the chamber pressure can be standard atmospheric pressure. The pressure may be measured at an ambient temperature (e.g., room temperature, 20° C., or 25° C.).

In some embodiments, the enclosure includes an atmosphere. The enclosure may comprise a (e.g., substantially) inert atmosphere. The atmosphere in the enclosure may be (e.g., substantially) depleted by one or more gases present in the ambient atmosphere. The atmosphere in the enclosure may include a reduced level of one or more gases relative to the ambient atmosphere. For example, the atmosphere may be substantially depleted, or have reduced levels of water (i.e., humidity), oxygen, nitrogen, carbon dioxide, hydrogen sulfide, or any combination thereof. The level of the depleted or reduced level gas may be at most about 1 ppm, 10 ppm, 50 ppm, 100 ppm, 500 ppm, 1000 ppm, 5000 ppm, 10000 ppm, 25000 ppm, 50000 ppm, or 70000 ppm volume by volume (v/v). The level of the depleted or reduced level gas may be at least about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the oxygen gas may be at most about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the water vapor may be at most about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the gas (e.g., depleted or reduced level gas, oxygen, or water) may be between any of the afore-mentioned levels of gas. The atmosphere may comprise air. The atmosphere may be inert. The atmosphere may be non-reactive. The atmosphere may be non-reactive with the material (e.g., the pre-transformed material deposited in the layer of material (e.g., powder), or the material comprising the 3D object). The atmosphere may prevent oxidation of the generated 3D object. The atmosphere may prevent oxidation of the pre-transformed material within the layer of pre-transformed material before its transformation, during its transformation, after its transformation, before its hardening, after its hardening, or any combination thereof. The atmosphere may comprise argon or nitrogen gas. The atmosphere may comprise a Nobel gas. The atmosphere can comprise a gas selected from the group consisting of argon, nitrogen, helium, neon, krypton, xenon, hydrogen, carbon monoxide, and carbon dioxide. The atmosphere may comprise hydrogen gas. The atmosphere may comprise a safe amount of hydrogen gas. The atmosphere may comprise a v/v percent of hydrogen gas of at least about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise a v/v percent of hydrogen gas of at most about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise any percent of hydrogen between the afore-mentioned percentages of hydrogen gas. The atmosphere may comprise a v/v hydrogen gas percent that is at least able to react with the material (e.g., at ambient temperature and/or at ambient pressure), and at most adhere to the prevalent work-safety standards in the jurisdiction (e.g., hydrogen codes and standards). The material may be the material within the layer of pre-transformed material (e.g., powder), the transformed material, the hardened material, or the material within the 3D object. Ambient refers to a condition to which people are generally accustomed. For example, ambient pressure may be 1 atmosphere. Ambient temperature may be a typical temperature to which humans are generally accustomed. For example, from about 15° C. to about 30° C., from about −30° C. to about 60° C., from about −20° C. to about 50° C., from 16° C. to about 26° C., from about 20° C. to about 25° C. "Room temperature" may be measured in a confined or in a non-confined space. For example, "room temperature" can be measured in a room, an office, a factory, a vehicle, a container, or outdoors. The vehicle may be a car, a truck, a bus, an airplane, a space shuttle, a space ship, a ship, a boat, or any other vehicle. Room temperature may represent the small range of temperatures at which the atmosphere feels neither hot nor cold, for example, approximately 24° C., 20° C., 25° C., or any value from about 20° C. to about 25° C.

At times, the pre-transformed material is deposited in an enclosure (e.g., a container). FIG. 1 shows an example of a 3D printing system 100 and apparatuses, a (e.g., first) energy source 122 that emits a (e.g., first) energy beam 119. In the example of FIG. 1, the energy beam travels through an optical system 114 (e.g., comprising an aperture, lens, mirror, or deflector). A target surface may be a portion of a hardened material (e.g., 106) that was formed by transforming at least a portion of an exposed surface (e.g., 131) of a material bed (e.g., 104) by a (e.g., scanning) energy beam. In the example of FIG. 1 a (e.g., second) energy beam 101 is generated by a (e.g., second) energy source 121. The generated (e.g., second) energy beam may travel through an optical mechanism (e.g., 120) and/or an optical window (e.g., 115). FIG. 1 shows an example of a container 123. The container can contain the pre-transformed material (e.g., without spillage; FIG. 1, 104). The material may be placed in, or inserted to the container. The material may be deposited in, pushed to, sucked into, or lifted to the container. The material may be layered (e.g., spread) in the container. The container may comprise a substrate (e.g., FIG. 1, 109). The substrate may be situated adjacent to the bottom of the container (e.g., FIG. 1, 111). Bottom may be relative to the gravitational field, or relative to the position of the footprint of the energy beam (e.g., FIG. 1, 101, 108) on the layer of pre-transformed material as part of a material bed. The footprint of the energy beam may follow a Gaussian bell shape. In some embodiments, the footprint of the energy beam does not follow a Gaussian bell shape. The container may comprise a platform comprising a base (e.g., FIG. 1, 102). The platform may comprise a substrate. The base may reside adjacent to the substrate. The pre-transformed material may be layered adjacent to a side of the container (e.g., on the bottom of the container). The pre-transformed material may be layered adjacent to the substrate and/or adjacent to the base. Adjacent to may be above. Adjacent to may be directly above, or directly on. The substrate may have one or more seals that enclose the material in a selected area within the container (e.g., FIG. 1, 103). FIG. 1 shows an example of sealants 103 that hinders (e.g., prevent) the pre-transformed material from spilling from the material bed (e.g., 104) to the bottom 111 of an enclosure 107. The platform may translate (e.g., vertically, FIG. 1, 112) using a translating mechanism (e.g., an actuator, e.g., an elevator 105). The one or more seals may be flexible or non-flexible. The one or more seals may comprise a polymer or a resin. The one or more seals may comprise a round edge or a flat edge. The one or more seals may be bendable or non-bendable. The seals may be stiff. The container may comprise the base. The base may be situated within the container. The container may comprise the platform, which may be situated within the container. The enclosure, container, processing chamber, and/or building module may comprise an optical window. An energy beam may travel through an optical mechanism (e.g., 120). An example of an optical window can be seen in FIG. 1, 115, 135. The optical window may allow the energy beam (e.g., 101, 108) to pass through without (e.g., substantial) energetic loss. A ventilator may prevent spatter from accumulating on the surface optical window that is disposed within the enclosure (e.g., within the processing chamber) during the 3D printing. An opening of the ventilator may be situated within the enclosure 126.

At times, the pre-transformed material is deposited in the enclosure by a layer dispensing mechanism (e.g., FIGS. 1, 116, 117 and 118) to form a layer of pre-transformed material within the enclosure. The deposited material may be leveled by a leveling operation. The leveling operation may comprise using a material removal mechanism that does not contact the exposed surface of the material bed (e.g., FIG. 1, 118). The leveling operation may comprise using a leveling mechanism that contacts the exposed surface of the material bed (e.g., FIG. 1, 117). The material (e.g., powder) dispensing mechanism may comprise one or more dispensers (e.g., FIG. 1, 116). The material dispensing system may comprise at least one material (e.g., bulk) reservoir. The material may be deposited by a layer dispensing mechanism (e.g., recoater). The layer dispensing mechanism may level the dispensed material without contacting the material bed (e.g., the top surface of the powder bed). The layer dispensing mechanism may include any layer dispensing mechanism and/or a material (e.g., powder) dispenser used in 3D printing such as, for example, the ones disclosed in application number PCT/US15/36802, or in patent application Ser. No. 15/435,065, both of which are entirely incorporated herein by references.

In some embodiments, the layer dispensing mechanism includes components comprising a material dispensing mechanism, material leveling mechanism, material removal mechanism, or any combination or permutation thereof. In some configurations, the material dispensing mechanism may comprise a material dispenser. The material dispenser may be operatively coupled to a mechanism that causes at least a portion of the pre-transformed material within the material dispenser to vibrate (also referred to herein as a "vibration mechanism"). Vibrate may comprise pulsate, throb, resonate, shiver, tremble, flutter or shake. The vibration mechanism may include any vibration mechanism used in 3D printing such as, for example, the ones disclosed in Patent Application serial number PCT/US17/57340, filed on Oct. 19, 2017, titled "OPERATION OF THREE-DIMENSIONAL PRINTER COMPONENTS," which is entirely incorporated herein by reference.

In some embodiments, the 3D printer comprises at least one filter. The filter may be a ventilation filter, or a material (e.g., powder) conveyance system filter. The filter may capture fine powder and/or debris from the 3D printing system. The filter may capture materials including debris (e.g., spatter, soot, and/or fume), and/or fine powder. The captured material may be derived from the 3D printing process (e.g., as a by-product). The gas flow system may direct the filter-captured material in a desired direction (e.g., by using positive or negative gas pressure). For example, the gas flow may use vacuum and/or positive pressure (e.g., at different locations along the gas flow system). For example, the gas flow system may use gas blowing.

In some embodiments, the 3D system and/or a passivation system may comprise a filter. The filter may be disposed in a filter housing. The filter may be disposed in a separator. The filter may comprise a paper filter. The filter may comprise a cellulose filter. The filter may be devoid of cellulose. The filter may comprise a high-efficiency particulate arrestance (HEPA) filter (a.k.a., high-efficiency particulate arresting or high-efficiency particulate air filter). The filter may comprise (e.g., may be made from) non-hygroscopic filter materials, e.g., that minimally adsorb water readily (e.g., on the surface), or that minimally absorb water readily from their surrounding such as a chamber in which the filter is disposed (e.g., in the filter housing interior). For example, the filter may comprise (e.g., may be made from) non-hygroscopic filter materials, e.g., that does not measurably adsorb water readily (e.g., on the surface), or that does not measurably absorb water readily (e.g., in the filter interior). The filter may comprise a hygroscopic material. The filter material may be chosen and/or designed such that it minimally (e.g., does not measurably) release oxygen, water or any other oxidizer (such as a halogen), e.g., when heated up. The filter may comprise stainless steel, polypropylene and/or carbon fiber. The filter may comprise a material that is devoid of a monomer that releases oxygen, halogen, and/or water, upon heating, the filter may comprise a hydrophobic material. The filter may be dried prior to its operation and/or passivation. Filter drying may comprise heating and/or vacuuming. The filter drying may be performed in the presence of a desiccant (e.g., molecular sieves or magnesium sulfate, or calcium chloride).

In some embodiment, the filter-captured material requires passivation. In some embodiments, the filter-captured material may be reactive with an oxidizing agent (e.g., oxygen). The passivation of the filter-captured material (e.g., debris) may utilize a passivation system. The passivation system may comprise a dilute mixture of an oxidizing agent an inactive diluent (diluting agent). The oxidizing agent may be a gas. The oxidizing agent may be a mist. The oxidizing agent may comprise oxygen or humidity. The oxidizing agent may react with a surface of the filter-accumulating material to form an oxide. The filter accumulating material may comprise any of the materials disclosed herein that is utilized in the 3D printing to form a 3D object. The diluent may comprise an inert gas (e.g., argon or nitrogen). The diluent gas may be any non-reactive (e.g., inert) gas disclosed herein. The non-reactive gas may be non-reactive with the filter-captured material (e.g., debris and/or fine powder). The passivation system may comprise an inlet for the dilute mixture of the oxidizing agent. The dilute mixture of the oxidizing agent may comprise a gas or a liquid. In some embodiments, the dilute mixture of the oxidizing agent is a gas mixture. The passivation system may comprise a first inlet for the oxidizing agent (e.g., oxygen gas) and a second inlet for the diluent (e.g., Argon or Nitrogen). The passivation system may comprise one or more valves. At least one of the valves may be controlled (e.g., manually or automatically). The valve may be a control valve. The valve may be controlled by a software (e.g., non-transitory computer readable medium) The passivation system may comprise at least one sensor. The sensor may sense a concentration of the oxidizing agent (e.g., oxygen), diluent (e.g., Argon and/or nitrogen), or oxidation product (e.g., hydrogen). The passivation system may comprise a plurality of sensors. At least two of the plurality of sensors may be the same. At least two of the plurality of sensors may be different. The sensor may sense a relative concentration of the oxidizing agent, reaction product, and/or dilution, in the passivation mixture. For example, the sensor may sense a relative pressure, concentration and/or percentage of oxygen in the passivation gas mixture. For example, the sensor may sense a relative pressure, concentration and/or percentage of Argon in the passivation gas mixture. For example, the sensor may sense a relative pressure, concentration and/or percentage of hydrogen in the passivation gas mixture. The passivation system may comprise one or more controllers to control the relative amount of oxidizing agent to diluent in the passivation mixture. The one or more controllers may control the valve(s). The one or more controllers may utilize the sensor signal in a feedback control scheme to control the relative amount of the constituents in the mixture. The sensor may sense a passivation mixture constituent (e.g., oxidizing agent or diluent) before being introduced to a chamber in which the filter is disposed (e.g., filter housing or separator). The sensor may sense a passivation mixture constituent (e.g., oxidizing agent or diluent) after being introduced to a chamber in which the filter is disposed (e.g., filter housing or separator). The sensor may be disposed before, and/or after the passivation chamber (e.g., chamber in which the filter is disposed). The passivation system may comprise one or more passivation chambers. The passivation system may comprise an exhaust. The sensor may be deposed prior to the mixture being expelled from the exhaust. The passivation system may be a standalone system. The passivation system may be integrated in the 3D printing system.

In some embodiments, the 3D printing system may comprise an in-situ passivation system. The in-situ passivation system may integrate its sensors along the gas conveyance system of the 3D printer. The in-situ passivation system may introduce the oxidizing mixture into components of the 3D printer including the processing chamber, filter housing, and/or separator. The passivation system may comprise any of the passivation components described herein (e.g., valve such as control valve, sensor, heat exchanger, exhaust, and/or pump). Examples of gas conveyance system and components (including control components) can be found in patent application serial number PCT/US17/60035, which is incorporated herein by reference in its entirety.

In some embodiment, the passivation in an ex-situ passivation. The ex-situ passivation may be performed outside of the 3D printing system. The ex-situ passivation may be performed after the 3D object has been removed from the 3D printing system. The 3D object may be disposed in a build module that has been separated and/or removed from the processing chamber. In some embodiments, the filter to be passivated is removed from the 3D printing system and inserted into the passivation system prior to its passivation. The filter may be inserted into a passivation chamber. The filter housing may be inserted into the passivation chamber. The passivation system may be configured to attach to the filter housing. The filter housing may server as a passivation chamber, once it is connected to the passivation system. The passivation system may be configured to attach to the separator (containing the filter). The separator may be a cyclonic separator. The separator housing may server as a passivation chamber, once it is connected to the passivation system, the passivation mixture (e.g., inert gas/O2 mixture (e.g. $Ar/O_2$) may be directed to flow through and/or engulf the filter media.

In some embodiments, the passivation system may control a level of the oxidizing agent below a threshold. The oxidizing agent in the oxidizing mixture (e.g., oxygen) may be kept below a threshold (e.g. below 2000 ppm), e.g., by using one or more controllers. The controllers may have logic inscribed therein (e.g., in the form of software such as non-transitory computer readable media). The oxidizing agent in the oxidizing mixture may be kept below a threshold such that reaction of the gas mixture with the filter accumulated material (e.g., debris) is does not breakdown the filter media. The oxidizing agent in the oxidizing mixture may be kept below a threshold such that reaction of the gas mixture with the filter accumulated material (e.g., debris) does not exceed a temperature threshold (e.g., below about 200° C.) at which the filter breaks down and/or releases oxidizing agent(s). The passivation system may include a flow of gas and/or liquid to cool the filter-accumulated material that is being oxidized by the oxidizing agent. For example, the passivation system may comprise a flow of the oxidizing mixture (e.g., gas mixture) through and/or surrounding the filter that may cool the filter and/or reaction occurring on or adjacent to the filter. For example, the passivation system may comprise a flow of the oxidizing mixture through the passivation chamber, that may cool it (e.g., during passivation of the filter therein). The oxidizing mixture may be cooled prior to its entry to the passivation chamber. A temperature of the oxidizing mixture may be controlled (e.g., by cooling) before entry into the passivation chamber and/or after exiting the passivation chamber. Temperature control of the oxidizing mixture may be by one or more controllers. The passivation system may comprise at least one temperature sensor disposed before and/or after the passivation chamber. The passivation system may comprise at least one temperature sensor disposed before the oxidizing mixture exits the passivation system (e.g., through the exhaust).

In some embodiments, the oxidizing agent (e.g. oxygen) may be kept below a first threshold (e.g., to prevent reaction runway). In some embodiments, the oxidizing agent (e.g. oxygen) may be kept above a second threshold (e.g., to allow passivation). In some embodiments, the passivation mixture used to passivate the filter-accumulated material containing a diluent and at least one oxidizing agent (e.g., $O_2$ and/or water). At least one oxidizing agent in the mixture may be kept below the first threshold. The first threshold may be of at most 2000 ppm, 1500 ppm, 1000 ppm, 500 ppm, 100 ppm, or 50 ppm of oxidizing agent (e.g., $O_2$). The first threshold may be of at most any value of oxidizing agent between the aforementioned values (e.g., from 2000 ppm to 1000 ppm, from 1500 ppm to 500 ppm, from 500 ppm, to 50 ppm, or from 100 ppm to 50 ppm). At least one oxidizing agent in the mixture may be kept above the second threshold. The second threshold may be of at least about 0.5 ppm, 1 ppm, 2.5 ppm, 5 ppm, 10 ppm, 25 ppm, 50 ppm, 75 ppm, or 100 ppm of oxidizing agent (e.g., $O_2$). The second threshold may be of at least any value of oxidizing agent between the aforementioned values (e.g., from 0.5 ppm to 100 ppm, from 0.5 ppm to 50 ppm, from 25 ppm, to 75 ppm, or from 50 ppm to 100 ppm). A sensor (e.g. oxygen sensor) may be employed to provide information. The information (e.g., sensor data) may be utilized by the control system (e.g., by the control valve controller(s)) to control a requested (e.g. constant) level of the oxidizer in the passivation mixture. The first threshold (e.g., maximum oxidizing level threshold) may be higher in the ex-situ passivation system as compared to the in-situ passivation system. Higher may be by at least about 100 ppm, 250 ppm, or 500 ppm. The second threshold (e.g., minimum oxidizing level threshold) may be higher in the ex-situ passivation system as compared to the in-situ passivation system. Higher may be by at least about 5 ppm, 10 ppm, or 50 ppm.

In some embodiments, one or more sensors sensing the oxidizer(s) can be utilized. The sensors can be operatively coupled to the conduits through which the oxidizer is transported throughout the 3D printing system and/or passivation system. At times, reaction product(s) of the oxidation reaction may damage the sensor (e.g., oxygen lambda sensors). The sensor may be selected to have minimal sensitivity to the oxidation reaction products. At times, the oxygen sensor can be different from a lambda sensor.

In some embodiments, the passivation system is integrated (in situ) in the 3D printing system. The in-situ passivation system may be utilized during operation of the 3D system (e.g., during printing and/or between material dispensing operation(s) (e.g., between recoats)). In the in-situ passivation system, the controller(s) (e.g., controlling the safety interlock) may be employed to disable the energy sources (e.g. lasers), e.g., when the level of the oxidizing agent is measured below the minimum threshold value and/or above the maximum threshold value. In the in-situ passivation system, the passivation chamber may include the filter housing, separator, and/or processing chamber. The introduction of the passivating mixture and/or agent may be disposed downstream of the processing chamber. The introduction of the passivating mixture and/or agent may be disposed upstream of a filter housing and/or separator. The sensor(s) may be disposed downstream of the insertion position of the oxidizing agent and/or mixture. The sensor(s) may comprise the temperature, hydrogen, diluent, or oxidizing agent sensor(s) (e.g., $O_2$ and/or humidity sensors), The sensor(s) may be disposed upstream of filter housing and/or separator. The sensor(s) may be disposed downstream of filter housing and/or separator. The sensor(s) may be disposed upstream of the processing. The sensor(s) may be disposed in the processing chamber.

In some embodiments, the passivation system comprises a restrictor. The restrictor may be manually and/or automatically controlled. The automatic control may be by a controller. The restrictor may limit an amount of the mixture into the passivation chamber and/or any of the mixture constituents (e.g., oxidizing agent and diluent). For example, the rate of oxygen ($O_2$) introduction into the system may be limited by a physical device such as a restrictor. The restrictor may ensure that (e.g., even under the most extreme conditions) the system will experience influx of level and/or rates of oxidizing agent that are above their thresholds. The oxidizing agent may be stored in a tank (e.g., cylinder) containing the oxidizing gas (e.g., oxygen gas) or a mixture thereof (e.g., air such as dry air). The oxidizing agent may be generated in a generator. The generator may comprise an oxygen generator generating $O_2$, e.g., by air purification and/or drying. The generator may comprise a humidifier generating humidity as the oxidizing agent.

In some embodiments, the flow rate of mixture, oxidizing agent, and/or diluent into any component of the passivation system may be controlled manually and/or automatically (e.g., using controller(s)). The flow rate may have a threshold. The maximum flow rate threshold of the oxidizing agent into the passivation system (or any components thereof) may be at least about 1 milliliter per minute (ml/min), 50 ml/min, 100 ml/min, 250 ml/min, 500 ml/min, 750 ml/min or 1000 ml/min. The maximum flow rate threshold of the oxidizing agent into the passivation system (or any components thereof) may be of any value between the aforementioned values (e.g., from about 1 milliliter per minute (ml/min) to about 1000 ml/min, from about 1 ml/min to about 500 mlmin, or from about 500 ml/min to about 1000 ml/min). The component may comprise the filter housing, processing chamber (in an in-situ passivation system), separator, or any other passivation chamber.

In some embodiments, the passivation system may comprise a valve. The valve may be an on/off valve. The valve may be controlled manually and/or automatically (e.g., by controller(s)). The valve may comprise a proportional control valve. The valve may be controlled at least in part by a mass flow controller.

In some embodiments, the passivation chamber is coupled to a gas conveyance system that conveys gas(es) in loop. The gas conveyance system (also herein "gas circulation system) may comprise at least one pump. The pump may propel the gas(es) in the gas conveyance system (e.g., comprising one or more tubes). The tube may comprise a metal (e.g., an elemental metal or a metal alloy), a polymer, a resin, or an allotrope of elemental carbon. The pump may be a pressure pump. The pump may be a vacuum pump. The pump may be any pump disclosed herein. The gas(es) may flow from at outlet of the passivation chamber, through the gas conveyance system, and to the passivating inlet, e.g., by utilizing the pump. Usage of the loop may reduce consumption of the gas(es) as compared to a gas conveyance system that does not reuses the gasses let out of the passivation chamber (e.g., and rather allows the gas(es) to expel from the passivation chamber after a single visit therein. The circulation system may be separated from the passivation chamber(s) by at least one valve. The valve can be manually and/or automatically controlled (e.g., using controller(s)). The control may utilize readings from the sensor(s), e.g., suing a feedback control scheme.

The passivation system may comprise one or more sensors (e.g., oxygen, hydrogen, humidity, argon, nitrogen, gas follow, halogen, or temperature sensors). The sensors may be disposed along the gas conveyance system (e.g., along the gas stream). The sensor may monitor a temperature change induced by the oxidation reaction of the filter accumulated material. The passivation system may comprise a heat exchanger. The heat exchanger may be located in the gas circulation, e.g., to remove heat from the gas(es) and/or to adjust the temperature of the gas. The sensor (e.g. hydrogen sensor) may be placed on the filter outlet. The sensor may monitor evidence of filter media breakdown, (e.g., oxygen, humidity, halogen expulsions). The heat exchanger may be integrated in the gas circulation system to remove heat from the gas(es) flowing therein. The heat exchanger may be utilized to reduce occurrence (e.g., avoid) heat accumulation in the passivation system and/or heat produced in an oxidation reaction, e.g., with the material collected on the filter that is disposed in the passivation system.

In some embodiments, the passivation system and/or gas conveyance system may comprise a safety interlock. The safety interlock may be employed to (e.g., automatically) control (e.g., increase, reduce, or shut off) incoming flow of at least one component of the passivation mixture (e.g., an oxidizing agent such as oxygen gas). The safety interlock may be employed to automatically close the recirculation valve in the event of levels of the oxidizing agent (e.g., oxygen) above a threshold, e.g., to prevent reaction runway. The control may be based at least in part on outputs from sensors (e.g. thermocouples, hydrogen sensors, pressure sensors and/or mass flow sensors). The diluent line (e.g., inert gas bleed line) may comprise at least one value such as a check valve. The check valve may facilitate operating of the gas conveyance system and/or passivation system in a pressure above ambient pressure. The pressure in the gas conveyance system and/or passivation system may be any pressure disclosed herein for the enclosure (e.g., of the 3D printing system). The passivation system may comprise an (e.g., in-line process) gas scrubber utilized, e.g., to pull water (e.g., humidity) and/or hydrogen ($H_2$) out of the gas mixture and/or gas flow. The gas scrubber may be disposed along the gas conveyance system. At least one sensor may be placed downstream or upstream of the passivation chamber. The safety interlock may utilize information from any sensor disclosed herein (e.g., oxygen sensor, hydrogen sensor, and/or temperature sensor).

When the passivation system is an in-situ passivation system incorporated into the 3D printer, the safety interlock may be employed to automatically disable the energy beam(s), e.g., in the event of high oxygen levels. Disabling the energy beam from for forming a 3D object may comprise (i) shutting the power to the energy source (e.g., laser) generating the energy beam, (ii) controlling the energy source to halt generating the energy beam, (iii) reducing the power of the energy beam such that the energy bream is unable to transform any material to form the 3D object, or (iv) moving a position of the energy beam such that the energy beam is unable to transform any material to form the 3D object.

In some embodiments, the passivation system may operate at a pressure above ambient pressure. The pressure along there passivation system (e.g., along the gas circulation system) may be constant or substantially constant. For example, gas circulation rate in the system may be set at such a rate to facilitate no measurable pressure drop, or a minimal pressure drop. For example, pressure drop in the passivation chamber (e.g., around the filter media having the material to be passivated), may be at most a threshold. The pressure drop may be of at most about 1Kilopascals (KPa), 5 KPa, 10 KPa, 15 KPa, or 20 KPa. 1-20 kPa. The pressure drop may be at most any value between the aforementioned values (e.g., from about 1 KPa to about 20 KPa, from about 1 KPa to about 10 KPa, or from about 10 KPa to about 20 KPa). Maintaining pressure above an ambient pressure in the passivation system may reduce a likelihood of any uncontrolled level of oxidizing species (e.g., external oxygen and/or humidity) from entering the passivation system (e.g., the passivation chamber), e.g., and cause a runway reaction. A runway reaction may comprise an oxidation reaction that causes harm to the passivation system (or components thereof), causes harm to by standing personnel, reaches temperatures above the jurisdictional safety standard(s), and/or is difficult to control. Maintaining pressure above an ambient pressure in the passivation system may increase a likelihood of passivation a large member of non-passivated surface of the filter-accumulated material (e.g., debris such as soot and pre-transformed material powder). Maintaining pressure above an ambient pressure in the passivation system may reduce a likelihood of pockets in the material to be passivated, that are not passivated. Such non-passivated pockets may, when contacted with high concentration of oxidizing agent (e.g., water or ambient air), react in a runway reaction outside of the passivation system (e.g., when a user extracts the filter from the passivation system). Maintaining pressure above an ambient pressure in the passivation system may increase a likelihood of complete passivation of the filter-accumulated material (e.g., reaching complete reaction state).

In some embodiment, material accumulated on a filter during the 3D printing is passivated in a passivation system. The passivation system can be separate from the 3D printing system (and referred to as ex-situ passivation system). The passivation system can be incorporated into the 3D printing system (and referred to as in-situ passivation system).

In some embodiments, the passivation system may comprise, or be operatively (e.g., communicatively) coupled to a data acquisition system. The data acquisition system may comprise a processor. The data acquisition system may be operatively (e.g., communicatively) coupled to the sensor(s) and/or valves of the passivation system. The data acquisition system may facilitate control (e.g., monitor) readings from sensor(s) related to the passivation system. The gas circulation system may control introduction of a diluent (e.g., Argon) to the passivation system to adjust the concentration of the oxidizing agent therein, e.g., in the gas circulation system. Adjustment may be using the data application system, such that a level of the oxidizing agent is below its maximum threshold and above its minimum threshold (forming together a threshold window from a maximum threshold value to a minimum threshold value). Once the mixture in the gas circulation system is found adequate, the data acquisition system may communicate and/or control a valve to opened to allow influx of the mixture into the passivation chamber. Opening the valve between the gas circulation system and the passivation chamber may allow exposure of the filter to the passivation mixture (in its requested relative ratios of oxidizer(s) and diluent). If a ratio of the oxidizing agent to diluent falls outside of the requested threshold window, a valve may be actuated to bring the mixture contents ratio (e.g., $Ar/O_2$) to a requested ratio. Such mixture adjustment can occur before passivation or during passivation. Such mixture adjustment can occur when the passivation is engaged and/or disengaged from the gas circulation system. The data acquisition system may control (e.g., direct) the sensor(s) to take readings intermittently, continuously, at (e.g., predetermined) intervals, or randomly. The data acquisition system may control (e.g., direct) the sensor(s) to take readings before, during, and/or after passivation of the filter-accumulated material. The data acquisition system may control (e.g., direct) the sensor(s) to take readings during operation of the filter-accumulated material. In an in-situ passivation system, the data acquisition system may control (e.g., direct) the sensor(s) to take readings before, during (e.g., in rea time), and/or after the 3D printing. During the 3D printing may comprise during irradiation of the energy beam(s), during transformation of the pre-transformed material to the transformed material, during operation (e.g., translation and/of irradiation) of the energy beam(s), during operation of the platform actuator (e.g., elevator), during operation of the leveling system (e.g., recoater), or any combination thereof. The sensor measurement interval may be at most about every 60 min, 45 min, 30 min, 25 min, 15 min, 10 min, 5 min, or 1 min. The data acquisition system may analyze (e.g., integrate, divide, combine, contrast, and/or compare) data from a plurality of sensors. Analyze may comprise a Boolean or an arithmetic operation. At least two of the plurality of sensors may be of the same type. At least two of the plurality of sensors may be of a different type.

For example, during the ramping up of oxygen in the gas mixture, a first temperature sensor (e.g. thermocouple) may detect temperature at a gas ingress location through which the gas mixture passes into the passivation chamber, and a second temperature may be detected by a second temperature sensor disposed at an egress of the gas from the passivation chamber. The data acquisition system may compare temperature values detected by these two sensors and search for a higher temperature detected by the second temperature sensors as compared to the first temperature sensors, that is above a difference threshold, indicative of an unsafe passivation condition (or emergence thereof). The data acquisition system may send a notice, an alert and/or adjust an operation of at least one valve, sensor, diluent flux, oxidizer flux, mixture temperature, gas temperature, or any combination thereof. In an in-situ passivation system, the data acquisition system may adjust one or more components associated with printing of the 3D object (e.g., as delineated herein). Once the temperature detected by the first sensor equates, or substantially equates (e.g., within an error range of the measurement and/or sensor calibration) the temperature detected by the second sensor, the data acquisition system may conclude that the oxidation reaction has been (e.g., substantially) completed, that it is safe for a user to extract the filter from the passivation system, and/or that the filter (e.g., material accumulated thereon) has been passivated. Once the filter has been passivated, e.g., to a safely handleable level, a user may flood it with water and/or expose it to the ambient environment (e.g., air).

For example, during the ramping up of oxygen in the gas mixture, a temperature sensor (e.g. thermocouple) may detect temperature upstream of the passivation chamber (such as at a gas egress location from passivation chamber or at an exhaust of the passivation system), and a hydrogen sensor may be detected upstream of the passivation chamber. The data acquisition system may consider values of the temperature sensor and of the hydrogen sensor to determine the stage of the passivation reaction. For example, a low temperature coupled by a high hydrogen level may indicate initiation of the reaction. For example, a high temperature coupled by a high hydrogen level may indicate mid reaction stage, that may optionally necessitate reduction of the temperature and/or oxidizing agent level to prevent a runway reaction. For example, a high temperature coupled by a low hydrogen level may indicate end reaction stage, that may benefit from cooling the passivation mixture and/or gas flow. For example, a low temperature coupled by a low hydrogen level may indicate end reaction stage, that may allow increase in the oxidizing agent to ensure completion of the reaction. The data acquisition system may then send a notice, alert, and/or adjust an operation of at least one valve, sensor, diluent flux, oxidizer flux, mixture temperature, gas temperature, or any combination thereof. In an in-situ passivation system, the data acquisition system may adjust one or more components associated with printing of the 3D object (e.g., as delineated herein). The data acquisition system may deduce (from the sensor measurements) that the passivation has completed, that it is safe for a user to extract the filter from the passivation system, and/or that the filter (e.g., material accumulated thereon) has been passivated. Once the filter has been passivated, e.g., to a safely handleable level, a user may flood it with water and/or expose it to the ambient environment (e.g., air).

In some embodiments, the passivation system is part of the 3D printing system. The gas conveyance system of the passivation system is part of the gas conveyance system of the 3D printing system. In some embodiments, the passivation system is utilized to passivate any newly forming debris such that (I) debris generated by the 3D printing process is at least partially passivated (e.g., to reduce likelihood of combustion in the 3D printer) and/or (II) material accumulated (e.g., collected) in the filter is at least partially passivated. The passivation system is utilized to passivate any newly forming debris such that material accumulated (e.g., collected) in the filter is (i) less combustive, (ii) can be handled safely by an operator once extracted from the 3D printer (e.g., from the filter housing), (iii) can be exposed to an ambient environment in a safely manner (e.g., without being ignited), and/or (iv) can be safely passivated with a more aggressive passivator (e.g., water) as compared to the passivation mixture (e.g., Argon and oxygen).

Figure 4:
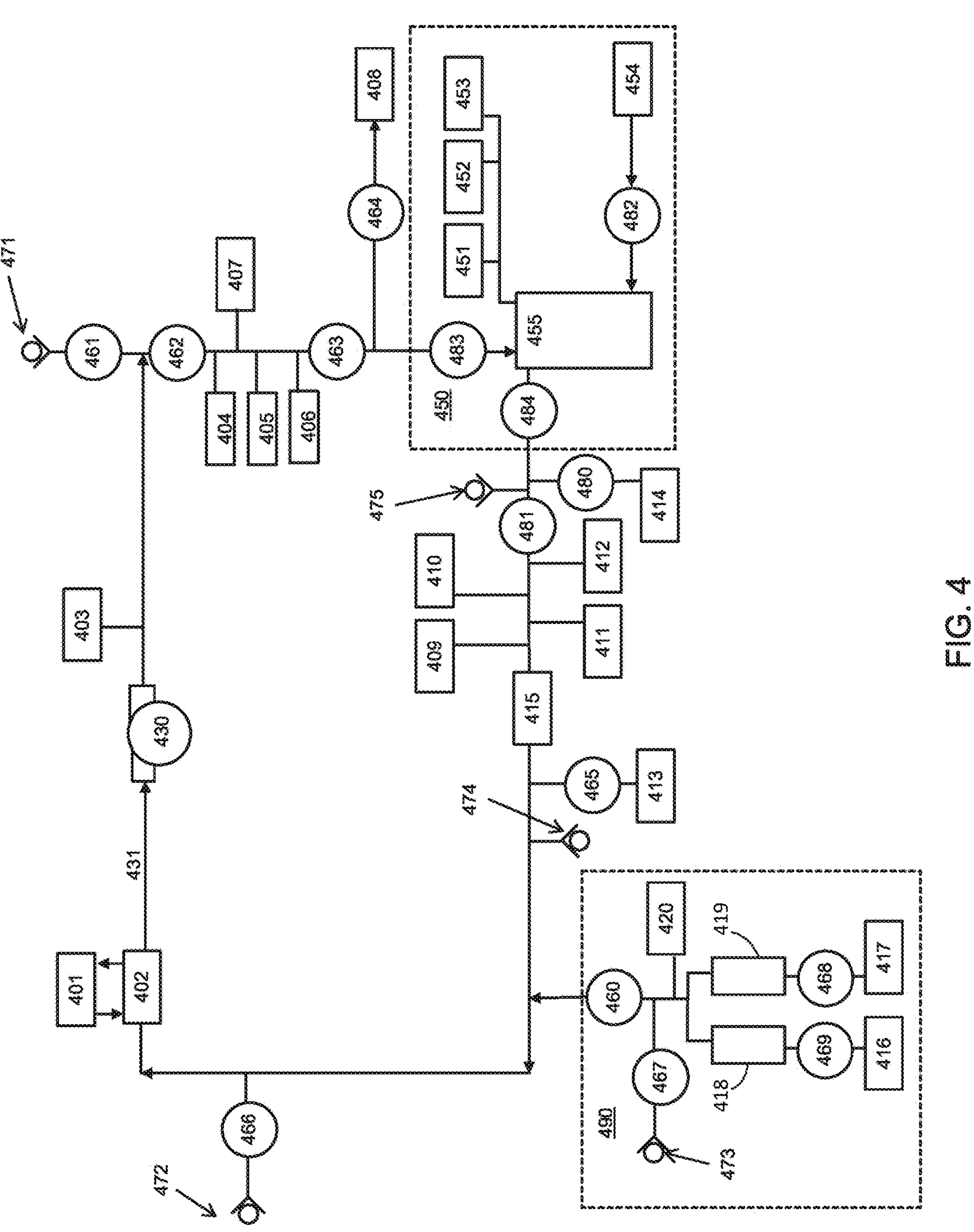
FIG. 4 schematically illustrates components of a passivation system.

FIG. 4 shows an example of an ex-situ passivation system in which 455 is the passivation chamber; valves 463, 464, 482, 483, 484 (e.g., manual valves, and/or butterfly valves), 461, 416, 417, 467 (e.g., manual gate valves), 466 (e.g., metering valve), 481, 462 (e.g., pneumatic butterfly valves), 471, 472, 473, 474, 475 (e.g., check valves) 480, 465, 460 (e.g., solenoid valves), 451, 452, and 453 (e.g., safety exhaust valves that can be triggered by the same or by different pressure thresholds); a temperature adjusting mechanism (e.g., chiller and/or heater) 401; a heat exchanger 402; a pump 430 (e.g., gas pump); sensors 403, 407, 411 (e.g., pressure sensors), 404 (e.g., hydrogen sensor), 405, 409, 420 (e.g., oxygen sensors), 406, 410 (e.g., temperature sensors), 412 (e.g., relative humidity sensor), and 415 (e.g., mass flow meter); gas (e.g., diluent) source 413; controllers 418 (e.g., mass flow controller controlling flow of the diluent, oxidizing agent, and/or passivation mixture); gas flow conduits such as 431; a more aggressive passivator 454 (e.g., water); expulsion reservoir for any (e.g., liquid) byproducts (e.g., water); and a sub system where the passivation mixture is generated 490.

The passivation system may include one or more valves. At least two of the valves may be different from each other (e.g., of a different type). At least two of the valves may be of the same type. At least one valve may be a manual valve. At least one valve may be an automatic valve (e.g., automatically controlled valve). At least one valve may be an automatic valve and a manual valve. At least one valve may be native to the filtration housing and/or separator (e.g., 482-483). At least a portion of the passivation system (e.g., 450) may be at a pressure above ambient pressure. At least one valve in the passivation system may facilitate testing of the passivation mixture, passivation progress, and/or passivation status (e.g., valve 473). For example, the gas flow in the passivation mixture can be tested by allowing it to flow through an exhaust valve before it enters a conduit that facilitates flow of the passivation mixture into the passivation chamber.

Figure 5:
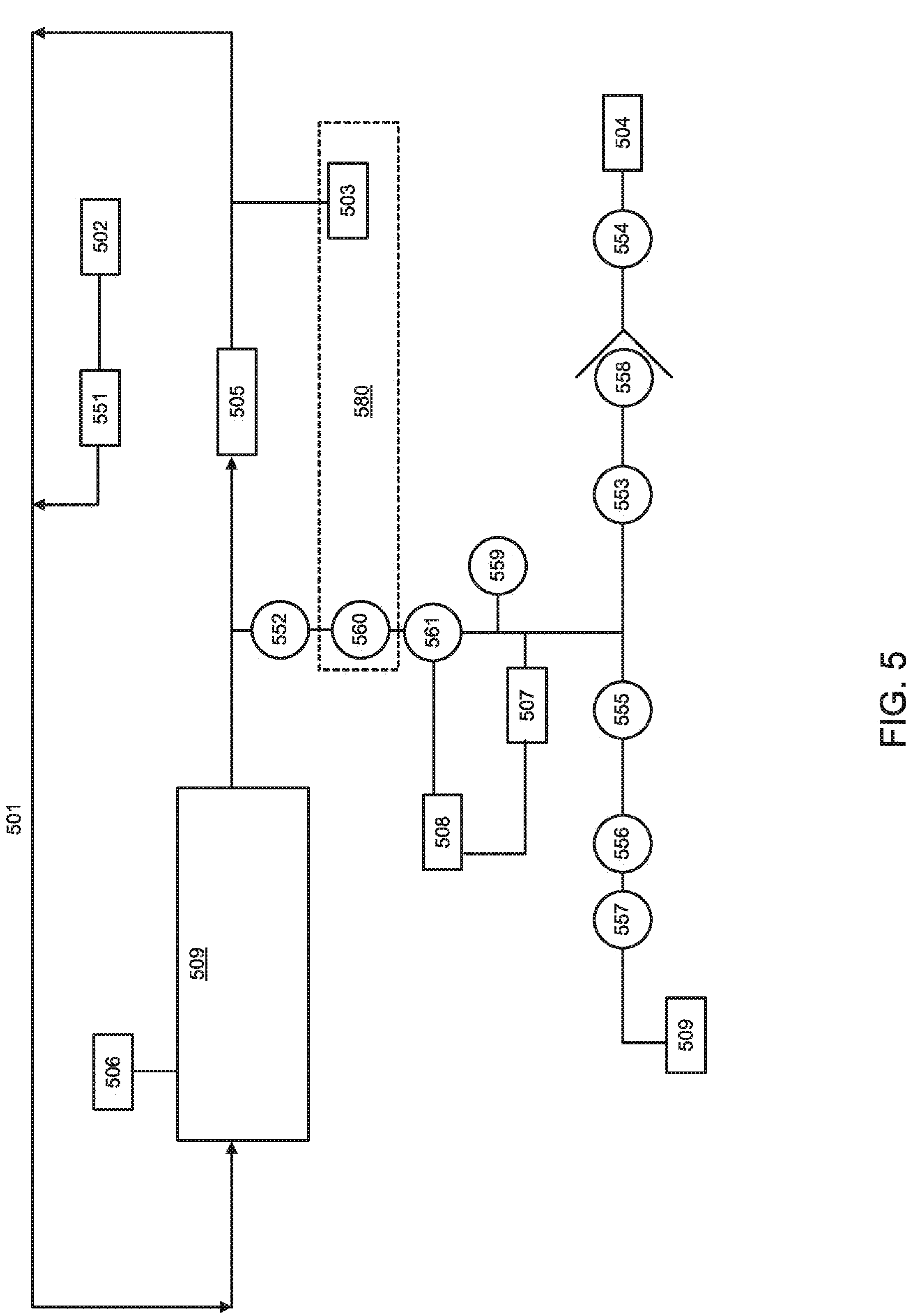
FIG. 5 schematically illustrates components of a passivation system.

FIG. 5 shows an example of an in-situ passivation system in which 509 is the processing chamber in which the 3D object is being created; valves 557 (e.g., manual valve, and/or butterfly valve), 553, 555 (e.g., metering valves, and/or restrictor valves), 554, 556, 559, 560, 561 (e.g., solenoid valves), 558 (e.g., check valve); sensors 506, 503, 507 (e.g., oxygen sensors), and 552 (e.g., mass flow meter); gas sources 502, 504 (e.g., diluent such as Argon), 509 (passivation agent such as oxygen); controllers 551 (e.g., pressure controller); gas flow conduits such as 501; filter 505; a controller (e.g., safety interlock system) 508. One or more sensors and/or valves may be operatively (e.g., communicatively) coupled to a control system (e.g., 580). The controller can comprise hardware or be devoid of hardware. The controller may be a mechanical controller. The controller may not rely on software to control the system (e.g., valve). The controller may react immediately. The controller may comprise an interlock system (e.g., safety interlock system).

In some embodiments, the passivation system may comprise a controller. The controller may have a state of two mechanisms, two functions, or a mechanism and a function, be mutually dependent. The controller may be utilized to prevent undesired states in an apparatus (e.g., system) having finite states. The controller may facilitate protection of a user from harmful consequences to the machinery and/or to the user. The controller may facilitate safe usage of the machine (which safety is of the user and/or of the machine). The controller may include circuitry (e.g., electrical circuitry). The controller may comprise a mechanical component (e.g. a mechanical switch or valve). The controller may prevent one mechanical element (e.g., valve) from changing its state (e.g., open or closer) due to the state of another element (e.g., state of another valve, and/or sensor reading relative to a threshold).

Figure 6:
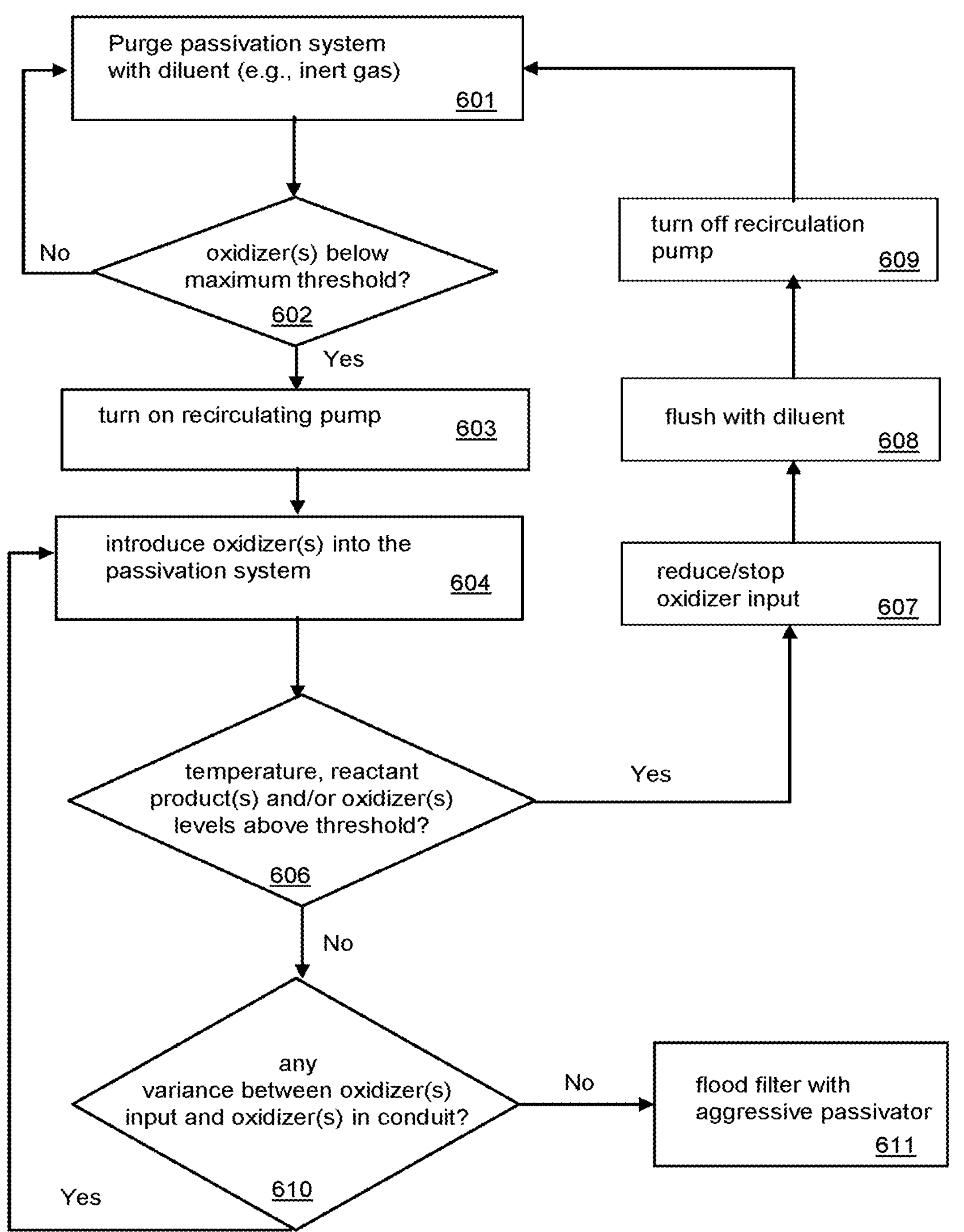
FIG. 6 illustrates a flow chart related to passivation.

The passivation of the filter accumulated material may comprise one or more operations. FIG. 6 shows an example of a flow diagram depicting operations in an ex-situ passivation process including operation 601 in which the passivation system is purged with a diluent (e.g., gas such as an inert gas, e.g., Argon). The diluent may comprise a minimal amount oxidizing agent(s). The minimal amount may be at most about 5 ppm, 10 ppm, 25 ppm, 50 ppm, or 75 ppm oxidizing agent in the diluent. The passivation system checks (e.g., via sensor(s) coupled to a control system) whether the oxidizing agent(s) (e.g., also herein termed “oxidizer(s)”) are in a level that is below a maximum threshold in operation 602. If the level of oxidizer(s) is not below the maximum threshold, then purging of the diluent continues (e.g., go to operation 601). If the oxidizer(s) level is below the maximum threshold, then the oxidizer(s) are introduced into the passivation system in operation 604. The oxidizer(s) can be introduced in a passivation mixture (e.g., oxidizer(s) and diluent mixture) or as neat oxidizer(s) (e.g., devoid of diluent). The passivation system checks (e.g., via sensor(s) coupled to a control system) whether the oxidizing agent(s), temperature, and/or reaction product(s) (e.g., hydrogen) are in a level that is above a maximum threshold in operation 606. If the level of any of oxidizer(s), reaction product(s), and temperature is above the maximum threshold, then (i) reduce or stop introduction of oxidizer(s) into the passivation system in 607, (ii) flush the passivation system with diluent in 608, and (iii) turn off the recirculation pump. If the level of any of oxidizer(s), reaction product(s), and temperature is not above the maximum threshold, then the passivation system checks (e.g., via sensor(s) coupled to a control system) whether there is any detectable variation between the a level of the oxidizer(s) in the passivation mixture that enters the passivation chamber, and the level of oxidizer(s) in the passivation mixture that exits the passivation chamber in operation 610. If there is no variance, then the filter is flooded with an aggressive passivator(s) (e.g., water) in operation 611, e.g., to ensure complete passivation. If there is any (e.g., detectable) variance, or a variance above a threshold, then oxidizer(s) are introduced into the system in 604 to continue the passivation process. The diluent can be a mixture of diluents (e.g., argon and nitrogen mixture).

Figure 7:
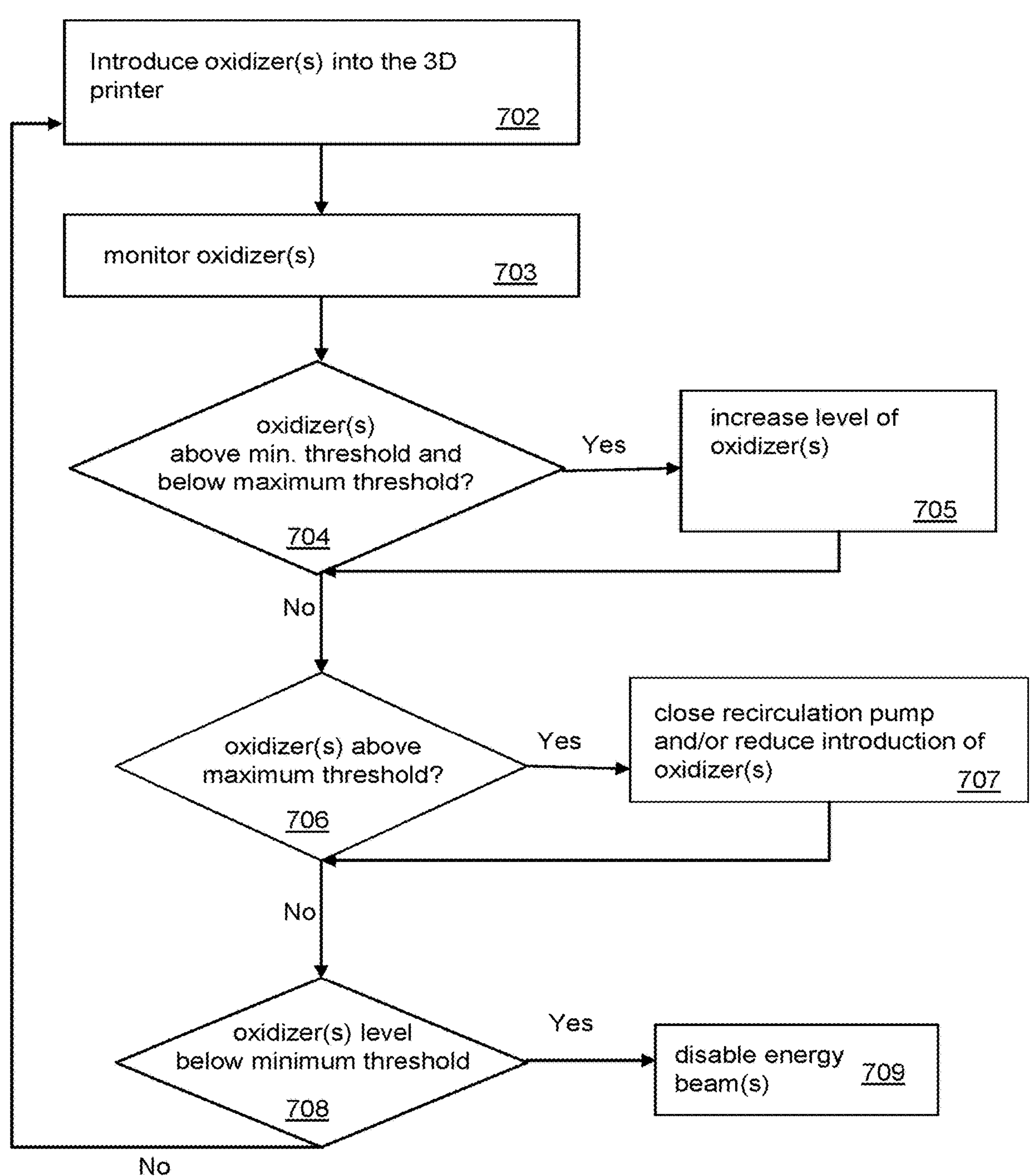
FIG. 7 illustrates a flow chart related to passivation.

FIG. 7 shows an example of a flow diagram depicting operations in an in-situ passivation process during printing of one or more 3D objects. In operation 702, oxidizer(s) are introduced into the 3D printing system (e.g., a controlled amount of oxidizer(s)). The oxidizer(s) can be introduced into the gas flow system and/or directly into the processing chamber. The passivation system (e.g., as part of the 3D printing system or operatively coupled thereto) monitors (e.g., via sensor(s) coupled to a control system) the oxidizer(s) level. The passivation system analyzes (e.g., using sensor(s) coupled to a control system) whether the level of oxidizer(s) is above a minimum threshold and below a maximum threshold (e.g., level of oxidizer(s) within requested concentration window) in operation 704. If the levels of oxidizer(s) is within the window, the oxidizer(s)

level is increased in operation 705, and the passivation system continues to analyze the oxidizer(s) level in 704. If the levels of oxidizer(s) is outside of the window, the passivation system analyzes (e.g., using sensor(s) coupled to a control system) whether the level of oxidizer(s) is above a maximum (e.g., safety) threshold in operation 706, then in operation 707 (i) the circulation pump is shut and/or (ii) introduction of oxidizer(s) is reduced or stopped. If the levels of oxidizer(s) is outside of the window, the passivation system analyzes (e.g., using sensor(s) coupled to a control system) whether the level of oxidizer(s) is below a minimum threshold in operation 708. If the levels of oxidizer(s) is below the minimum threshold, then the energy beams forming the 3D object(s) are disabled (e.g., cease transforming any pre-transformed material to transformed material, e.g., cease producing debris such as soot) in operation 709. If the levels of oxidizer(s) is above the minimum threshold, then oxidizers(s) are introduced into the passivation system. Operations 706 and 708 can be performed sequentially or simultaneously (e.g., in parallel). For example, operation 706 can be performed before or after operation 708. The operations depicted in FIG. 7 can occur during one printing cycle or a plurality of printing cycles.

In some embodiments, the 3D printing system comprises a pre-transformed material conveyor system. The pre-transformed material conveyor system may be operatively coupled to a processing chamber, a build module, an ancillary chamber, a layer dispensing mechanism and/or a recycling mechanism. The one or more components of the pre-transformed material conveyor system may be replaceable, exchangeable, and/or modular.

In some examples, the pre-transformed material conveyor system comprises a (e.g., optional) separator. The pre-transformed material conveyor system may comprise a plurality of separators. The separator may be exchangeable, replaceable, and/or modular. The separator may separate between a gas and a pre-transformed material. The separator may separate between various sizes (or size groups) of particulate material. The separator may separate between various types of material. The separator may comprise separation, sorting, and/or reconditioning the pre-transformed material. The separator may comprise a cyclonic separator, velocity reduction separator (e.g., screen, mesh, and/or baffle), and/or a separation column. The separator may utilize a gravitational force. The separator may utilize an artificially induced force (e.g., pneumatic, electronic, magnetic, hydraulic, and/or electrostatic force). The cyclonic separator may comprise using vortex separation. The cyclonic separator may comprise using centrifugal separation. The separator may include any material separator used in 3D printing such as, for example, the ones disclosed in patent application Ser. No. 15/374,318, filed on Dec. 9, 2016, titled "SKILLFUL THREE-DIMENSIONAL PRINTING," or in Patent Application serial number PCT/US16/66000, filed on Dec. 9, 2016, titled "SKILLFUL THREE-DIMENSIONAL PRINTING," each of which is entirely incorporated herein by reference. The separator may comprise a filter (e.g., sieve, column, and/or membrane). The separation may comprise separating the pre-transformed material from debris and/or gas. The pre-transformed material may be sorted as to material type and/or size. The pre-transformed material may be sorted using a gas classifier that classifies gas-borne material (e.g., liquid, or particulate) material. For example, using an air-classifier. For example, using a powder gas classifier. The reconditioning may comprise removing of an oxide layer forming on the pre-transformed material. Reconditioning may comprise physical and/or chemical reconditioning. The physical reconditioning may comprise ablation, spattering, blasting, or machining. The chemical reconditioning may comprise reduction. The separator and/or filter may be controlled. The controlling may be done manually and/or automated. Controlling may be performed before, after, and/or during at least a portion of the 3D printing. Controlling may be performed during, before and/or after the operation of the pre-transformed material conveyor system. The separator may comprise a sensor. The sensor may detect a system state of the separator. The sensor may detect the velocity of the pre-transformed material and/or gas during operation. In some examples, a plurality of separators may be operatively coupled to each other. A first separator may be connected to a second separator (e.g., in a serial manner). The separator may be optimized to operate with different types of material flow and/or pneumatic flows. For example, the separator may be optimized to operate with a number of pre-transformed material properties (e.g., particulate material size, material type, FLS of a particulate material, and/or particulate material shape). The pre-transformed material may comprise a particulate material (e.g., powder, or vesicles). The pre-transformed material may comprise a solid, semi-solid, or liquid. For examples, the separator may be optimized to operate with a number of material flow properties (e.g., material density and/or material friction).

In some embodiments, the temperature of the pre-transformed material is altered and/or maintained before, after, and/or during at least a portion of the 3D printing. The material conveyed through the channel may be at a temperature below, above, or at ambient temperature. In some configurations, the channel (e.g., gas channel and/or material conveyor channel) may be coupled to the temperature alteration and/or maintenance source (e.g., comprising a thermostat). The temperature alteration and/or maintenance source may comprise a heat exchanger (e.g., active, or passive heat exchanger). The cooling member may comprise an energy conductive material. The cooling member may comprise an active energy transfer, or a passive energy transfer. The cooling member may comprise a cooling liquid (e.g., aqueous or oil), cooling gas or cooling solid. The cooling member may be further connected to a cooler or a thermostat. The gas or liquid comprising the cooling member may be stationary or circulating. The heat exchanger can circulate a cooling/heating fluid through a plumbing system. The plumbing system may comprise one or more channels (e.g., pipe, or coil). The cooling/heating fluid (e.g., coolant, or oil) can be configured to absorb/release heat from the heat exchanger through any one or combination of heat transfer mechanisms (e.g., conduction, natural convection, forced convection, and radiation). The 3D printing system and/or passivation system may comprise a temperature adjuster (e.g., heater and/or cooler), e.g., a heat exchanger. The temperature adjuster can adjust the temperature of the gas flowing throughout the 3D printer, unpacking station, and/or passivation system, or any component thereof. Atmosphere in the 3D printing system, unpacking station, and/or passivation system can be scraped, e.g., using the gas conveyance system. For example, the atmosphere can be dried. For example, any reactive components (e.g., oxygen, hydrogen, and/or humidity) can be removed from the atmosphere, e.g., during circulation of the atmosphere in the gas conveyance system. Examples of gas conveyance system and components (including control components) can be found in PCT patent application serial number PCT/US17/60035 filed on Nov. 3, 2017, titled "GAS FLOW IN THREE-DIMENSIONAL PRINTING," which is incorporated herein by reference in its entirety.

At times, a physical property (e.g., comprising velocity, speed, direction of movement, or acceleration) of one or more components of the layer dispensing mechanism is controlled. Controlling may include using at least one controller. Controlling may include modulation of the physical property (e.g., within a predetermined time frame). Controlling may include modulation of the physical property within a translation cycle of the layer dispensing mechanism. The translation cycle may comprise moving from one side of the material bed to the opposing side. The translation cycle may comprise moving from one side of the material bed, to the opposing side, and back to the one side. At times, one or more components (e.g., the material dispensing mechanism, the material leveling mechanism, and/or the material removal mechanism) of the layer dispensing mechanism may be controlled to operate at a (e.g., substantially) constant velocity (e.g., throughout the translation cycle, throughout a material dispensing cycle, throughout a material leveling cycle and/or throughout a material removal cycle). At times, one or more components may be controlled to operate at a variable velocity. At times, one or more components may be controlled to operate at variable velocity within a portion of time of the translation cycle. At times, the velocity of one or more components of the layer dispensing mechanism, within a first time portion of the translation cycle and a second time portion of the translation cycle may be same. At times, the velocity of one or more components of the layer dispensing mechanism, within a first time portion of the translation cycle and a second time portion of the translation cycle may be different. At times, within the translation cycle, the velocity of one or more components of the layer dispensing mechanism at a first position may be different than the velocity of the one or more components at a second position. At times, within the translation cycle, the velocity of one or more components of the layer dispensing mechanism at a first position may be the same as the velocity of the one or more components at a second position. At times, a component of the layer dispensing mechanism may be individually controlled. At times, at least two or more components of the layer dispensing mechanism may be collectively controlled. At times, at least two components of the layer dispensing mechanism may be controlled by the same controller. At times, at least two components of the layer dispensing mechanism may be controlled by a different controller.

In some configurations, the 3D printer comprises a bulk reservoir (e.g., a tank, a pool, a tub, or a basin). The bulk reservoir may comprise pre-transformed material. The bulk reservoir may comprise a mechanism configured to deliver the pre-transformed material from the bulk reservoir to at least one component of the layer dispensing mechanism (e.g., material dispenser). The bulk reservoir can be connected or disconnected from the layer dispensing mechanism (e.g., from the material dispenser). The bulk reservoir can be connected or disconnected from the layer dispensing mechanism. The disconnected pre-transformed material dispenser can be located above, below or to the side of the material bed. The disconnected pre-transformed material dispenser can be located above the material bed, for example above the material entrance opening to the material dispenser within the layer dispensing mechanism. Above may be in a position away from the gravitational center.

The bulk reservoir may be connected to the material dispensing mechanism that is a component of the layer dispensing mechanism. The bulk reservoir may be located above, below or to the side of the layer dispensing mechanism. The bulk reservoir may be connected to the material dispensing mechanism via a channel. The layer dispensing mechanism and/or the bulk reservoir have at least one opening port (e.g., for the pre-transformed material to move to and/or from). Pre-transformed material can be stored in the bulk reservoir. The bulk reservoir may hold at least an amount of material sufficient for one layer, or sufficient to build the entire 3D object. The bulk reservoir may hold at least about 200 grams (gr), 400 gr, 500 gr, 600 gr, 800 gr, 1 Kilogram (Kg), or 1.5 Kg of pre-transformed material. The bulk reservoir may hold at most 200 gr, 400 gr, 500 gr, 600 gr, 800 gr, 1 Kg, or 1.5 Kg of pre-transformed material. The bulk reservoir may hold an amount of material between any of the afore-mentioned amounts of bulk reservoir material (e.g., from about 200 gr to about 1.5 Kg, from about 200 gr to about 800 gr, or from about 700 gr to about 1.5 kg). Material from the bulk reservoir can travel to the layer dispensing mechanism via a force. The force can be natural (e.g., gravity), or artificial (e.g., using an actuator such as, for example, a pump). The force may comprise friction. The bulk reservoir may be any bulk reservoir disclosed in Patent Application Serial Number PCT/US15/36802 that is incorporated herein by reference in its entirety.

In some embodiments, the pre-transformed material dispenser resides within the layer dispensing mechanism. The pre-transformed material dispenser may hold at least an amount of powder material sufficient for at least one, two, three, four or five layers. The pre-transformed material dispenser (e.g., an internal reservoir) may hold at least an amount of material sufficient for at most one, two, three, four or five layers. The pre-transformed material dispenser may hold an amount of material between any of the afore-mentioned amounts of material (e.g., sufficient to a number of layers from about one layer to about five layers). The pre-transformed material dispenser may hold at least about 20 grams (gr), 40 gr, 50 gr, 60 gr, 80 gr, 100 gr, 200 gr, 400 gr, 500 gr, or 600 gr of pre-transformed material. The pre-transformed material may hold at most about 20 gr, 40 gr, 50 gr, 60 gr, 80 gr, 100 gr, 200 gr, 400 gr, 500 gr, or 600 gr of pre-transformed material. The pre-transformed material dispenser may hold an amount of material between any of the afore-mentioned amounts of pre-transformed material dispenser reservoir material (e.g., from about 20 gr to about 600 gr, from about 20 gr to about 300 gr, or from about 200 gr to about 600 gr.). Pre-transformed material may be transferred from the bulk reservoir to the material dispenser by any analogous method described herein for exiting of pre-transformed material from the material dispenser. At times, the exit opening ports (e.g., holes) in the bulk reservoir exit opening may have a larger FLS relative to those of the pre-transformed material dispenser exit opening port. For example, the bulk reservoir may comprise an exit opening comprising a mesh or a surface comprising at least one hole. The mesh (or a surface comprising at least one hole) may comprise a hole with a fundamental length scale of at least about 0.25 mm, 0.5 mm. 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of at most about 0.25 mm, 0.5 mm. 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of any value between the afore-mentioned values (e.g., from about 0.25 mm to about 1 cm, from about 0.25 mm to about 5 mm, or from about 5 mm to about 1 cm). The bulk reservoir may comprise a plane that may have at least one edge that is translatable into or out of the bulk reservoir. The bulk reservoir may comprise a plane that may pivot into or out of the bulk reservoir (e.g., a flap door). Such translation may create an opening, which may allow pre-transformed material in the reservoir to flow out of the reservoir (e.g., using gravity).

At times, a controller is operatively coupled to the bulk reservoir. The controller may control the time (e.g., time period, duration, and/or an indication/signal received from a sensor) for filling the bulk reservoir. The controller may control the amount of pre-transformed material released from the bulk reservoir by controlling, for example, the amount of time the conditions for allowing pre-transformed material to exit the bulk reservoir are in effect. In some examples, the pre-transformed material dispenser dispenses an excess amount of powder that is retained within the pre-transformed material dispenser reservoir, prior to the loading of pre-transformed material from the bulk reservoir to the pre-transformed material dispenser reservoir. In some examples, the pre-transformed material dispenser does not dispense of any excess amount of pre-transformed material that is retained within the pre-transformed material dispenser reservoir, prior to loading of pre-transformed material from the bulk reservoir to the pre-transformed material dispenser reservoir. Pre-transformed material may be transferred from the bulk reservoir to the pre-transformed material dispenser using a scooping mechanism that scoops pre-transformed material from the bulk reservoir and transfers it to the pre-transformed material dispenser. The scooping mechanism may scoop a fixed or predetermined amount of material. The scooped amount may be adjustable. The scooping mechanism may pivot (e.g., rotate) in the direction perpendicular to the scooping direction. The bulk reservoir may be exchangeable, removable, non-removable, or non-exchangeable. The bulk reservoir may comprise exchangeable components. The layer dispensing mechanism and/or any of its components may be exchangeable, removable, non-removable, or non-exchangeable. The powder dispensing mechanism may comprise exchangeable components.

At times, the pre-transformed material in the bulk reservoir or in the material dispensing mechanism is preheated, cooled, is at an ambient temperature or maintained at a predetermined temperature. A leveling mechanism (e.g., FIG., 1, 117, comprising a rake, roll, brush, spatula, or blade) can be synchronized with the material dispensing mechanism to deliver and planarize the pre-transformed material to form the material bed. The leveling mechanism can planarize (e.g., level), distribute and/or spread the pre-transformed material on the platform (as the pre-transformed material is dispensed by the material dispensing mechanism). The leveling mechanism may push an excess of pre-transformed material and/or other debris to the ancillary chamber. The pre-transformed material and/or other debris that resides in the ancillary chamber may be evacuated via a closable opening port. The evacuation may be active (e.g., using an actuator activating a pump, scooper, blade, squeegee, brush, or broom). The evacuation may be passive (e.g., using gravitational force). For example, the floor of the ancillary chamber may be tilted towards the opening. The tilted floor may allow any pre-transformed material and/or other debris to slide towards the opening with or without any additional energy (e.g., a suction device, or any other energy activated device).

At times, the platform (also herein, “printing platform” or “building platform”) is disposed in the enclosure (e.g., in the build module and/or processing chamber). The platform may comprise a substrate or a base. The substrate and/or the base may be removable or non-removable. The building platform may be (e.g., substantially) horizontal, (e.g., substantially) planar, or non-planar. The platform may have a surface that points towards the deposited pre-transformed material (e.g., powder material), which at times may point towards the top of the enclosure (e.g., away from the center of gravity). The platform may have a surface that points away from the deposited pre-transformed material (e.g., towards the center of gravity), which at times may point towards the bottom of the container. The platform may have a surface that is (e.g., substantially) flat and/or planar. The platform may have a surface that is not flat and/or not planar. The platform may have a surface that comprises protrusions or indentations. The platform may have a surface that comprises embossing. The platform may have a surface that comprises supporting features (e.g., auxiliary support). The platform may have a surface that comprises a mold. The platform may have a surface that comprises a wave formation. The surface may point towards the layer of pre-transformed material within the material bed. The wave may have an amplitude (e.g., vertical amplitude or at an angle). The platform (e.g., base) may comprise a mesh through which the pre-transformed material (e.g., the remainder) is able to flow through. The platform may comprise a motor. The platform (e.g., substrate and/or base) may be fastened to the container. The platform (or any of its components) may be transportable. The transportation of the platform may be controlled and/or regulated by a controller (e.g., control system). The platform may be transportable horizontally, vertically, or at an angle (e.g., planar or compound).

At times, the platform is vertically transferable, for example using an actuator. The actuator may cause a vertical translation (e.g., an elevator). An actuator causing a vertical translation (e.g., an elevation mechanism) is shown as an example in FIG. 1, 105. The up and down arrow next to the elevation mechanism 105 signifies a possible direction of movement of the elevation mechanism, or a possible direction of movement effectuated by the elevation mechanism.

In some cases, auxiliary support(s) adheres to the upper surface of the platform. In some examples, the auxiliary supports of the printed 3D object may touch the platform (e.g., the bottom of the enclosure, the substrate, or the base). Sometimes, the auxiliary support may adhere to the platform. In some embodiments, the auxiliary supports are an integral part of the platform. At times, auxiliary support(s) of the printed 3D object, do not touch the platform. In any of the methods described herein, the printed 3D object may be supported only by the pre-transformed material within the material bed (e.g., powder bed, FIG. 1, 104). Any auxiliary support(s) of the printed 3D object, if present, may be suspended adjacent to the platform. Occasionally, the platform may have a pre-hardened (e.g., pre-solidified) amount of material. Such pre-solidified material may provide support to the printed 3D object. At times, the platform may provide adherence to the material. At times, the platform does not provide adherence to the material. The platform may comprise elemental metal, metal alloy, elemental carbon, or ceramic. The platform may comprise a composite material (e.g., as disclosed herein). The platform may comprise glass, stone, zeolite, or a polymeric material. The polymeric material may include a hydrocarbon or fluorocarbon. The platform (e.g., base) may include Teflon. The platform may include compartments for printing small objects. Small may be relative to the size of the enclosure.

The compartments may form a smaller compartment within the enclosure, which may accommodate a layer of pre-transformed material.

At times, the energy beam projects energy to the material bed. The apparatuses, systems, and/or methods described herein can comprise at least one energy beam. In some cases, the apparatuses, systems, and/or methods described can comprise two, three, four, five, or more energy beams. The energy beam may include radiation comprising electromagnetic, electron, positron, proton, plasma, or ionic radiation. The electromagnetic beam may comprise microwave, infrared, ultraviolet, or visible radiation. The ion beam may include a cation or an anion. The electromagnetic beam may comprise a laser beam. The energy beam may derive from a laser source. The energy source may be a laser source. The laser may comprise a fiber laser, a solid-state laser, or a diode laser. The laser source may comprise a Nd:YAG, Neodymium (e.g., neodymium-glass), or an Ytterbium laser. The laser may comprise a carbon dioxide laser ($CO_2$ laser). The laser may be a fiber laser. The laser may be a solid-state laser. The laser can be a diode laser. The energy source may comprise a diode array. The energy source may comprise a diode array laser. The laser may be a laser used for micro laser sintering. The energy beam may be any energy beam disclosed in Patent Application serial number PCT/US15/36802 that is incorporated herein by reference in its entirety.

At times, the energy beam (e.g., transforming energy beam) comprises a Gaussian energy beam. The energy beam may have any cross-sectional shape comprising an ellipse (e.g., circle), or a polygon (e.g., as disclosed herein). The energy beam may have a cross section with a FLS (e.g., diameter) of at least about 50 micrometers (μm), 100 μm, 150 μm, 200 μm, or 250 μm. The energy beam may have a cross section with a FLS of at most about 60 micrometers (μm), 100 μm, 150 μm, 200 μm, or 250 μm. The energy beam may have a cross section with a FLS of any value between the afore-mentioned values (e.g., from about 50 μm to about 250 μm, from about 50 μm to about 150 μm, or from about 150 μm to about 250 μm). The power per unit area of the energy beam may be at least about 100 Watt per millimeter square ($W/mm^2$), 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 W/mm2, 7000 $W/mm^2$, or 10000 $W/mm^2$. The power per unit area of the tiling energy flux may be at most about 110 $W/mm^2$, 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, 7000 $W/mm^2$, or 10000 $W/mm^2$. The power per unit area of the energy beam may be any value between the afore-mentioned values (e.g., from about 100 $W/mm^2$ to about 3000 $W/mm^2$, from about 100 $W/mm^2$ to about 5000 $W/mm^2$, from about 100 $W/mm^2$ to about 10000 $W/mm^2$, from about 100 $W/mm^2$ to about 500 $W/mm^2$, from about 1000 $W/mm^2$ to about 3000 $W/mm^2$, from about 1000 $W/mm^2$ to about 3000 $W/mm^2$, or from about 500 $W/mm^2$ to about 1000 $W/mm^2$). The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The energy beam may be continuous or non-continuous (e.g., pulsing). The energy beam may be modulated before and/or during the formation of a transformed material as part of the 3D object. The energy beam may be modulated before and/or during the 3D printing process.

In some embodiments, the energy source (e.g., laser) has a power of at least about 10 Watt (W), 30 W, 50 W, 80 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy source may have a power of at most about 10 W, 30 W, 50 W, 80 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy source may have a power between any of the afore-mentioned energy beam power values (e.g., from about 10 W to about 100 W, from about 100 W to about 1000 W, or from about 1000 W to about 4000 W). The energy beam may derive from an electron gun. The energy beam may include a pulsed energy beam, a continuous wave energy beam, or a quasi-continuous wave energy beam. The pulse energy beam may have a repetition frequency of at least about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency of at most about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency between any of the afore-mentioned repetition frequencies (e.g., from about 1 KHz to about 5 MHz, from about 1 KHz to about 1 MHz, or from about 1 MHz to about 5 MHz).

In some embodiments, the methods, apparatuses and/or systems disclosed herein comprise Q-switching, mode coupling or mode locking to effectuate the pulsing energy beam. The apparatus or systems disclosed herein may comprise an on/off switch, a modulator, or a chopper to effectuate the pulsing energy beam. The on/off switch can be manually or automatically controlled. The switch may be controlled by the control system. The switch may alter the "pumping power" of the energy beam. The energy beam may be at times focused, non-focused, or defocused. In some instances, the defocus is substantially zero (e.g., the beam is non-focused).

In some embodiments, the energy source(s) projects energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an aucusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

In some embodiments, the energy beam(s), energy source(s), and/or the platform of the energy beam array are moved via a galvanometer scanner, a polygon, a mechanical stage (e.g., X-Y stage), a piezoelectric device, gimbal, or any combination of thereof. The galvanometer may comprise a mirror. The galvanometer scanner may comprise a two-axis galvanometer scanner. The scanner may comprise a modulator (e.g., as described herein). The scanner may comprise a polygonal mirror. The scanner can be the same scanner for two or more energy sources and/or beams. At least two (e.g., each) energy source and/or beam may have a separate scanner. The energy sources can be translated independently of each other. In some cases, at least two energy sources and/or beams can be translated at different rates, and/or along different paths. For example, the movement of a first energy source may be faster as compared to the movement of a second energy source. The systems and/or apparatuses disclosed herein may comprise one or more shutters (e.g., safety shutters), on/off switches, or apertures.

In some embodiments, the energy beam (e.g., laser) has a FLS (e.g., a diameter) of its footprint on the on the exposed surface of the material bed of at least about 1 micrometer (μm), 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the layer of it footprint on the exposed surface of the material bed of at most about 1 μm, 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the exposed surface of the material bed between any of the afore-mentioned energy beam FLS values (e.g., from about 5 μm to about 500 μm, from about 5 μm to about 50 μm, or from about 50 μm to about 500 μm). The beam may be a focused beam. The beam may be a dispersed beam. The beam may be an aligned beam. The apparatus and/or systems described herein may further comprise a focusing coil, a deflection coil, or an energy beam power supply. The defocused energy beam may have a FLS of at least about 1 mm, 5 mm, 10 mm, 20 mm, 30 mm, 40 mm, 50 mm, or 100 mm. The defocused energy beam may have a FLS of at most about 1 mm, 5 mm, 10 mm, 20 mm, 30 mm, 40 mm, 50 mm, or 100 mm. The energy beam may have a defocused cross-sectional FLS on the layer of pre-transformed material between any of the afore-mentioned energy beam FLS values (e.g., from about 5 mm to about 100 mm, from about 5 mm to about 50 mm, or from about 50 mm to about 100 mm).

The power supply to any of the components described herein can be supplied by a grid, generator, local, or any combination thereof. The power supply can be from renewable or non-renewable sources. The renewable sources may comprise solar, wind, hydroelectric, or biofuel. The powder supply can comprise rechargeable batteries.

In some embodiments, the exposure time of the energy beam is at least 1 microsecond (μs), 5 μs, 10 μs, 20 μs, 30 μs, 40 μs, 50 μs, 60 μs, 70 μs, 80 μs, 90 μs, 100 μs, 200 μs, 300 μs, 400 μs, 500 μs, 800 μs, or 1000 μs. The exposure time of the energy beam may be most about 1 μs, 5 μs, 10 μs, 20 μs, 30 μs, 40 μs, 50 μs, 60 μs, 70 μs, 80 μs, 90 μs, 100 μs, 200 μs, 300 μs, 400 μs, 500 μs, 800 μs, or 1000 μs. The exposure time of the energy beam may be any value between the afore-mentioned exposure time values (e.g., from about 1 μs to about 1000 μs, from about 1 μs to about 200 μs, from about 1 μs to about 500 μs, from about 200 μs to about 500 μs, or from about 500 μs to about 1000 μs).

At times, the controller controls one or more characteristics of the energy beam (e.g., variable characteristics). The control of the energy beam may allow a low degree of material evaporation during the 3D printing process. For example, controlling one or more energy beam characteristics may (e.g., substantially) reduce the amount of spatter generated during the 3D printing process. The low degree of material evaporation may be measured in grams of evaporated material and compared to a Kilogram of hardened material formed as part of the 3D object. The low degree of material evaporation may be evaporation of at most about 0.25 grams (gr.), 0.5 gr, 1 gr, 2 gr, 5 gr, 10 gr, 15 gr, 20 gr, 30 gr, or 50 gr per every Kilogram of hardened material formed as part of the 3D object. The low degree of material evaporation per every Kilogram of hardened material formed as part of the 3D object may be any value between the afore-mentioned values (e.g., from about 0.25 gr to about 50 gr, from about 0.25 gr to about 30 gr, from about 0.25 gr to about 10 gr, from about 0.25 gr to about 5 gr, or from about 0.25 gr to about 2 gr).

In some embodiments, the methods, systems, and/or the apparatus described herein further comprise at least one energy source. In some cases, the system can comprise two, three, four, five, or more energy sources. An energy source can be a source configured to deliver energy to an area (e.g., a confined area). An energy source can deliver energy to the confined area through radiative heat transfer.

In some embodiments, the energy source supplies any of the energies described herein (e.g., energy beams). The energy source may deliver energy to a point or to an area. The energy source may include an electron gun source. The energy source may include a laser source. The energy source may comprise an array of lasers. In an example, a laser can provide light energy at a peak wavelength of at least about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength between the afore-mentioned peak wavelengths (e.g., from 100 nm to 2000 nm, from 100 nm to 1100 nm, or from 1000 nm to 2000 nm). The energy beam can be incident on the top surface of the material bed. The energy beam can be incident on, or be directed to, a specified area of the material bed over a specified time period. The energy beam can be substantially perpendicular to the top (e.g., exposed) surface of the material bed. The material bed can absorb the energy from the energy beam (e.g., incident energy beam) and, as a result, a localized region of the material in the material bed can increase in temperature. The increase in temperature may transform the material within the material bed. The increase in temperature may heat and transform the material within the material bed. In some embodiments, the increase in temperature may heat and not transform the material within the material bed. The increase in temperature may heat the material within the material bed.

In some embodiments, the energy beam and/or source is moveable such that it can translate relative to the material bed. The energy beam and/or source can be moved by a scanner. The movement of the energy beam and/or source can comprise utilization of a scanner.

In some embodiments, at one point in time, and/or (e.g., substantially) during the entire build of the 3D object: At least two of the energy beams and/or sources are translated independently of each other or in concert with each other. At least two of the multiplicity of energy beams can be translated independently of each other or in concert with each other. In some cases, at least two of the energy beams can be translated at different rates such that the movement of the one is faster compared to the movement of at least one other energy beam. In some cases, at least two of the energy sources can be translated at different rates such that the movement of the one energy source is faster compared to the movement of at least another energy source. In some cases, at least two of the energy sources (e.g., all of the energy sources) can be translated at different paths. In some cases, at least two of the energy sources can be translated at substantially identical paths. In some cases, at least two of the energy sources can follow one another in time and/or space. In some cases, at least two of the energy sources translate substantially parallel to each other in time and/or space. The power per unit area of at least two of the energy beam may be (e.g., substantially) identical. The power per unit area of at least one of the energy beams may be varied (e.g., during the formation of the 3D object). The power per unit area of at least one of the energy beams may be different. The power per unit area of at least one of the energy beams may be different. The power per unit area of one energy beam may be greater than the power per unit area of a second energy beam. The energy beams may have the same or different wavelengths. A first energy beam may have a wavelength that is smaller or larger than the wavelength of a second energy beam. The energy beams can derive from the same energy source. At least one of the energy beams can derive from different energy sources. The energy beams can derive from different energy sources. At least two of the energy beams may have the same power (e.g., at one point in time, and/or (e.g., substantially) during the entire build of the 3D object). At least one of the beams may have a different power (e.g., at one point in time, and/or substantially during the entire build of the 3D object). The beams may have different powers (e.g., at one point in time, and/or (e.g., substantially) during the entire build of the 3D object). At least two of the energy beams may travel at (e.g., substantially) the same velocity. At least one of the energy beams may travel at different velocities. The velocity of travel (e.g., speed) of at least two energy beams may be (e.g., substantially) constant. The velocity of travel of at least two energy beams may be varied (e.g., during the formation of the 3D object or a portion thereof). The travel may refer to a travel relative to (e.g., on) the exposed surface of the material bed (e.g., powder material). The travel may refer to a travel close to the exposed surface of the material bed. The travel may be within the material bed. The at least one energy beam and/or source may travel relative to the material bed.

Figure 3:
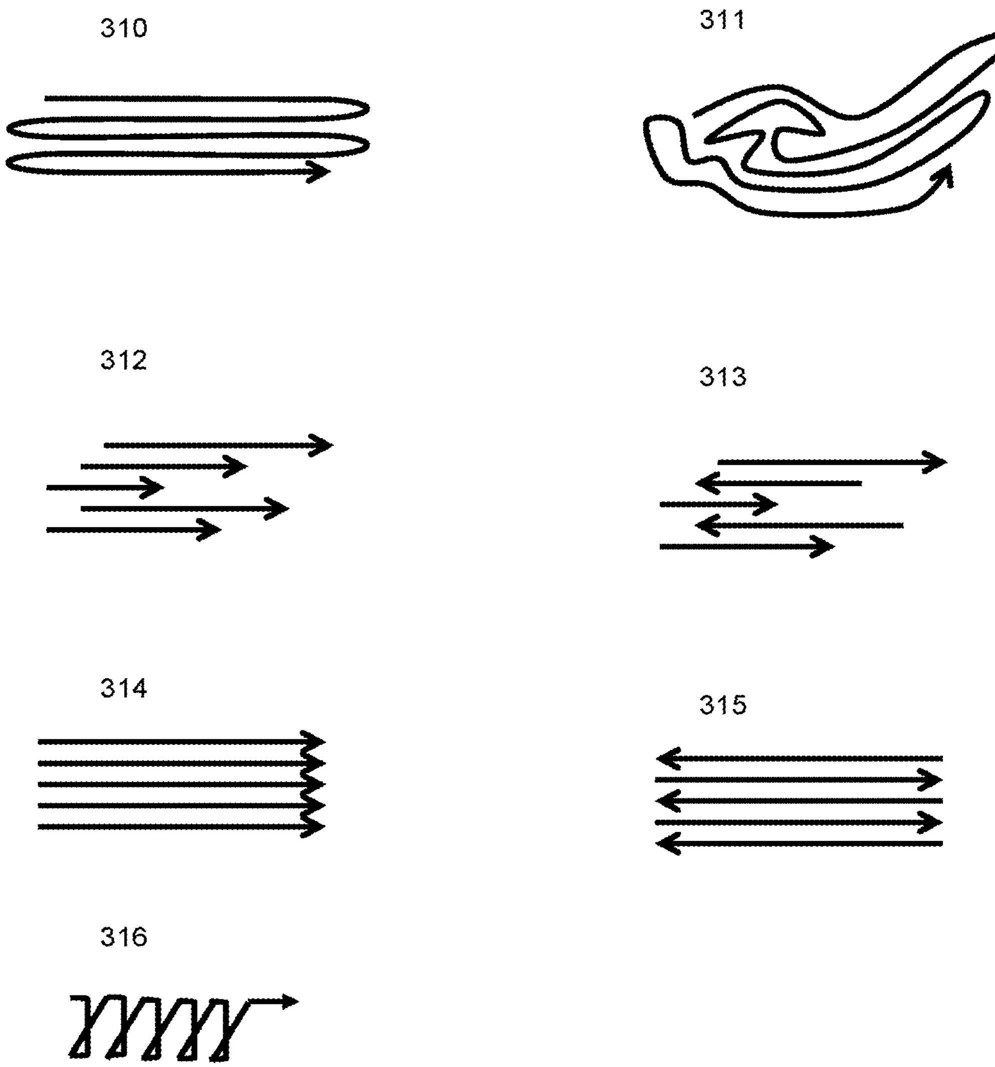
FIG. 3 illustrates various paths.

At times, the energy (e.g., energy beam) travels in a path. The path may comprise a hatch. The path of the energy beam may comprise repeating a path. For example, the first energy may repeat its own path. The second energy may repeat its own path, or the path of the first energy. The repetition may comprise a repetition of 1, 2, 3, 4, 5, 6, 7, 8, 9, 10 times or more. The energy may follow a path comprising parallel lines. For example, FIG. 3, 315 or 314 show paths that comprise parallel lines. The lines may be hatch lines. The distance between each of the parallel lines or hatch lines, may be at least about 1 μm, 5 μm, 10 μm, 20 μm, 30 μm, 40 μm, 50 μm, 60 μm, 70 μm, 80 μm, 90 μm, or more. The distance between each of the parallel lines or hatch lines, may be at most about 1 μm, 5 μm, 10 μm, 20 μm, 30 μm, 40 μm, 50 μm, 60 μm, 70 μm, 80 μm, 90 μm, or less. The distance between each of the parallel lines or hatch lines may be any value between any of the afore-mentioned distance values (e.g., from about 1 μm to about 90 μm, from about 1 μm to about 50 μm, or from about 40 μm to about 90 μm). The distance between the parallel or parallel lines or hatch lines may be substantially the same in every layer (e.g., plane) of transformed material. The distance between the parallel lines or hatch lines in one layer (e.g., plane) of transformed material may be different than the distance between the parallel lines or hatch lines respectively in another layer (e.g., plane) of transformed material within the 3D object. The distance between the parallel lines or hatch lines portions within a layer (e.g., plane) of transformed material may be substantially constant. The distance between the parallel lines or hatch lines within a layer (e.g., plane) of transformed material may be varied. The distance between a first pair of parallel lines or hatch lines within a layer (e.g., plane) of transformed material may be different than the distance between a second pair of parallel lines or hatch lines within a layer (e.g., plane) of transformed material respectively. The first energy beam may follow a path comprising two hatch lines or paths that cross in at least one point. The hatch lines or paths may be straight or curved. The hatch lines or paths may be winding. FIG. 3, 310 or 311 show examples of winding paths. The first energy beam may follow a hatch line or path comprising a U-shaped turn (e.g., FIG. 3, 310). The first energy beam may follow a hatch line or path devoid of U-shaped turns (e.g., FIG. 312). The hatch line may have varied length (e.g., 312 or 313). The path may be overlapping (e.g., FIG. 3, 316) or non-overlapping. The path may comprise at least one overlap. The path may be substantially devoid of overlap (e.g., FIG. 3, 310).

In some embodiments, the formation of the 3D object includes transforming (e.g., fusing, binding, or connecting) the pre-transformed material (e.g., powder material) using an energy beam. The energy beam may be projected on to a particular area of the material bed, thus causing the pre-transformed material to transform. The energy beam may cause at least a portion of the pre-transformed material to transform from its present state of matter to a different state of matter. For example, the pre-transformed material may transform at least in part (e.g., completely) from a solid to a liquid state. The energy beam may cause at least a portion of the pre-transformed material to chemically transform. For example, the energy beam may cause chemical bonds to form or break. The chemical transformation may be an isomeric transformation. The transformation may comprise a magnetic transformation or an electronic transformation. The transformation may comprise coagulation of the material, cohesion of the material, or accumulation of the material.

In some embodiments, the methods described herein further comprises repeating the operations of material deposition and material transformation operations to produce a 3D object (or a portion thereof) by at least one 3D printing (e.g., additive manufacturing) method. For example, the methods described herein may further comprise repeating the operations of depositing a layer of pre-transformed material and transforming at least a portion of the pre-transformed material to connect to the previously formed 3D object portion (e.g., repeating the 3D printing cycle), thus forming at least a portion of a 3D object. The transforming operation may comprise utilizing an energy beam to transform the material. In some instances, the energy beam is utilized to transform at least a portion of the material bed (e.g., utilizing any of the methods described herein).

In some embodiments, the transforming energy is provided by an energy source. The transforming energy may comprise an energy beam. The energy source can produce an energy beam. The energy beam may include a radiation comprising electromagnetic, electron, positron, proton, plasma, or ionic radiation. The electromagnetic beam may comprise microwave, infrared, ultraviolet, or visible radiation. The ion beam may include a charged particle beam. The ion beam may include a cation, or an anion. The electromagnetic beam may comprise a laser beam. The laser may comprise a fiber, or a solid-state laser beam. The energy source may include a laser. The energy source may include an electron gun. The energy depletion may comprise heat depletion. The energy depletion may comprise cooling. The energy may comprise an energy flux (e.g., energy beam. E.g., radiated energy). The energy may comprise an energy beam. The energy may be the transforming energy. The energy may be a warming energy that is not able to transform the deposited pre-transformed material (e.g., in the material bed). The warming energy may be able to raise the temperature of the deposited pre-transformed material. The energy beam may comprise energy provided at a (e.g., substantially) constant or varied energy beam characteristics. The energy beam may comprise energy provided at (e.g., substantially) constant or varied energy beam characteristics, depending on the position of the generated hardened material within the 3D object. The varied energy beam characteristics may comprise energy flux, rate, intensity, wavelength, amplitude, power, cross-section, or time exerted for the energy process (e.g., transforming or heating). The energy beam cross-section may be the average (or mean) FLS of the cross section of the energy beam on the layer of material (e.g., powder). The FLS may be a diameter, a spherical equivalent diameter, a length, a height, a width, or diameter of a bounding circle. The FLS may be the larger of a length, a height, and a width of a 3D form. The FLS may be the larger of a length and a width of a substantially two-dimensional (2D) form (e.g., wire, or 3D surface).

Figure 2:
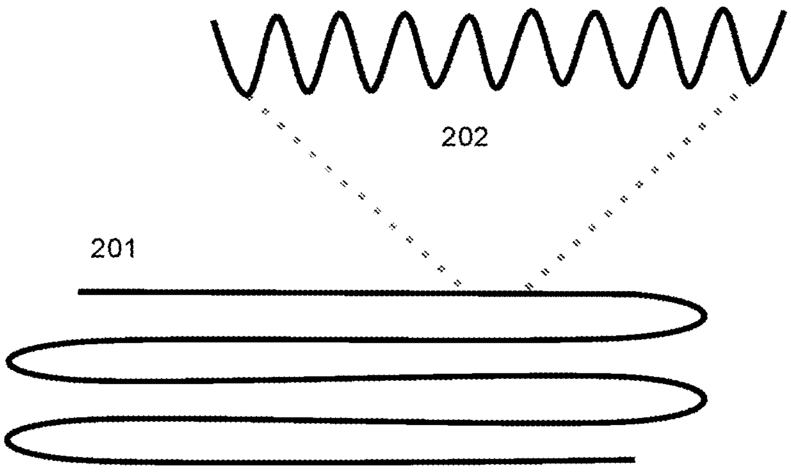
FIG. 2 illustrates a path.

At times, the energy beam follows a path. The path of the energy beam may be a vector. The path of the energy beam may comprise a raster, a vector, or any combination thereof. The path of the energy beam may comprise an oscillating pattern. The path of the energy beam may comprise a zigzag, wave (e.g., curved, triangular, or square), or curve pattern. The curved wave may comprise a sine or cosine wave. The path of the energy beam may comprise a sub-pattern. The path of the energy beam may comprise an oscillating (e.g., zigzag), wave (e.g., curved, triangular, or square), and/or curved sub-pattern. The curved wave may comprise a sine or cosine wave. FIG. 2 shows an example of a path 201 of an energy beam comprising a zigzag sub-pattern (e.g., 202 shown as an expansion (e.g., blow-up) of a portion of the path 201). The sub-path of the energy beam may comprise a wave (e.g., sine or cosine wave) pattern. The sub-path may be a small path that forms the large path. The sub-path may be a component (e.g., a portion) of the large path. The path that the energy beam follows may be a predetermined path. A model may predetermine the path by utilizing a controller or an individual (e.g., human). The controller may comprise a processor. The processor may comprise a computer, computer program, drawing or drawing data, statue or statue data, or any combination thereof.

At times, the path comprises successive lines. The successive lines may touch each other. The successive lines may overlap each other in at least one point. The successive lines may substantially overlap each other. The successive lines may be spaced by a first distance (e.g., hatch spacing). FIG. 3 shows an example of a path 314 that includes five hatches wherein each two immediately adjacent hatches are separated by a spacing distance. The hatch spacing may be any hatch spacing disclosed in Patent Application Ser. No. 15/374,318 that is entirely incorporated herein by reference.

The term "auxiliary support," as used herein, generally refers to at least one feature that is a part of a printed 3D object, but not part of the desired, intended, designed, ordered, and/or final 3D object. Auxiliary support may provide structural support during and/or after the formation of the 3D object. The auxiliary support may be anchored to the enclosure. For example, an auxiliary support may be anchored to the platform (e.g., building platform), to the side walls of the material bed, to a wall of the enclosure, to an object (e.g., stationary, or semi-stationary) within the enclosure, or any combination thereof. The auxiliary support may be the platform (e.g., the base, the substrate, or the bottom of the enclosure). The auxiliary support may enable the removal or energy from the 3D object (e.g., or a portion thereof) that is being formed. The removal of energy (e.g., heat) may be during and/or after the formation of the 3D object. Examples of auxiliary support comprise a fin (e.g., heat fin), anchor, handle, pillar, column, frame, footing, wall, platform, or another stabilization feature. In some instances, the auxiliary support may be mounted, clamped, or situated on the platform. The auxiliary support can be anchored to the building platform, to the sides (e.g., walls) of the building platform, to the enclosure, to an object (stationary or semi-stationary) within the enclosure, or any combination thereof.

In some examples, the generated 3D object is printed without auxiliary support. In some examples, overhanging feature of the generated 3D object can be printed without (e.g., without any) auxiliary support. The generated object can be devoid of auxiliary supports. The generated object may be suspended (e.g., float anchorlessly) in the material bed (e.g., powder bed). The term "anchorlessly," as used herein, generally refers to without or in the absence of an anchor. In some examples, an object is suspended in a powder bed anchorlessly without attachment to a support. For example, the object floats in the powder bed. The generated 3D object may be suspended in the layer of pre-transformed material (e.g., powder material). The pre-transformed material (e.g., powder material) can offer support to the printed 3D object (or the object during its generation). Sometimes, the generated 3D object may comprise one or more auxiliary supports. The auxiliary support may be suspended in the pre-transformed material (e.g., powder material). The auxiliary support may provide weights or stabilizers. The auxiliary support can be suspended in the material bed within the layer of pre-transformed material in which the 3D object (or a portion thereof) has been formed. The auxiliary support (e.g., one or more auxiliary supports) can be suspended in the pre-transformed material within a layer of pre-transformed material other than the one in which the 3D object (or a portion thereof) has been formed (e.g., a previously deposited layer of (e.g., powder) material). The auxiliary support may touch the platform. The auxiliary support may be suspended in the material bed (e.g., powder material) and not touch the platform. The auxiliary support may be anchored to the platform. The distance between any two auxiliary supports can be at least about 1 millimeter, 1.3 millimeters (mm), 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be at most 1 millimeter, 1.3 mm, 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be any value in between the afore-mentioned distances (e.g., from about 1 mm to about 45 mm, from about 1 mm to about 11 mm, from about 2.2 mm to about 15 mm, or from about 10 mm to about 45 mm). At times, a sphere intersecting an exposed surface of the 3D object may be devoid of auxiliary support. The sphere may have a radius XY that is equal to the distance between any two auxiliary supports mentioned herein.

In some examples, the diminished number of auxiliary supports or lack of auxiliary support, facilitates a 3D printing process that requires a smaller amount of material, produces a smaller amount of material waste, and/or requires smaller energy as compared to commercially available 3D printing processes. The reduced number of auxiliary supports can be smaller by at least about 1.1, 1.3, 1.5, 2, 3, 4, 5, 6, 7, 8, 9, or 10 as compared to conventional 3D printing. The smaller amount may be smaller by any value between the aforesaid values (e.g., from about 1.1 to about 10, or from about 1.5 to about 5) as compared to conventional 3D printing.

In some embodiments, the generated 3D object has a surface roughness profile. The generated 3D object can have various surface roughness profiles, which may be suitable for various applications. The surface roughness may be the deviations in the direction of the normal vector of a real surface from its ideal form. The generated 3D object can have a Ra value of as disclosed herein.

At times, the generated 3D object (e.g., the hardened cover) is substantially smooth. The generated 3D object may have a deviation from an ideal planar surface (e.g., atomically flat or molecularly flat) of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μ), 1.5 μm, 2 μm, 3 μm, 4 μm, 5 μm, 10 μm, 15 μm, 20 μm, 25 μm, 30 μm, 35 μm, 100 μm, 300 μm, 500 μm, or less. The generated 3D object may have a deviation from an ideal planar surface of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μ), 1.5 μm, 2 μm, 3 μm, 4 μm, 5 μm, 10 μm, 15 μm, 20 μm, 25 μm, 30 μm, 35 μm, 100 μm, 300 μm, 500 μm, or more. The generated 3D object may have a deviation from an ideal planar surface between any of the afore-mentioned deviation values. The generated 3D object may comprise a pore. The generated 3D object may comprise pores. The pores may be of an average FLS (diameter or diameter equivalent in case the pores are not spherical) of at most about 1.5 nanometers (nm), 2 nm, 3 nm, 4 nm, 5 nm, 10 nm, 15 nm, 20 nm, 25 nm, 30 nm 35 nm, 100 nm, 300 nm, 500 nm, 1 micrometer (μ), 1.5 μm, 2 μm, 3 μm, 4 μm, 5 μm, 10 μm, 15 μm, 20 μm, 25 μm, 30 μm, 35 μm, 100 μm, 300 μm, or 500 μm. The pores may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μ), 1.5 μm, 2 μm, 3 μm, 4 μm, 5 μm, 10 μm, 15 μm, 20 μm, 25 μm, 30 μm, 35 μm, 100 μm, 300 μm, or 500 μm. The pores may be of an average FLS between any of the afore-mentioned FLS values (e.g., from about lnm to about 500 μm, or from about 20 μm, to about 300 μm). The 3D object (or at least a layer thereof) may have a porosity of at most about 0.05 percent (%), 0.1% 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have a porosity of at least about 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have porosity between any of the afore-mentioned porosity percentages (e.g., from about 0.05% to about 80%, from about 0.05% to about 40%, from about 10% to about 40%, or from about 40% to about 90%). In some instances, a pore may traverse the generated 3D object. For example, the pore may start at a face of the 3D object and end at the opposing face of the 3D object. The pore may comprise a passageway extending from one face of the 3D object and ending on the opposing face of that 3D object. In some instances, the pore may not traverse the generated 3D object. The pore may form a cavity in the generated 3D object. The pore may form a cavity on a face of the generated 3D object. For example, pore may start on a face of the plane and not extend to the opposing face of that 3D object.

At times, the formed plane comprises a protrusion. The protrusion can be a grain, a bulge, a bump, a ridge, or an elevation. The generated 3D object may comprise protrusions. The protrusions may be of an average FLS of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μ), 1.5 μm, 2 μm, 3 μm, 4 μm, 5 μm, 10 μm, 15 μm, 20 μm, 25 μm, 30 μm, 35 μm, 100 μm, 300 μm, 500 μm, or less. The protrusions may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μ), 1.5 μm, 2 μm, 3 μm, 4 μm, 5 μm, 10 μm, 15 μm, 20 μm, 25 μm, 30 μm, 35 μm, 100 μm, 300 μm, 500 μm, or more. The protrusions may be of an average FLS between any of the afore-mentioned FLS values. The protrusions may constitute at most about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the generated 3D object. The protrusions may constitute at least about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the 3D object. The protrusions may constitute a percentage of an area of the 3D object that is between the afore-mentioned percentages of 3D object area. The protrusion may reside on any surface of the 3D object. For example, the protrusions may reside on an external surface of a 3D object. The protrusions may reside on an internal surface (e.g., a cavity) of a 3D object. At times, the average size of the protrusions and/or of the holes may determine the resolution of the printed (e.g., generated) 3D object. The resolution of the printed 3D object may be at least about 1 micrometer, 1.3 micrometers (μ), 1.5 μm, 1.8 μm, 1.9 μm, 2.0 μm, 2.2 μm, 2.4 μm, 2.5 μm, 2.6 μm, 2.7 μm, 3 μm, 4 μm, 5 μm, 10 μm, 20 μm, 30 μm, 40 μm, 50 μm, 60 μm, 70 μm, 80 μm, 90 μm, 100 μm, 200 μm, or more. The resolution of the printed 3D object may be at most about 1 micrometer, 1.3 micrometers (μ), 1.5 μm, 1.8 μm, 1.9 μm, 2.0 μm, 2.2 μm, 2.4 μm, 2.5 μm, 2.6 μm, 2.7 μm, 3 μm, 4 μm, 5 μm, 10 μm, 20 μm, 30 μm, 40 μm, 50 μm, 60 μm, 70 μm, 80 μm, 90 μm, 100 μm, 200 μm, or less. The resolution of the printed 3D object may be any value between the above-mentioned resolution values. At times, the 3D object may have a material density of at least about 99.9%, 99.8%, 99.7%, 99.6%, 99.5%, 99.4%, 99.3%, 99.2% 99.1%, 99%, 98%, 96%, 95%, 94%, 93%, 92%, 91%, 90%, 8%, or 70%. At times, the 3D object may have a material density of at most about 99.5%, 99%, 98%, 96%, 95%, 94%, 93%, 92%, 91%, 90%, 8%, or 70%. At times, the 3D object may have a material density between the afore-mentioned material densities. The resolution of the 3D object may be at least about 100 dots per inch (dpi), 300 dpi, 600 dpi, 1200 dpi, 2400 dpi, 3600 dpi, or 4800 dpi. The resolution of the 3D object may be at most about 100 dpi, 300 dpi, 600 dpi, 1200 dpi, 2400 dpi, 3600 dpi, or 4800 dpi. The resolution of the 3D object may be any value between the afore-mentioned values (e.g., from 100 dpi to 4800 dpi, from 300 dpi to 2400 dpi, or from 600 dpi to 4800 dpi). The height uniformity (e.g., deviation from average surface height) of a planar surface of the 3D object may be at least about 100 μm, 90 μm, 80 μm, 70 μm, 60 μm, 50 μm, 40 μm, 30 μm, 20 μm, 10 μm, or 5 μm. The height uniformity of the planar surface may be at most about 100 μm, 90 μm, 80, 70 μm, 60 μm, 50 μm, 40 μm, 30 μm, 20 μm, 10 μm, or 5 μm. The height uniformity of the planar surface of the 3D object may be any value between the afore-mentioned height deviation values (e.g., from about 100 μm to about 5 μm, from about 50 μm to about 5 μm, from about 30 μm to about 5 μm, or from about 20 μm to about 5 μm). The height uniformity may comprise high precision uniformity.

In some embodiments, a newly formed layer of material (e.g., comprising transformed material) reduces in volume during its hardening (e.g., by cooling). Such reduction in volume (e.g., shrinkage) may cause a deformation in the desired 3D object. The deformation may include cracks, and/or tears in the newly formed layer and/or in other (e.g., adjacent) layers. The deformation may include geometric deformation of the 3D object or at least a portion thereof. The newly formed layer can be a portion of a 3D object. The one or more layers that form the 3D printed object (e.g., sequentially) may be (e.g., substantially) parallel to the building platform. An angle may be formed between a layer of hardened material of the 3D printed object and the platform. The angle may be measured relative to the average layering plane of the layer of hardened material. The platform (e.g., building platform) may include the base, substrate, or bottom of the enclosure. The building platform may be a carrier plate.

In an aspect provided herein is a 3D object comprising a layer of hardened material generated by at least one 3D printing method described herein, wherein the layer of material (e.g., hardened) is different from a corresponding cross section of a model of the 3D object. For example, the generated layers differ from the proposed slices. The layer of material within a 3D object can be indicated by the microstructure of the material. The material microstructures may be those disclosed in Patent Application serial number PCT/US15/36802 that is incorporated herein by reference in its entirety.

Energy (e.g., heat) can be transferred from the material bed to the cooling member (e.g., heat sink) through any one or combination of heat transfer mechanisms. FIG. 1, 113 shows an example of a cooling member. The heat transfer mechanism may comprise conduction, radiation, or convection. The convection may comprise natural or forced convection. The cooling member can be solid, liquid, gas, or semi-solid. In some examples, the cooling member (e.g., heat sink) is solid. The cooling member may be located above, below, or to the side of the material layer. The cooling member may comprise an energy conductive material. The cooling member may comprise an active energy transfer or a passive energy transfer. The cooling member may comprise a cooling liquid (e.g., aqueous or oil), cooling gas, or cooling solid. The cooling member may be further connected to a cooler and/or a thermostat. The gas, semi-solid, or liquid comprised in the cooling member may be stationary or circulating. The cooling member may comprise a material that conducts heat efficiently. The heat (thermal) conductivity of the cooling member may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be at most about 20 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be any value between the afore-mentioned heat conductivity values. The heat (thermal) conductivity of the cooling member may be measured at ambient temperature (e.g., room temperature) and/or pressure. For example, the heat conductivity may be measured at about 20° C. and a pressure of 1 atmosphere. The heat sink can be separated from the powder bed or powder layer by a gap. The gap can be filled with a gas. The cooling member may be any cooling member (e.g., that is used in 3D printing) such as, for example, the ones described in Patent Application serial number PCT/US15/36802, or in patent application Ser. No. 15/435,065, both of which are entirely incorporated herein by references.

When the energy source is in operation, the material bed can reach a certain (e.g., average) temperature. The average temperature of the material bed can be an ambient temperature or "room temperature." The average temperature of the material bed can have an average temperature during the operation of the energy (e.g., beam). The average temperature of the material bed can be an average temperature during the formation of the transformed material, the formation of the hardened material, or the generation of the 3D object. The average temperature can be below or just below the transforming temperature of the material. Just below can refer to a temperature that is at most about 1° C., 2° C., 3° C., 4° C., 5° C., 6° C., 7° C., 8° C., 9° C., 10° C., 15° C., or 20° C. below the transforming temperature. The average temperature of the material bed (e.g., pre-transformed material) can be at most about 10° C. (degrees Celsius), 20° C., 25° C., 30° C., 40° C., 50° C., 60° C. 70° C., 80° C., 90° C., 100° C., 120° C., 140° C., 150° C. 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be at least about 10° C., 20° C., 25° C., 30° C., 40° C., 50° C., 60° C., 70° C., 80° C., 90° C., 100° C., 120° C. 140° C. 150° C., 160° C. 180° C., 200° C., 250° C. 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be any temperature between the afore-mentioned material average temperatures. The average temperature of the material bed (e.g., pre-transformed material) may refer to the average temperature during the 3D printing. The pre-transformed material can be the material within the material bed that has not been transformed and generated at least a portion of the 3D object (e.g., the remainder). The material bed can be heated or cooled before, during, or after forming the 3D object (e.g., hardened material). Bulk heaters can heat the material bed. The bulk heaters can be situated adjacent to (e.g., above, below, or to the side of) the material bed, or within a material dispensing system. For example, the material can be heated using radiators (e.g., quartz radiators, or infrared emitters). The material bed temperature can be substantially maintained at a predetermined value. The temperature of the material bed can be monitored. The material temperature can be controlled manually and/or by a control system.

In some embodiments, the pre-transformed material within the material bed is heated by a first energy source such that the heating will transform the pre-transformed material. The remainder of the material that did not transform to generate at least a portion of the 3D object (e.g., the remainder) can be heated by a second energy source. The remainder can be at an average temperature that is less than the liquefying temperature of the material (e.g., during the 3D printing). The maximum temperature of the transformed portion of the material bed and the average temperature of the remainder of the material bed can be different. The solidus temperature of the material can be a temperature wherein the material is in a solid state at a given pressure (e.g., ambient pressure). Ambient may refer to the surrounding. After the portion of the material bed is heated to the temperature that is at least a liquefying temperature of the material by the first energy source, that portion of the material may be cooled to allow the transformed (e.g., liquefied) material portion to harden (e.g., solidify). In some cases, the liquefying temperature can be at least about 100° C., 200° C., 300° C., 400° C., or 500° C., and the solidus temperature can be at most about 500° C., 400° C., 300° C., 200° C., or 100° C. For example, the liquefying temperature is at least about 300° C. and the solidus temperature is less than about 300° C. In another example, the liquefying temperature is at least about 400° C. and the solidus temperature is less than about 400° C. The liquefying temperature may be different from the solidus temperature. In some instances, the temperature of the pre-transformed material is maintained above the solidus temperature of the material and below its liquefying temperature. In some examples, the material from which the pre-transformed material is composed has a super cooling temperature (or super cooling temperature regime). In some examples, as the first energy source heats up the pre-transformed material to cause at least a portion of it to melt, the molten material will remain molten as the material bed is held at or above the material super cooling temperature of the material, but below its melting point. When two or more materials make up the material layer at a specific ratio, the materials may form a eutectic material on transformation of the material. The liquefying temperature of the formed eutectic material may be the temperature at the eutectic point, close to the eutectic point, or far from the eutectic point. Close to the eutectic point may designate a temperature that is different from the eutectic temperature (i.e., temperature at the eutectic point) by at most about 0.1° C., 0.5° C., 1° C., 2° C., 4° C., 5° C., 6° C., 8° C., 10° C., or 15° C. A temperature that is farther from the eutectic point than the temperature close to the eutectic point is designated herein as a temperature far from the eutectic Point. The process of liquefying and solidifying a portion of the material can be repeated until the entire object has been formed. At the completion of the generated 3D object, it can be removed from the remainder of material in the container. The remaining material can be separated from the portion at the generated 3D object. The generated 3D object can be hardened and removed from the container (e.g., from the substrate or from the base).

At times, the methods described herein further comprise stabilizing the temperature within the enclosure. For example, stabilizing the temperature of the atmosphere or the pre-transformed material (e.g., within the material bed). Stabilization of the temperature may be to a predetermined temperature value. The methods described herein may further comprise altering the temperature within at least one portion of the container. Alteration of the temperature may be to a predetermined temperature. Alteration of the temperature may comprise heating and/or cooling the material bed. Elevating the temperature (e.g., of the material bed) may be to a temperature below the temperature at which the pre-transformed material fuses (e.g., melts or sinters), connects, or bonds.

In some embodiments, the apparatus and/or systems described herein comprise an optical system. The optical components may be controlled manually and/or via a control system (e.g., a controller). The optical system may be configured to direct at least one energy beam from the at least one energy source to a position on the material bed within the enclosure (e.g., a predetermined position). A scanner can be included in the optical system. The printing system may comprise a processor (e.g., a central processing unit). The processor can be programmed to control a trajectory of the at least one energy beam and/or energy source with the aid of the optical system. The systems and/or the apparatus described herein can further comprise a control system in communication with the at least one energy source and/or energy beam. The control system can regulate a supply of energy from the at least one energy source to the material in the container. The control system may control the various components of the optical system. The various components of the optical system may include optical components comprising a mirror, a lens (e.g., concave or convex), a fiber, a beam guide, a rotating polygon, or a prism. The lens may be a focusing or a dispersing lens. The lens may be a diverging or converging lens. The mirror can be a deflection mirror. The optical components may be tiltable and/or rotatable. The optical components may be tilted and/or rotated. The mirror may be a deflection mirror. The optical components may comprise an aperture. The aperture may be mechanical. The optical system may comprise a variable focusing device. The variable focusing device may be connected to the control system. The variable focusing device may be controlled by the control system and/or manually. The variable focusing device may comprise a modulator. The modulator may comprise an acousto-optical modulator, mechanical modulator, or an electro optical modulator. The focusing device may comprise an aperture (e.g., a diaphragm aperture).

In some embodiments, the container described herein comprises at least one sensor. The sensor may be connected and/or controlled by the control system (e.g., computer control system, or controller). The control system may be able to receive signals from the at least one sensor. The control system may act upon at least one signal received from the at least one sensor. The control may rely on feedback and/or feed forward mechanisms that has been pre-programmed. The feedback and/or feed forward mechanisms may rely on input from at least one sensor that is connected to the control unit.

In some embodiments, the sensor detects the amount of material (e.g., pre-transformed material) in the enclosure. The controller may monitor the amount of material in the enclosure (e.g., within the material bed). The systems and/or the apparatus described herein can include a pressure sensor. The pressure sensor may measure the pressure of the chamber (e.g., pressure of the chamber atmosphere). The pressure sensor can be coupled to a control system. The pressure can be electronically and/or manually controlled. The controller may regulate the pressure (e.g., with the aid of one or more vacuum pumps) according to input from at least one pressure sensor. The sensor may comprise light sensor, image sensor, acoustic sensor, vibration sensor, chemical sensor, electrical sensor, magnetic sensor, fluidity sensor, movement sensor, speed sensor, position sensor, pressure sensor, force sensor, density sensor, metrology sensor, sonic sensor (e.g., ultrasonic sensor), or proximity sensor. The metrology sensor may comprise measurement sensor (e.g., height, length, width, angle, and/or volume). The metrology sensor may comprise a magnetic, acceleration, orientation, or optical sensor. The optical sensor may comprise a camera (e.g., IR camera, or CCD camera (e.g., single line CCD camera)), or CCD camera (e.g., single line CCD camera). The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material (e.g., pre-transformed, transformed, and/or hardened). The layer of material may be a pre-transformed material (e.g., powder), transformed material, or hardened material. The metrology sensor may measure at least a portion of the 3D object. The sensor may comprise a temperature sensor, weight sensor, powder level sensor, gas sensor, or humidity sensor. The gas sensor may sense any gas enumerated herein. The temperature sensor may comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer, Pyrometer, IR camera, or CCD camera (e.g., single line CCD camera). The temperature sensor may measure the temperature without contacting the material bed (e.g., non-contact measurements). The pyrometer may comprise a point pyrometer, or a multi-point pyrometer. The Infrared (IR) thermometer may comprise an IR camera. The pressure sensor may comprise Barograph, Barometer, Boost gauge, Bourdon gauge, hot filament ionization gauge, Ionization gauge, McLeod gauge, Oscillating U-tube, Permanent Downhole Gauge, Piezometer, Pirani gauge, Pressure sensor, Pressure gauge, tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode as light sensor, Light-addressable potentiometric sensor, Nichols radiometer, Fiber optic sensors, optical position sensor, photo detector, photodiode, photomultiplier tubes, phototransistor, photoelectric sensor, photoionization detector, photomultiplier, photo resistor, photo switch, phototube, scintillometer, Shack-Hartmann, single-photon avalanche diode, superconducting nanowire single-photon detector, transition edge sensor, visible light photon counter, or wave front sensor. The weight of the enclosure (e.g., container), or any components within the enclosure can be monitored by at least one weight sensor in or adjacent to the material. For example, a weight sensor can be situated at the bottom of the enclosure. The weight sensor can be situated between the bottom of the enclosure and the substrate. The weight sensor can be situated between the substrate and the base. The weight sensor can be situated between the bottom of the container and the base. The weight sensor can be situated between the bottom of the container and the top of the material bed. The weight sensor can comprise a pressure sensor. The weight sensor may comprise a spring scale, a hydraulic scale, a pneumatic scale, or a balance. At least a portion of the pressure sensor can be exposed on a bottom of the container. In some cases, the at least one weight sensor can comprise a button load cell. Alternatively, or additionally a sensor can be configured to monitor the weight of the material by monitoring a weight of a structure that contains the material (e.g., a material bed). One or more position sensors (e.g., height sensors) can measure the height of the material bed relative to the substrate. The position sensors can be optical sensors. The position sensors can determine a distance between one or more energy sources and a surface of the material bed. The surface of the material bed can be the upper surface of the material bed. For example, FIG. 1, 131 shows an example of an upper (e.g., exposed) surface of the material bed 104.

At times, a 3D printing process comprises a sieve that provides pre-transformed material having maximal FLS. Following sieving the particulate material may have a FLS that is at most the size of the holes of the sieve. Following sieving the particulate (e.g., powder) material can comprise particles of average FLS of at most about 1000 micrometers (μ), 500 μm, 100 μm, 50 μm, 45 μm, 40 μm, 35 μm, 30 μm, 25 μm, 20 μm, 15 μm, or 10 μm. The material can comprise particles of an average FLS of any value within a range of the aforementioned values (e.g., from at most about 1000 μm to about 10 μm, from about 1000 μm to about 500 μm, or from about 500 μm to about 10 μm). The pre-transformed material may be used as a starting material in the 3D printing process. The maximal FLS may correspond with a size of the pre-transformed material (e.g., powder). A pre-transformed material that has a maximal FLS may contribute to (e.g., improved) transformation into a transformed material (e.g., at least a portion of a 3D object) during 3D printing. For example, a pre-transformed material having a maximal FLS may prevent formation of (e.g., material and/or structural) defects during 3D printing. A pre-transformed material that has a maximal FLS may contribute to a smooth flowability of the pre-transformed material in the material conveyance system. The smooth flowability may comprise a constant velocity, non-interrupted, continuous, or flow having minimal clogging, during the 3D printing cycle. The smooth flowability may be improved relative to a pre-transformed material that (e.g., substantially) comprises particles having also a larger FLS than the maximal FLS (e.g., arising from agglomerated particles). The particles having larger FLS may refer to a range of particle sizes (e.g., a distribution) that spans at least 200 microns from an average particle size of the pre-transformed material. The pre-transformed material may comprise particulate material (e.g., vesicles, beads, or powder). In some embodiments, pre-transformed (e.g., particulate) material is passed through the sieve to provide the maximal FLS particulate material. The sieve may comprise one or more holes. The sieve can comprise a mesh (e.g., a screen). The sieve can have a pore size that defines a (e.g., maximum) particle size that passes therethrough. The mesh may be formed of a durable material (e.g., durable with regard to passing the particulate material during at least one 3D printing cycle). For example, the durable material may have an operating lifetime (e.g., before replacement) that facilitates filtering at least about: 4 liters of material filtered per square centimeter of filter material (L/cm2), 5 L/cm2, 6 L/cm2, 7 L/cm2, 10 L/cm2, or 15 L/cm2. The operating lifetime of the durable material may be any value within a range of the aforementioned values (e.g., from about 4 L/cm2 to about 15 L/cm2, from about 4 L/cm2 to about 10 L/cm2, or from about 10 L/cm2 to about 15 L/cm2). The filter material may be the sieve. For example, the mesh may be formed of stainless steel or brass. The mesh may be formed from any material disclosed herein. Durable may be with respect to operation of a 3D printing system. For example, durable may refer to a volume of material that is passed through the mesh prior to a failure condition of the mesh. A failure condition may alter at least one aspect of the sieve. For example, an aspect of the sieve may be a rate at which the sieve passes material therethrough (e.g., a sieving rate). In some embodiments, a nominal (e.g., typical operation) sieve rate is at least about: 1 milliliter/(centimeter squared*minute) (mL/(cm2*min)) (where '*' denotes the mathematical multiplication operation), 1.5 mL/(cm2*min), 2 mL/(cm2*min), 3 mL/(cm2*min), 4 mL/(cm2*min), 5 mL/(cm2*min) or 6 mL/(cm2*min). The nominal sieve rate may be any value within a range of the aforementioned rates (e.g., from about 1 mL/(cm2*min) to about 6 mL/(cm2*min), from about 1 mL/(cm2*min) to about 4 mL/(cm2*min), or from about 4 mL/(cm2*min) to about 6 mL/(cm2*min)). A failure condition may correspond to a (e.g., detected) change in a sieve rate. A change in the sieve rate may be caused by at least one puncture in the mesh, at least one blockage in the mesh, and/or a de-coupling of the mesh with a surrounding element (e.g., a sieve cartridge frame). A volume of material may correspond with a number of layers deposited by a layer dispenser of the 3D printing system. The number of layers deposited corresponding to a durable mesh may be at least about: 10000 layers, 20000 layers, 25000 layers, 30000 layers, or 35000 layers. The number of layers deposited corresponding to a durable mesh may be any number of layers within a range of the aforementioned layers (e.g., from about 10000 layers to about 35000 layers, from about 10000 layers to about 25000 layers, or from about 25000 layers to about 35000 layers). For example, the sieve can have a pore size that is at least about 30 micrometers (μ), 40 μm, 60 μm, 80 μm, 100 μm, 500 μm or 1000 μm. The pore size of the sieve may be variable (e.g., the sieve having a range of pore sizes across the sieve). The pore size of the sieve may be (e.g., substantially) constant (e.g., during sieving). A fundamental length scale (FLS) of the particulate material may be at most about 100 μm, 80 μm, 40 μm, 20 μm, 10 μm or 1 μm in size.

In some embodiments, the agitator causes the sieve (e.g., via a frame) to move. The movement may comprise a translation (e.g., along an x-axis, along a y-axis, along a z-axis, or any combination thereof). The movement may comprise a vibration. The movement may comprise a rotation (e.g., about an x-axis, about a y-axis, about a z-axis, or a combination thereof). The agitator may be configured to induce mechanical agitation. Mechanical agitation may comprise movement of the sieve that is at most about 1 millimeter (mm), 2 mm, 5 mm, 10 mm, or 20 mm. Mechanical agitation may comprise movement of any distance within a range of the aforementioned distances (e.g., about 1 mm to about 20 mm, about 10 mm to about 20 mm, or about 1 mm to about 10 mm). Mechanical agitation may comprise vibration. Vibration may comprise de-blinding of the sieve (e.g., mesh). De-blinding may comprise causing clogged hole(s) in the sieve to open and allow flow of particulates therethrough. Vibration may comprise movement that is at least about 10 μm, 50 μm, 100 μm, 500 μm or 1000 μm. Vibration may comprise movement within any of the aforementioned values (e.g., from about 10 μm to about 1000 μm, from about 500 μm to about 1000 μm, from about 10 μm to about 500 μm). The agitator may comprise a motor coupled to a shaft, a cam, and/or a transducer (e.g., an ultrasonic transducer). In some embodiments the agitator comprises a controller operable to control one or more movement parameters. The movement parameters can comprise an amplitude of movement, a direction of movement, or a frequency of movement. The control may comprise control of an output power (e.g., amplitude and/or frequency) of the agitator. The controller may adjust the output power to maintain one or more values of one or more movement parameters. For example, the controller may adjust an output power to maintain an amplitude and/or frequency of agitator movement. For example, a power output may vary to maintain a given agitator movement amplitude and/or frequency as an inertial mass of the sieve (e.g., cartridge) changes. The amplitude may be an amplitude in a direction (e.g., X, Y or Z). The controller may adjust an output power to maintain a plurality of amplitudes and/or frequencies of agitator movement (e.g., each having another directional component, e.g., from X, Y and Z). An inertial mass of the sieve cartridge may change due to material buildup or removal (e.g., during filtering). In some embodiments, an output power of a transducer may be from about 50 W to about 600 W. The control may comprise a booster (e.g., an attenuator) that is operable to adjust the output power by a factor. The factor may be greater than or less than 1. For example, the factor may be about 1.5, about 3, about 5, or about 10. The factor may be any value within a range of the aforementioned values (e.g., from about 1.5 to about 10, from about 1.5 to about 5, from about 5 to about 10). For example, the factor may be about 0.25, about 0.5, about 0.75, or about 0.9. The factor may be any value within a range of the aforementioned values (e.g., from about 0.25 to about 0.9, from about 0.25 to about 0.5, from about 0.5 to about 0.9).

In some embodiments, the sieve is a part of a sieve assembly. A sieve assembly may comprise several portions. For example, a sieve assembly may comprise (i) a portion for receiving pre-transformed material (e.g., new and/or recycled), (ii) a portion for separating larger particles from those having the maximal FLS, (iii) a portion for receiving the sieved particles to provide to a material conveyance system (e.g., directly or via at least one container), (iv) a portion for receiving (e.g., discarding) the material (e.g., particles or agglomerates) having a FLS larger than the requested maximal FLS, (v) a portion for securing at least one sieve screen, (vi) a portion for coupling with at least one agitator (e.g., device for translating one or more sieve screens), or (vii) a portion for detection and/or monitoring performance of a sieve operation of the sieve. In some embodiments, at least two of portions (i)-(vii) are included in the same portion of the sieve assembly. In some embodiments, at least two of portions (i)-(vii) are included in different portions of the sieve assembly. In some embodiments, the sieve assembly comprises at least two of a given portion (e.g., at least two sieve portions, (ii)). In some embodiments, the pre-transformed material is sieved through a plurality of sieving assemblies are arranged in parallel (e.g., to facilitate continuous sieving, e.g., in case at least one sieving assembly of the plurality is not operational and at least one other sieving assembly of the plurality is operational). In some embodiments, a sieving assembly may comprise a plurality of sieves that are arranged sequentially, to facilitate quicker sieving. In the plurality of sieves, a given sieve has an average hole size that is larger than a sieve arranged subsequent thereto. In some embodiments at least two of the plurality of sieves are agitated by the same agitator. In some embodiments at least two of the plurality of sieves are each agitated by a different agitator.

At times, the sieve screen forms a part (e.g., portion) of a sieve cartridge. The sieve cartridge may comprise a cartridge frame. The cartridge frame may surround and/or support the sieve screen. The cartridge farm may surround the sieve screen at least in part (e.g., around a circumference of the screen). The cartridge frame may be configured to couple with an (e.g., at least one) agitator. In some embodiments, (e.g., at least one of) the agitator or the cartridge frame comprises an agitation shaft that passes through at least a portion of a securing portion (e.g., portion (v)) to form the coupling. An agitator may cause the sieve to move (e.g., directly by moving the sieve, and/or indirectly by moving the cartridge frame). The movement may comprise a translation (e.g., along an x-axis, along a y-axis, along a z-axis, or any combination thereof). The movement may comprise a vibration. The movement may comprise a rotation (e.g., about an x-axis, about a y-axis, about a z-axis, or any combination thereof). Coupling may be via at least one: threaded fastener, snap-fit fastener, press fit, and/or compression fit. In some embodiments, a perimeter of the cartridge frame is drafted (e.g., having a smaller width at one side compared to a width at an opposing side). A drafted cartridge frame may facilitate (e.g., reversible) coupling with a sieve assembly body. Reversible coupling may comprise retractable coupling (e.g., insertion and removal).

At times, at least a portion of the sieve assembly is formed for isolation (e.g., mechanical decoupling) from another (e.g., remaining) portion(s) of a sieve assembly. For example, the sieve cartridge may be (e.g., mechanically) isolated from a remainder of the sieve assembly. Isolation of the portion (e.g., the sieve cartridge) from a remainder of the sieve assembly may reduce energy transmission from the sieve cartridge (e.g., as it is agitated) to the remainder of the sieve assembly. For example, isolation may reduce the heat generated or transferred to the remaining portions of the sieve assembly (e.g., from the moving sieve cartridge). For example, isolation may reduce the sound generated by the sieve assembly (e.g., reduce compared to non-isolated sieve cartridge movement). For example, isolation may reduce vibration generated or transferred to the remaining portions of the sieve assembly (e.g., from the moving sieve cartridge). In some embodiments, isolation is produced by one or more isolation elements coupled to the at least the portion of the sieve assembly formed for isolation. The one or more isolation elements may be configured to absorb energy (e.g., mechanical, thermal, or acoustic). Th one or more isolation elements may be configured to absorb vibrations, heat, and/or sound. The one or more isolation elements may comprise a gasket, bumper, spring, sponge, bellow, cloth, cork, and/or a membrane. An isolation element may be a (substantially) inelastic material that is formed in a conformation to behave as a spring (e.g., in a coil, in a wave). An isolation element may be formed of a flexible material. For example, an isolation element may absorb vibrations (e.g., in like manner to a dampened spring, felt, and/or a sponge). The flexible material may be an elastic material (e.g., comprising natural rubber, synthetic rubber, fluoropolymer elastomer, or silicone). The flexible material may be elastic (e.g., an elastomer). The flexible material may comprise an organic or silicon-based material (e.g., polymer or resin).

In some embodiments, the cartridge frame is (e.g., substantially) isolated from a remainder of the sieve assembly. Isolation may be mechanically, thermally, and/or acoustically (e.g., isolation inter terms of vibration, heat, and/or sounds). The cartridge frame may comprise (e.g., at least one) isolation element coupled with (e.g., at least one) external face of the cartridge frame. In some embodiments the isolation element surrounds an (e.g., at least a portion of the) external face of the cartridge frame. The isolation element may facilitate placement of the cartridge frame into its proper position within a sieve assembly. The isolation element may (e.g., substantially) prevent transmission of un-sieved particles to the material conveyance system. The cartridge frame may comprise at least one isolation element (e.g., bumper) disposed for the sieve cartridge to rest upon. For example, the bumper may comprise an O-ring or a plug.

At times, the sieve assembly is configured to facilitate atmospheric isolation on an interior volume of the sieve assembly. In some embodiments the sieve assembly is configured to be reversibly (e.g., substantially) sealed from an external environment (e.g., atmosphere). At times, the sieve assembly atmosphere is the same as the atmosphere in a remainder of the material conveyor system. For example, the atmosphere may be a non-reactive and/or inert atmosphere. Non-reactive may be with the pre-transformed material and/or with the transformed material (e.g., before, after and/or during printing). At times, the sieve assembly atmosphere is different than the atmosphere in a remainder of the material conveyor system. For example, the sieve assembly may comprise one or more valves for selective opening and closing of material and/or gas flow channels from the sieve assembly to other portions of the material conveyor system. The valves may be controlled manually and/or automatically (e.g., using at least one controller). For example, valves may be located above and/or below the sieve assembly (e.g., where above and below are with respect to a direction of material and/or gas flow). For example, one or more valves may be disposed upstream of one or more separating units (e.g., cyclones) that input material into the sieve assembly inlet(s) for filtering. At least two separating units that input material into the sieve assembly may be disposed in parallel and/or in series. For example, a valve may be disposed at an opening of (e.g., pressurized) container for storing filtered (e.g., sieved) particles having the maximal FLS (e.g., filtered pre-transformed material). For example, a valve may be disposed along a channel. The channel may be configured for movement of a gas within the channel. The channel may be one that connects the material conveyance system to the sieve assembly. The channel may be configured to transmit material to the sieve and/or from the sieve assembly. The valve may be disposed along the channel, at an opening of the channel, and/or at the connection of the channel with the sieving assembly. An inert atmosphere may be maintained in the (e.g., pressurized) container by closing the container valve prior to exposing any portion of the sieve assembly to external atmosphere. During operation, the atmosphere in the sieving assembly may be at or above atmospheric pressure. Atmospheric isolation of the sieve assembly may enable one or more (e.g., maintenance) operations to be performed on the sieve assembly without affecting an atmosphere in another (e.g., remaining) portion of the material conveyor system. For example, a maintenance operation may comprise a sieve cartridge insertion or removal (e.g., a sieve cartridge swap). The sieve assembly may comprise a (e.g., at least one) gas inlet channel for receiving a (e.g., inert) gas. The gas inlet channel may comprise a valve. An atmosphere of the sieve assembly may be purged following an opening and/or closure of one or more (e.g., material and/or gas channel) valves. Purging the internal atmosphere of the sieve assembly may facilitate exchange of the gaseous content of the atmosphere (e.g., from ambient atmosphere to insert atmosphere). The sieve assembly may be configured to hold a pressure above atmospheric pressure during the sieving. For example, the sieve assembly may be hermetically sealed. The sieving assembly may comprise a closable opening that is gas tight (e.g., upon closure). Gas tight may be at least during a duration of uninterrupted operation of the sieve assembly.

At times, performance of the filtering is monitored to assess one or more characteristics of the material conveyor system operation. For example, the material conveyor system characteristics may comprise (a) a rate at which a sieve assembly is filtering newly introduced and/or recycled material, (b) a rate at which discarded material is accumulating (e.g., in a removal container), (c) a rate at which filtered material is accumulating (e.g., in a storage container), or (d) a performance parameter of an agitator coupled with a sieve cartridge. The performance parameter may comprise power output from the agitator. Monitoring may include (e.g., human) inspection and/or one or more measurements by a monitoring device. The inspection can be manual and/or using a detector. The detector may comprise a sensor. The sensor may comprise a material sensor, flow sensor, or optical sensor (e.g., optical density sensor). The inspection may be facilitated using a window coupled to the sieve assembly. The window may facilitate detecting (e.g., viewing) the sieve. Filtering (e.g., sieving) performance may be considered to assess a (e.g., operating) condition of one or more components of the sieve assembly. For example, a condition of a sieve screen, an agitator, a sieve cartridge-agitator coupling, a material removal container (e.g., a trash can), a (e.g., sieved particles) material storage (e.g., pressure) container, and/or a material conveyance channel may be assessed.

At times, data regarding the filtering performance are gathered by one or more sensors. The sensor may be disposed within or outside of (e.g., adjacent to) the sieve assembly. The sensor(s) may be integrated in one or more walls of the sieve assembly. The one or more sensors may detect a material level (e.g., a fill level), a volume of material, a rate at which a material moves (e.g., is filtered and/or removed), and/or a material type. The one or more sensors may comprise a flow sensor, a distance sensor (e.g., an optical, interferometric, laser, inductance and/or capacitance), or an optical path density detector (e.g., an optical flow sensor). The one or more sensors may comprise an oxygen and/or humidity sensor. The one or more sensors may be disposed at one or more locations within a material conveyor system. For example, one or more sensors may be disposed before and/or after a sieve cartridge (e.g., with respect to the direction of a material flow). For example, the one or more sensors may be disposed in a channel, a chamber, or an opening (e.g., formed in a wall) of one or more components of the material conveyor system. For example, one or more sensors may be disposed in a chamber of the sieve assembly above a sieve cartridge and/or in a chamber below the sieve cartridge. The one or more sensors may be disposed to monitor (i) a filtered material (e.g., particles having the maximal FLS) container, (ii) a (debris and/or detritus) material removal container, and/or (iii) a sieve assembly (e.g., chamber). In some embodiments a sensor comprises a monitor of a power output of an agitator (e.g., a transducer).

Figure 8:
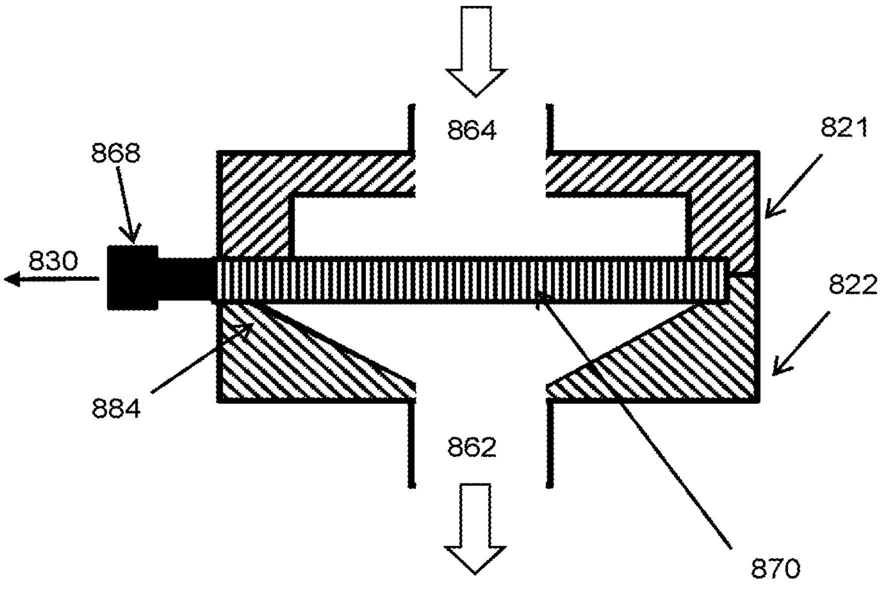
FIG. 8 schematically illustrates a vertical cross section in a sieving assembly.
Figure 8:
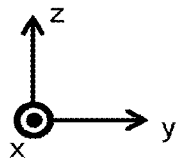

FIG. 8 depicts an example of a sieve assembly (also referred to herein as "filtering enclosure" or "filter housing"). The filter can have two separable portions of be made of a single portion. In the example shown in FIG. 8, the filter has a first portion 821 is disposed adjacent to (e.g., above) a second (e.g., bottom) portion 822. The filter has an opening 864 for receiving a (e.g., inhomogeneous) material into a region (e.g., volume) of the sieve assembly formed by between the top portion 821 and the sieve cartridge 870 composing the filtration matrix (e.g., the sieve). The material to be filtered may be introduced (e.g., fed) via the inlet ports (e.g., via inlet port 864). In the example of FIG. 8, a portion for receiving sieved (e.g., particles having the maximal FLS) material within the sieve assembly is formed by a region (e.g., volume) between the bottom portion 822 and the sieve cartridge. The portion for receiving the sieved material may comprise at least one slanted surface that facilitates translation of the sieved material to the removal container (e.g., using gravity), which slanted surface is slanted towards an opening that fluidly couples the portion for receiving the sieved material with the removal container. In some embodiments, fluid coupling refers to a connection that facilitates flow (e.g., of the pre-transformed material). The sieve cartridge may be removed from the sieve assembly (e.g., from filtering housing) by separating portions 822 and 821, or by keeping the portions 822 and 821 connected and retracting the sieving matrix 870 by pulling the cartridge handle 868 in the direction 830, e.g., in a lateral direction. The filtered material (e.g., sieved material) exits the filter housing through exit opening 862. The isolation elements may be any isolation element as described herein. The isolation elements may be disposed on and/or in one or more faces of the sieve cartridge. The isolation elements may be in contact with the top portion of the sieve assembly, the bottom portion of the sieve assembly, the faceplate, or a combination thereof. In order to safely separate the sieving matrix from the sieving assembly, any material accumulated on the sieving matrix should be quenched (e.g., oxidized), e.g., using the passivation system and/or methodology disclosed herein.

In some embodiments, the filtering enclosure (also referred to herein as "sieve assembly") comprises a closure (e.g., door or window) that closes the cartridge opening. In some embodiments, the filtering enclosure and the cartridge opening door engage and/or disengage (e.g., reversibly engageable and separable). In some embodiments, the door is fastened to the filtering enclosure (e.g., by a hinge or hook). In some embodiments, the apparatus further comprises a closure that is configured to close the opening. In some embodiments, the closure reduces an exposure of the mechanism housed in the ancillary chamber from a reactive agent in the ambient (e.g., external) environment. The reactive agent may comprise oxygen, or water. The reactive agent may react with the reactant (e.g., pre-transformed material) or product (e.g., transformed material) of the printing, e.g., during, before, and/or after the printing. In some embodiments, the closure comprises a flapping, rolling, sliding door, or revolving door. In some embodiments, the closure is gas tight. In some embodiments the closure and/or filtering enclosure is made of any material disclosed herein (e.g., elemental metal or metal alloy). The closure and/or filtering enclosure may be opaque (e.g., non-transparent). The closure and/or filtering enclosure may comprise at least one section that is transparent section (e.g., comprising glass or a polymer). In some embodiments, the closure is a physical barrier. In some embodiments, the closure comprises a compressible and/or elastic material that seals the closure upon the cartridge opening by pressure. The pressure is formed by a closure of at least one hinge, level, and/or screw. The pressure may be by a pressing mechanism. The pressure may be by a fastener. In some embodiments, the closure is configured to disengage from the filtering enclosure during printing of the at least one three-dimensional object. In some embodiments, the closure is configured to engage and/or disengage from the filtering enclosure during printing of the at least one three-dimensional object without (e.g., substantially) disrupting the printing. The elastic material may comprise a polymer or resin. For example, the elastic material may comprise Teflon, rubber, or latex.

In some embodiments, filtering comprises monitoring the flow of the sieved or incoming material. The filtering performance monitoring may comprise a feedback in a filtering control system (e.g., to a controller).

Figure 9:
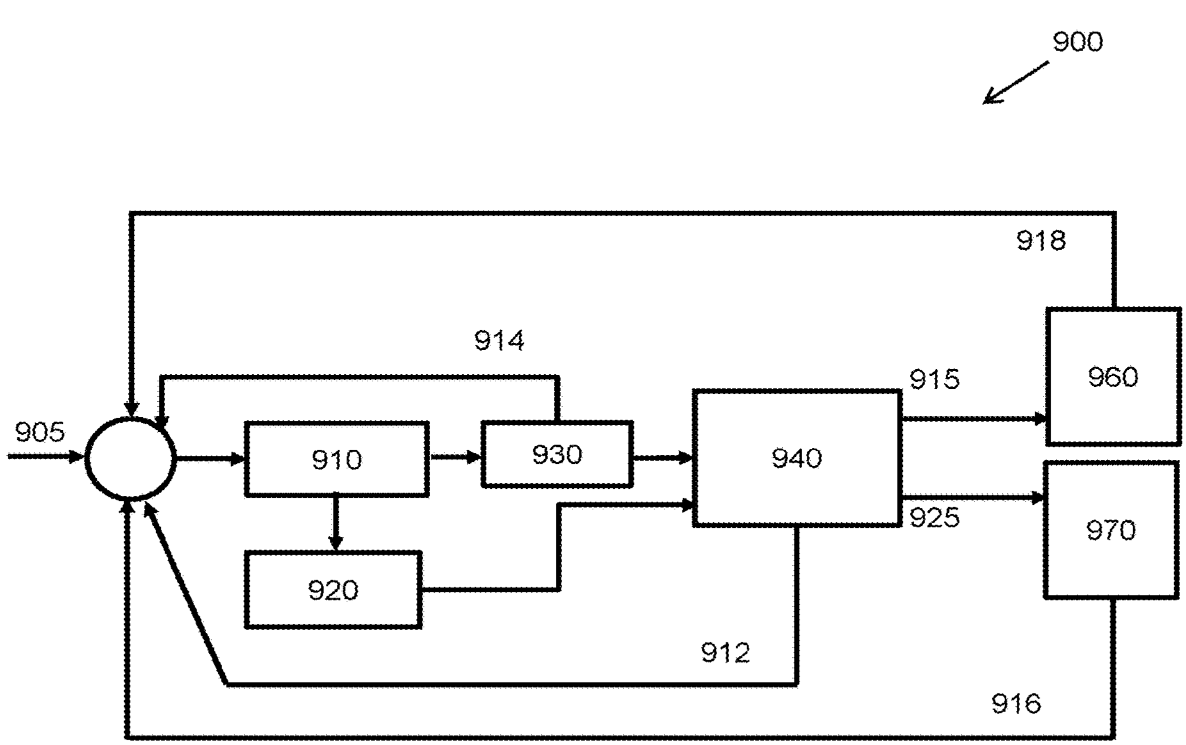
FIG. 9 schematically illustrates a control scheme.
Figure 10:
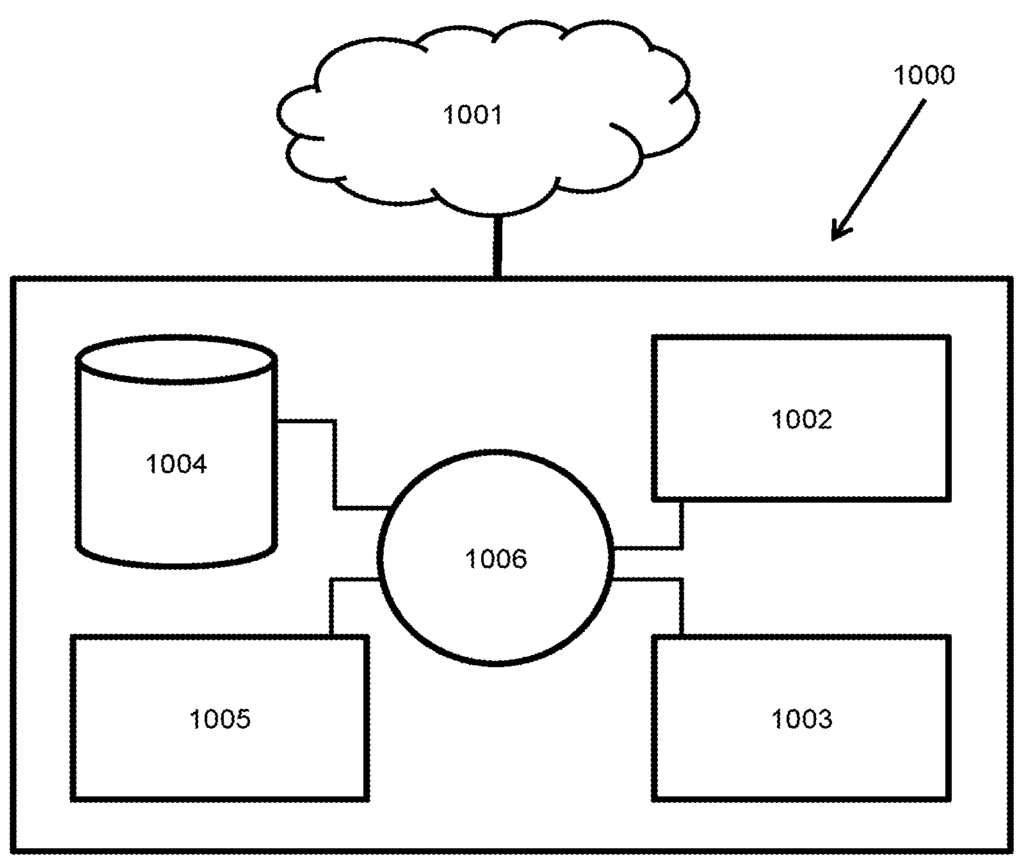
FIG. 10 schematically illustrates a computer system.

FIG. 9 depicts an example of a sieve assembly control system 900. The control system may comprise (e.g., at least one) controller. The controller may comprise electrical circuitry and/or a connection to electrical power. The controller may be programmed to implement methods of the disclosure. In the example of FIG. 9 a controller 910 receives instructions 905 regarding operation of the sieve assembly system. For example, the instructions may comprise activation and/or deactivation of the agitator and/or of one or more valves in the sieve assembly system. In the example of FIG. 9, the controller is operatively coupled with an agitator 930, a sieve cartridge changeover (e.g., swap) unit 920, a sieve assembly 940, a (e.g., debris) removal container 960 (e.g., a trash can), and a (e.g., sieved) material container 970. The cartridge exchange may be manual and/or automatic. For example, the sieve cartridge swap unit may comprise a robotic arm. Considering the received instructions, the controller may cause (I) the agitator to move at a selected amplitude and/or frequency (e.g., of oscillation), and/or (II) one or more valves to open and/or close. The one or more valves may be operable to introduce and/or prevent a flow of (e.g., inert) gas and/or a (e.g., unfiltered) material. For example, the controller may command the agitator to output power of a selected magnitude and/or frequency to move at the selected amplitude and/or frequency. The agitator may be operatively coupled with at least a portion of the sieve assembly (e.g., the sieve cartridge). For example, the controller may command a material inlet valve (e.g., to the sieve assembly), a material removal valve, and a material outlet valve (e.g., to a storage container) to open and/or close. In the example of FIG. 9, instructions 915 control operation of a (e.g., at least one) valve disposed within a channel between from the sieve assembly to the trash can. In the example of FIG. 9, instructions 925 control operation of a (e.g., at least one) valve disposed within a channel from the sieve assembly to a (e.g., sieved) material container. The sieve assembly control may comprise feedback from one or more sensors disposed within or adjacent to one or more components of the sieve assembly system. For example, a sensor may be a material level sensor, a material (e.g., flow) rate sensor, and/or a power (e.g., output) sensor. In the example of FIG. 9 feedback data 912 comprise information regarding (a) a material level at a top surface of a sieve cartridge, (b) a material flow (e.g., flux) through the sieve cartridge, and/or (c) a sieve cartridge movement amplitude and/or frequency. In the example of FIG. 9 feedback data 914 comprise information regarding an agitator output power parameter (e.g., wattage, voltage, and/or current) for moving the sieve cartridge at the selected amplitude and/or frequency. For example, the agitator output power to maintain a given sieve cartridge movement may vary according to a varying (e.g., inertial mass) condition of the sieve cartridge. A varying inertial mass of the sieve cartridge may be due to a material buildup on (e.g., a top surface of) the sieve cartridge, and/or within (e.g., pores of) the sieve cartridge. In the example of FIG. 9, feedback data 916 comprise information regarding a material level within and/or a material flux into the (e.g., sieved) material container; and feedback data 918 comprise information regarding a material level within and/or a material flux into the removal container.

At times, the controller is configured to detect an operating state of the sieve assembly. For example, the operating state may be determined considering feedback from the one or more sensors. The operating state may be: (A) a nominal condition; or (B) a failure condition. The failure condition may comprise (i) an obstructed sieve screen, (ii) a punctured sieve screen, and/or (iii) a de-coupling of the sieve screen and the agitator (e.g., shaft). The material level and/or material flux (e.g., flow rate) at or into respective portions of the sieve assembly may comprise (e.g., characteristic) threshold values. The threshold values may be indicative of operation in a nominal condition. A high or low value may be determined considering a comparison to a given threshold value (e.g., at a respective sieve assembly portion). For example, an obstructed sieve screen condition may be detected based on feedback indicative of (a) a high material level in the top portion of the sieve assembly, (b) a low material flow rate into the bottom portion of the sieve assembly, (c) a high material flow rate into the removal container, and/or (d) an increased power output required by the agitator to maintain a given amplitude of movement. For example, a punctured sieve screen condition may be detected based on feedback indicative of (e) a high material flow rate into the bottom portion of the sieve assembly, (f) a high material flow rate into the (e.g., sieved) material container), and/or (g) a decreased power output required by the agitator to maintain a given amplitude of movement. For example, a de-coupling (e.g., de-coupled) sieve screen from an agitator condition may be detected based on feedback indicative (h) a decreased power output required by the agitator to maintain a given amplitude of movement. In some embodiments, an operating state is determined considering feedback from a combination of sensors. For example, feedback from at least two sensors of a plurality of sensors may be considered in the determination of the operating state. For example, feedback from at least two portions of the sieve assembly is considered in the determination of the operating state.

In some embodiments, the controller is a part of a (e.g., high-speed) computing environment. The computing environment may be any computing environment described herein. The computing environment may be any computer and/or processor described herein. The controller may control (e.g., alter, adjust) the parameters of the components of the 3D printer (e.g., before, after, and/or during at least a portion of the 3D printing). The control (e.g., open loop control) may comprise a calculation. The control may comprise a feedback loop control scheme. In some examples, the control scheme may comprise at least two of (i) open loop (e.g., empirical calculations), and (ii) closed loop (e.g., feed forward and/or feedback loop) control scheme. In some examples, the feedback loop(s) control scheme comprises one or more comparisons with an input parameter and/or threshold. The threshold may be a value, or a relationship (e.g., curve, e.g., function). The threshold may comprise a calculated (e.g., predicted) threshold (e.g., setpoint) value. The threshold may comprise adjustment according to the closed loop and/or feedback control. The controller may use a material level and/or a material flow rate measurement of at least one portion of the sieve assembly. The controller may direct adjustment of one or more systems and/or apparatuses in the 3D printing system.

For example, the controller may direct adjustment of an angle at which a sieve cartridge is tilted within a sieve assembly, a flow rate of the material into the sieve assembly, and/or an agitator parameter. The agitation parameter may comprise frequency or amplitude of the agitation. For example, the controller may direct adjustment of (e.g., an amplitude and/or a frequency of) a sieve cartridge movement.

At times, the controller is configured to adjust one or more components and/or parameters of the sieve assembly in response to a detected condition. The adjustment may be performed in real time (e.g., before, during, and/or following at least a portion of the 3D printing). In some embodiments, in response to a detected sieve screen obstruction, the controller may be configured to (I) adjust an angle (e.g., tilt) at which the sieve cartridge is disposed within the sieve assembly, (II) adjust an agitator parameter (e.g., power output) to alter a sieve cartridge movement amplitude, and/or (III) initiate a sieve cartridge swap operation. In some embodiments, in response to a detected sieve puncture the controller may be configured to initiate a sieve cartridge swap operation. A sieve cartridge swap operation may be manual and/or automatic. For example, a sieve cartridge swap operation may be facilitated by a robot (e.g., robotic arm). In some embodiments, in response to a detected de-coupling of the sieve cartridge and the agitator the controller may be configured to initiate a maintenance operation. The maintenance operation may comprise coupling (e.g., re-coupling) the agitator (e.g., shaft) and the sieve cartridge. The maintenance operation may be manual and/or automatic.

At times, a build module of a 3D printing system is configured for operational coupling (e.g., engagement) with an unpacking station. The unpacking station may be any unpacking station that is disclosed in Patent Application Serial Number PCT/US17/39422, titled "THREE-DIMENSIONAL PRINTING AND THREE-DIMENSIONAL PRINTERS," filed on Jun. 27, 2017, which is incorporated herein by reference in its entirety. The unpacking station may be configured to engage with at least one build module. The unpacking station may be configured to manipulate (e.g., insert and/or remove) at least one build module to an unpacking chamber. The build module may comprise a platform upon which a 3D object formed by the 3D printing rests and/or is attached. The build module may comprise (e.g., un-transformed) pre-transformed material disposed surrounding the formed 3D object (e.g., a material collection). The unpacking station may be configured to remove (e.g., separate) a formed 3D object from a build plate (e.g., of the build module). The unpacking station may be configured to remove (e.g., recycle) at least some of the pre-transformed material from the build module. The unpacking may comprise a manipulator arm that is configured to grasp and to move a 3D object formed by the 3D printing and/or a build module. The unpacking may be a glove box that is configured to allow an operator in an ambient environment to grasp and to move a 3D object located in an environment different from ambient (e.g., an inert environment). The unpacking station may comprise a gas conveyor system. The unpacking station may comprise an unpacking material conveyor system. The gas and/or material conveyor systems may comprise at least one compressor, at least one blower, or at least one valve. In some embodiments, the unpacking material conveyor system forms a part of a material conveyor system of a coupled 3D printing system. In some embodiments, the unpacking material conveyor system is separate (e.g., distinct) from a material conveyor system of a coupled 3D printing system. The unpacking material conveyor system may comprise any of the components and/or any of the component arrangements of the 3D printing system material conveyor system(s) described herein.

In some embodiments, an amount of material recycled by a recycling system (e.g., and by any of its components) is greater than an amount of material that remains in the material bed. The material that remains in the material bed may be that which remains following removal of excess material after dispensing the material. The material recycled may be excess material. The excess material may be removed (e.g., following a dispensing operation) to the recycling system by a leveling mechanism (e.g., a blade and/or a vacuum). For example, the amount of material recycled for a given deposited material layer may be greater than the amount of material that forms the given layer (e.g., that remains in the material bed). For example, the amount of material recycled (e.g., by the recycling system or any of its components) during formation of a 3D object may be greater than the amount of material deposited within a material bed during the formation of the 3D object. In some embodiments, the amount of material recycled by the recycling system (e.g., and by any of its components) may be a majority of the material dispensed (e.g., by a material dispenser). For example, the amount of material recycled may be at least about 51%, 60%, 70%, 80%, 85%, 90%, 95%, or 98% of the material dispensed by the material dispenser. The amount of material recycled may be any value within a range of the aforementioned values (e.g., from 51% to 98%, from 51% to 70%, or from 70% to 98%). The aforementioned (e.g., percentage) amount of recycled material may refer to a volume of material. The aforementioned (e.g., percentage) amount of recycled material may refer to a relative height of material (e.g., on the material bed). The recycling system may be configured to recycle at least 50 kilograms (kg), 100 kg, 200 kg, 500 kg, 1000 kg, 5000 kg, or 10000 kg of material during the printing and/or before the cartridge requires a change (e.g., without exchanging the filter). The recycling system (e.g., and by any of its components) may be configured to support these recycling characteristics.

At times, a gas flow exiting a cyclonic separator comprises remaining material (e.g., that was not removed). For example, soot particles may remain in the gas flow following the (e.g., first) separation of the material from the gas flow. The exiting gas may comprise a remaining material including particles of a fundamental length scale (FLS) of at most about 0.1 μm, 0.5 μm, 1 μm, 2 μm, 5 μm, 8 μm or 10 μm. The remaining material particle FLS may be any value within a range of the aforementioned values (e.g., from about 0.1 μm to about 10 μm, from about 0.1 μm to about 5 μm, or from 5 μm to about 10 μm). The gas exiting the cyclonic separator may undergo a second cyclonic separation. The gas exiting the (e.g., first and/or second) cyclonic separator may be passed through a filter (e.g., scrubbed) to remove any remaining (e.g., fine) material. The filter may be a ventilation filter. The ventilation filter may capture fine particles (e.g., soot and/or powder) from the 3D printing system. The filter may comprise a paper, glass (e.g., fiber), carbon (e.g., fiber), metal (e.g., fiber), High Density Polyethylene, or polyethersulfone (PES) filter. The filter may be a membrane filter. The filter may comprise a high-efficiency particulate arrestance (HEPA) filter (a.k.a., high-efficiency particulate arresting or high-efficiency particulate air filter). The gas exiting the cyclonic separator may be provided (i) to another portion of the 3D printing system (e.g., to the processing chamber, to a pressure container), and/or (ii) to an unpacking station (e.g., unpacking chamber).

In some embodiments, an operation of the separator comprises a vortex separation (e.g., using a cyclone). For example, the operation of the cyclonic separator can comprise a centrifugal separation (e.g., using a cyclone). In some embodiments, an internal compartment of a separator comprises a cyclone. The operation of the cyclonic separator can comprise gravitational separation. The operation of the cyclonic separator can comprise rotation of the (e.g., pre-transformed) material and/or debris (e.g., in the internal compartment of the separator). The separator may be configured to separate gas borne particulates based on their (e.g., average) FLS. In some embodiments, particles of the material having the separation FLS are attracted to and/or thrusted to a wall of the cyclonic separator. The particles attracted to, and/or thrusted to the wall may be removed from the flow of gas that carried the material into the cyclonic separator (e.g., via a removal mechanism). The particles removed from the flow of gas may rest at a position configured to collect the particulate material upon separation, e.g., (i) a depression (e.g., crevice) at a wall of the separator or (ii) the bottom of the internal compartment of the cyclonic separator. Bottom may be towards the gravitational center, and/or towards a target surface. In some embodiments, the removed particles of material may be provided to (e.g., an inlet of) a further separation assembly (e.g., a sieve assembly).

In some embodiments, the flow of gas for carrying the material into the cyclonic separator is generated by a force source (e.g., a vacuum source, a pump, and/or a blower such as a fan). The material carried by the flow of gas may be transported into the internal compartment of the cyclonic separator from: (i) a material bed (e.g., of the processing chamber), (ii) a pressure container, (iii) an unpacking chamber, and/or (iv) a source of new (e.g., pre-transformed) material. The force source may be (e.g., fluidly) coupled with the internal compartment of the cyclonic separator and/or sieve. The gas(es) forced with the carried material into the internal compartment of the cyclonic separator may rotate within at a rotational speed to form a cyclone. The internal compartment may comprise a cone having its long axis perpendicular to the target surface and/or its narrow end pointing towards the target surface. The internal compartment may comprise a cone having its long axis perpendicular to a gravitational field vector and/or its narrow end pointing towards a gravitational field vector. Alternatively, the internal compartment may comprise a cone having its long axis parallel to the target surface and/or the gravitational field vector, and/or its narrow end pointing towards a side wall of the enclosure. The gas may flow in the internal compartment in a helical pattern along the long axis of the cyclone. During an operation of the cyclonic separator, the material moved into the cyclone may concentrate at the walls of the cyclone and gravitate to and accumulate at the depression in the wall of the separator (configured to collect the separating) and/or at the separator's bottom. The accumulated (e.g., pre-transformed and/or debris) material may be removed from the collection area. The accumulated material may be provided to a subsequent separator. In some embodiments, the material collecting at the walls travels to a second separator (e.g., a subsequent cyclone or a sieve assembly). In some embodiments, a subsequent separator comprises a sieve assembly. In some examples, the material that enters the internal compartment of the cyclonic separator is of a first velocity, and is attracted towards the force source. On its way to the force source, the material may lose its velocity in the internal compartment and precipitate toward the bottom of the cyclone and/or towards the collection area. In some examples, the gas that enters the internal compartment of the cyclonic separator is of a first velocity, and is attracted towards the force source (e.g., pump). On its way to the connector, the gaseous material may lose its velocity in the internal compartment, for example, due to an expansion of the cross section of the internal compartments. In some embodiments an obstruction may be placed to exacerbate a volume difference between portions of the cyclone that are closer to the exit opening relative to those further from the exit opening.

At times, the separation and subsequent filtration of the material from the gas flow is performed at predetermined times. For example, after one or more operations of planarizing a layer of pre-transformed material in the material bed, the cyclone may separate (e.g., pre-transformed and/or debris) material from a gas flow. For example, the exiting gas from the cyclonic separator may be filtered (e.g., scrubbed) of any remaining (e.g., soot) particles. Filtration of the exiting gas from the cyclonic separator may occur prior to introduction of the gas into a remaining portion of the 3D printing system (e.g., a processing chamber, an unpacking chamber). In some embodiments, the separation and subsequent filtration of the material from the gas flow is performed (e.g., substantially) continuously (e.g., in real time during at least part of the 3D printing, for example during transformation and/or during operation of the material conveyance system).

At times, a 3D printing cycle corresponds with (i) depositing a (planar) layer of pre-transformed material (e.g., as part of a material bed) above a platform, and (ii) transforming at least a portion of the pre-transformed material to form one or more 3D objects above the platform (e.g., in the material bed). The depositing in (i) and the transforming in (ii) may comprise a print increment. At times, the platform supports a plurality of material beds. One or more 3D objects may be formed in a single material bed during a printing cycle (e.g., print job). The transformation may connect transformed material of a given layer (e.g., printing cycle) to a previously formed 3D object portion (e.g., of a previous printing cycle). The transforming operation may comprise utilizing an energy beam to transform the pre-transformed (or the transformed) material. In some instances, the energy beam is utilized to transform at least a portion of the material bed (e.g., utilizing any of the methods described herein). During a printing cycle, the one or more objects may be printed in the same material bed, above the same platform, with the same printing system, at the same time span, using the same printing instructions, or any combination thereof. A print cycle may comprise printing the one or more objects layer-wise (e.g., layer-by-layer). A layer may comprise a layer height. A layer height may correspond to a height of (e.g., distance between) an exposed surface of a (e.g., newly) formed layer with respect to a (e.g., top) surface of a prior-formed layer. In some embodiments, the layer height is (e.g., substantially) the same for each layer of a print cycle within a material bed. In some embodiments, at least two layers of a print cycle within a material bed have different layer heights. A printing cycle may comprise a collection (e.g., sum) of print increments (e.g., deposition of a layer and transformation of a portion thereof to form at least part of the 3D object). A build cycle may comprise one or more build laps (e.g., the process of forming a printed incremental layer, At times, (e.g., pre-transformed) material is added to the 3D printing system during the 3D printing operation. In some embodiments, the material may be added (e.g., from a bulk reservoir) to the 3D printing system without interruption of at least a portion of the 3D printing. Without interruption may refer to introduction of one or more materials to an environment of the 3D printing system. For example, with minimal introduction of (e.g., ambient air) a reactive agent to an (e.g., any) enclosed portion of the 3D printing system. The reactive agent may be a gas or may be gas borne. The reactive agent may comprise water, hydrogen sulfide, or oxygen. The reactive agent may react with the transformed material (e.g., during and/or after its transformation). Interruption may be regarding at least one process of the 3D printing system (e.g., formation of at least a portion of a 3D object). In some embodiments, the 3D printing system is able to print a plurality of objects without interruption due to a pre-transformed material addition operation. For example, the 3D printing system is able to print at least 1, 5, 10, 15, 50, 100, 500, or 1000 printing cycles without interruption by a pre-transformed material addition operation. The 3D printing system may uninterruptedly print any number of printing cycles within a range of the aforementioned number of printing cycles (e.g., from about 1 to about 1000 cycles, from about 1 to about 500 cycles, or from about 500 to about 1000 cycles). For example, the 3D printing system is able to print (e.g., transform) at least a threshold volume of material without interruption from a pre-transformed material addition operation. In some embodiments, the 3D printing system is able to transform (e.g., print) at a throughput of at least about 6 cubic centimeters of material per hour (cc/hr), 12 cc/hr, 48 cc/hr, 60 cc/hr, 120 cc/hr, 480 cc/hr, or 600 cc/hr. The 3D printing system may print at any rate within a range of the aforementioned values (e.g., from about 6 cc/hr to about 600 cc/hr, from about 6 cc/hr to about 120 cc/hr, or from about 120 cc/hr to about 600 cc/hr). In some embodiments, the 3D printing system can operate (e.g., continuously) without interruption for a period of time of at least about 6 hours (hr), 8 hr, 12 hr, 16 hr, 24 hr, 2 days, 7 days, 15 days, or 1 month. The 3D printing system may operate without interruption for any period of time within a range of the aforementioned values (e.g., from about 6 hr to about 1 month, from about 6 hr to about 15 days, or from 15 days to about 1 month). In some embodiments, at least two pre-transformed material addition operations may be performed without interruption of the 3D printing system.

In some embodiments, the bulk reservoir (e.g., reversibly) couples with a component of the 3D printing system. For example, the (e.g., target) component with which the bulk reservoir couples to add the pre-transformed material may be (i) a pressure container, (ii) a (e.g., cyclonic) separator, (iii) a sieve assembly, or (iv) any combination thereof. The bulk reservoir may engage with the (e.g., target) component by a channel. The channel may facilitate coupling and/or fluidic connection of the bulk reservoir. Fluidic connection may refer to a flow of a material (e.g., in any material phase). The channel may comprise a gas flow. In some embodiments, pre-transformed material is moved from the bulk reservoir to the target component in a dense phase conveyance. In some embodiments, pre-transformed material is moved from the bulk reservoir to the target component in a dilute phase conveyance. In some embodiments, the bulk reservoir is configured to couple with at least two target components. In some embodiments, the bulk reservoir is configured to couple with the at least two target components (e.g., substantially) simultaneously. In some embodiments, the bulk reservoir is configured to couple with the at least two target components at alternating times. The insertion of the pre-transformed material into the component may be controlled. Control may comprise using one or more valves (e.g., FIG. 4, 422, and/or 424). The valves may be any valve described herein.

In some embodiments, pre-transformed material is added (e.g., inserted) to the 3D printing system at a predetermined time. In some embodiments, pre-transformed material is added to the 3D printing system in response to a determined state (e.g., a low pre-transformed material level). For example, a low pre-transformed material level (e.g., within a pressure container) may be determined considering data from one or more sensors disposed adjacent to or within a container. For example, a volume of material (e.g., remaining) in the 3D printing system may be determined considering a volume of pre-transformed material that has been transformed (e.g., during formation of at least a portion of a 3D object).

In some embodiments, the methods, systems, and/or the apparatus described herein may comprise at least one valve. The valve may be shut or opened according to an input from the at least one sensor, or manually. The degree of valve opening or shutting may be regulated by the control system, for example, according to at least one input from at least one sensor. The systems and/or the apparatus described herein can include one or more valves, such as throttle valves.

In some embodiments, the methods, systems, and/or the apparatus described herein comprise a motor. The motor may be controlled by the control system and/or manually. The apparatuses and/or systems described herein may include a system providing the material (e.g., powder material) to the material bed. The system for providing the material may be controlled by the control system, or manually. The motor may connect to a system providing the material (e.g., powder material) to the material bed. The system and/or apparatus of the present invention may comprise a material reservoir. The material may travel from the reservoir to the system and/or apparatus of the present invention. The material may travel from the reservoir to the system for providing the material to the material bed. The motor may alter (e.g., the position of) the substrate and/or to the base. The motor may alter (e.g., the position of) the elevator. The motor may alter an opening of the enclosure (e.g., its opening or closure). The motor may be a step motor or a servomotor. The methods, systems and/or the apparatus described herein may comprise a piston. The piston may be a trunk, crosshead, slipper, or deflector piston.

In some examples, the systems and/or the apparatus described herein comprise at least one nozzle. The nozzle may be regulated according to at least one input from at least one sensor. The nozzle may be controlled automatically or manually. The controller may control the nozzle. The nozzle may include jet (e.g., gas jet) nozzle, high velocity nozzle, propelling nozzle, magnetic nozzle, spray nozzle, vacuum nozzle, or shaping nozzle (e.g., a die). The nozzle can be a convergent or a divergent nozzle. The spray nozzle may comprise an atomizer nozzle, an air-aspirating nozzle, or a swirl nozzle.

In some examples, the systems and/or the apparatus described herein comprise at least one pump. The pump may be regulated according to at least one input from at least one sensor. The pump may be controlled automatically or manually. The controller may control the pump. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valve-less pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump. In some examples, the systems and/or the apparatus described herein include one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector.

In some embodiments, the systems, apparatuses, and/or components thereof comprise a communication technology. The communication technology may comprise a Bluetooth technology. The systems, apparatuses, and/or components thereof may comprise a communication port. The communication port may be a serial port or a parallel port. The communication port may be a Universal Serial Bus port (i.e., USB). The systems, apparatuses, and/or components thereof may comprise USB ports. The USB can be micro or mini USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The surface identification mechanism may comprise a plug and/or a socket (e.g., electrical, AC power, DC power). The systems, apparatuses, and/or components thereof may comprise an adapter (e.g., AC and/or DC power adapter). The systems, apparatuses, and/or components thereof may comprise a power connector. The power connector can be an electrical power connector. The power connector may comprise a magnetically attached power connector. The power connector can be a dock connector. The connector can be a data and power connector. The connector may comprise pins. The connector may comprise at least 10, 15, 9, 20, 22, 24, 26, 28, 30, 40, 42, 45, 50, 55, 80, or 100 pins.

In some embodiments, the systems, apparatuses, and/or components thereof comprise one or more controllers. The controller(s) can include (e.g., electrical) circuitry that is configured to generate output (e.g., voltage signals) for directing controlling one or more aspects of the apparatuses (or any parts thereof) described herein. The controllers may be shared between one or more systems or apparatuses. Each apparatus or system may have its own controller. Two or more systems and/or its components may share a controller. Two or more apparatuses and/or its components may share a controller. The controller may monitor and/or direct (e.g., physical) alteration of the operating conditions of the apparatuses, software, and/or methods described herein. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from a sensor). The controller may deliver an output. The controller may comprise multiple controllers. The controller may receive multiple inputs. The controller may generate multiple outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise a keyboard, keypad, mouse, touch screen, microphone, speech recognition package, camera, imaging system, or any combination thereof. The outputs may include a display (e.g., screen), speaker, or printer. The controller may be any controller (e.g., a controller used in 3D printing) such as, for example, the controller disclosed in patent application Ser. No. 15/435,065 that is incorporated herein by reference in their entirety.

At times, the methods, systems, and/or the apparatus described herein further comprise a control system. The control system can be in communication with one or more energy sources and/or energy (e.g., energy beams). The energy sources may be of the same type or of different types. For example, the energy sources can be both lasers, or a laser and an electron beam. For example, the control system may be in communication with the first energy and/or with the second energy. The control system may regulate the one or more energies (e.g., energy beams). The control system may regulate the energy supplied by the one or more energy sources. For example, the control system may regulate the energy supplied by a first energy beam and by a second energy beam, to the pre-transformed material within the material bed. The control system may regulate the position of the one or more energy beams. For example, the control system may regulate the position of the first energy beam and/or the position of the second energy beam.

In some embodiments, the 3D printing system comprises a processor. The processor may be a processing unit. The controller may comprise a processing unit. The processing unit may be central. The processing unit may comprise a central processing unit (herein "CPU"). The controllers or control mechanisms (e.g., comprising a computer system) may be programmed to implement methods of the disclosure. The processor (e.g., 3D printer processor) may be programmed to implement methods of the disclosure. The controller may control at least one component of the systems and/or apparatuses disclosed herein. FIG. 7 is a schematic example of a computer system 700 that is programmed or otherwise configured to facilitate the formation of a 3D object according to the methods provided herein. The computer system 700 can control (e.g., direct, monitor, and/or regulate) various features of printing methods, apparatuses and systems of the present disclosure, such as, for example, control force, translation, heating, cooling and/or maintaining the temperature of a powder bed, process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 700 can be part of, or be in communication with, a 3D printing system or apparatus. The computer may be coupled to one or more mechanisms disclosed herein, and/or any parts thereof. For example, the computer may be coupled to one or more sensors, valves, switches, motors, pumps, scanners, optical components, or any combination thereof.

The computer system 700 can include a processing unit 706 (also "processor," "computer" and "computer processor" used herein). The computer system may include memory or memory location 702 (e.g., random-access memory, read-only memory, flash memory), electronic storage unit 704 (e.g., hard disk), communication interface 703 (e.g., network adapter) for communicating with one or more other systems, and peripheral devices 705, such as cache, other memory, data storage and/or electronic display adapters. The memory 702, storage unit 704, interface 703, and peripheral devices 705 are in communication with the processing unit 706 through a communication bus (solid lines), such as a motherboard. The storage unit can be a data storage unit (or data repository) for storing data. The computer system can be operatively coupled to a computer network ("network") 701 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

In some examples, the processing unit executes a sequence of machine-readable instructions, which can be embodied in a program or software. The instructions may be stored in a memory location, such as the memory 702. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 700 can be included in the circuit.

In some examples, the storage unit 704 can store files, such as drivers, libraries, and saved programs. The storage unit can store user data (e.g., user preferences and user programs). In some cases, the computer system can include one or more additional data storage units that are external to the computer system, such as located on a remote server that is in communication with the computer system through an intranet or the Internet.

In some embodiments, the computer system communicates with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 702 or electronic storage unit 704. The machine executable or machine-readable code can be provided in the form of software. During use, the processor 706 can execute the code. In some cases, the code can be retrieved from the storage unit and stored on the memory for ready access by the processor. In some situations, the electronic storage unit can be precluded, and machine-executable instructions are stored on memory.

At times, the code is pre-compiled and configured for use with a machine have a processer adapted to execute the code, or can be compiled during runtime. The code can be supplied in a programming language that can be selected to enable the code to execute in a pre-compiled or as-compiled fashion.

In some embodiments, the processing unit includes one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 $mm^2$, or 800 $mm^2$. The integrated circuit chip may have an area of at most about 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 $mm^2$, or 800 $mm^2$. The integrated circuit chip may have an area of any value between the afore-mentioned values (e.g., from about 50 $mm^2$ to about 800 $mm^2$, from about 50 $mm^2$ to about 500 $mm^2$, or from about 500 $mm^2$ to about 800 $mm^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 0.1 Tera FLOPS (T-FLOPS), 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, from about 0.1 T-FLOP to about 10 EXA-FLOPS).). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance LIN PACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

In some embodiments, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by NVidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

In some embodiments, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

In some embodiments, the computer system includes configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration. The FPGA may comprise configurable FPGA logic, and/or fixed-function hardware comprising multipliers, memories, microprocessor cores, first in-first out (FIFO) and/or error correcting code (ECC) logic, digital signal processing (DSP) blocks, peripheral Component interconnect express (PCI Express) controllers, Ethernet media access control (MAC) blocks, or high-speed serial transceivers. DSP blocks can be DSP slices.

In some embodiments, the computing system includes an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond (μs), 1 μs, 10 μs, 100 μs, or 1 millisecond (ms). The physical unit may produce the algorithm output in any time between the above mentioned times (e.g., from about 0.1 μs, to about 1 ms, from about 0.1 μs, to about 100 μs, or from about 0.1 μs to about 10 μs).

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real-time measurements may be conducted during the 3D printing process. The real-time measurements may be in situ measurements in the 3D printing system and/or apparatus. The real-time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds (μsec), 50 μsec, 20 μsec, 10 μsec, 5 μsec, or 1 μsec. In some instances, the processing unit may use the signal obtained from the at least one sensor to provide a processing unit output, which output is provided at a speed of any value between the afore-mentioned values (e.g., from about 100 min to about 1 μsec, from about 100 min to about 10 min, from about 10 min to about 1 min, from about 5 min to about 0.5 min, from about 30 sec to about 0.1 sec, from about 0.1 sec to about 1 msec, from about 80 msec to about 10 μsec, from about 50 μsec to about 1 μsec, from about 20 μsec to about 1 μsec, or from about 10 μsec to about 1 μsec).

At times, the processing unit output comprises an evaluation of the temperature at a location, position at a location (e.g., vertical, and/or horizontal), or a map of locations. The location may be on the target surface. The map may comprise a topological or temperature map. The temperature sensor may comprise a temperature imaging device (e.g., IR imaging device).

At times, the processing unit uses the signal obtained from the at least one sensor in an algorithm that is used in controlling the energy beam. The algorithm may comprise the path of the energy beam. In some instances, the algorithm may be used to alter the path of the energy beam on the target surface. The path may deviate from a cross section of a model corresponding to the desired 3D object. The processing unit may use the output in an algorithm that is used in determining the manner in which a model of the desired 3D object may be sliced. The processing unit may use the signal obtained from the at least one sensor in an algorithm that is used to configure one or more parameters and/or apparatuses relating to the 3D printing process. The parameters may comprise a characteristic of the energy beam. The parameters may comprise movement of the platform and/or material bed. The parameters may comprise relative movement of the energy beam and the material bed. In some instances, the energy beam, the platform (e.g., material bed disposed on the platform), or both may translate. Alternatively, or additionally, the controller may use historical data for the control. Alternatively, or additionally, the processing unit may use historical data in its one or more algorithms. The parameters may comprise the height of the layer of powder material disposed in the enclosure and/or the gap by which the cooling element (e.g., heat sink) is separated from the target surface. The target surface may be the exposed layer of the material bed.

In some embodiments, aspects of the systems, apparatuses, and/or methods provided herein, such as the computer system, are embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

In some embodiments, the memory comprises a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

In some embodiments, all or portions of the software are communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

In some embodiments, the computer system includes or is in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms (e.g., from the one or more sensors). The control may rely on historical data. The feedback mechanism may be pre-programmed. The feedback mechanisms may rely on input from sensors (described herein) that are connected to the control unit (i.e., control system or control mechanism e.g., computer) and/or processing unit. The computer system may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

In some embodiments, the system and/or apparatus described herein (e.g., controller) and/or any of their components comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen.

In some embodiments, the computer system includes, or is in communication with, an electronic display unit that comprises a user interface (UI) for providing, for example, a model design or graphical representation of an object to be printed. Examples of UI's include a graphical user interface (GUI) and web-based user interface. The historical and/or operative data may be displayed on a display unit. The computer system may store historical data concerning various aspects of the operation of the cleaning system. The historical data may be retrieved at predetermined times and/or at a whim. The historical data may be accessed by an operator and/or by a user. The display unit (e.g., monitor) may display various parameters of the printing system (as described herein) in real time or in a delayed time. The display unit may display the desired printed 3D object (e.g., according to a model), the printed 3D object, real time display of the 3D object as it is being printed, or any combination thereof. The display unit may display the cleaning progress of the object, or various aspects thereof. The display unit may display at least one of the total time, time remaining, and time expanded on the cleaned object during the cleaning process. The display unit may display the status of sensors, their reading, and/or time for their calibration or maintenance. The display unit may display the type or types of material used and various characteristics of the material or materials such as temperature and flowability of the pre-transformed material. The display unit may display the amount of a certain gas in the chamber. The gas may comprise oxygen, hydrogen, water vapor, or any of the gasses mentioned herein. The display unit may display the pressure in the chamber. The computer may generate a report comprising various parameters of the methods, objects, apparatuses, or systems described herein. The report may be generated at predetermined time(s), on a request (e.g., from an operator) or at a whim.

Methods, apparatuses, and/or systems of the present disclosure can be implemented by way of one or more algorithms. An algorithm can be implemented by way of software upon execution by one or more computer processors. For example, the processor can be programmed to calculate the path of the energy beam and/or the power per unit area emitted by the energy source (e.g., that should be provided to the material bed in order to achieve the desired result). Other control and/or algorithm examples may be found in patent application Ser. No. 15/435,065 that is incorporated herein by reference in its entirety.

Figure 11:
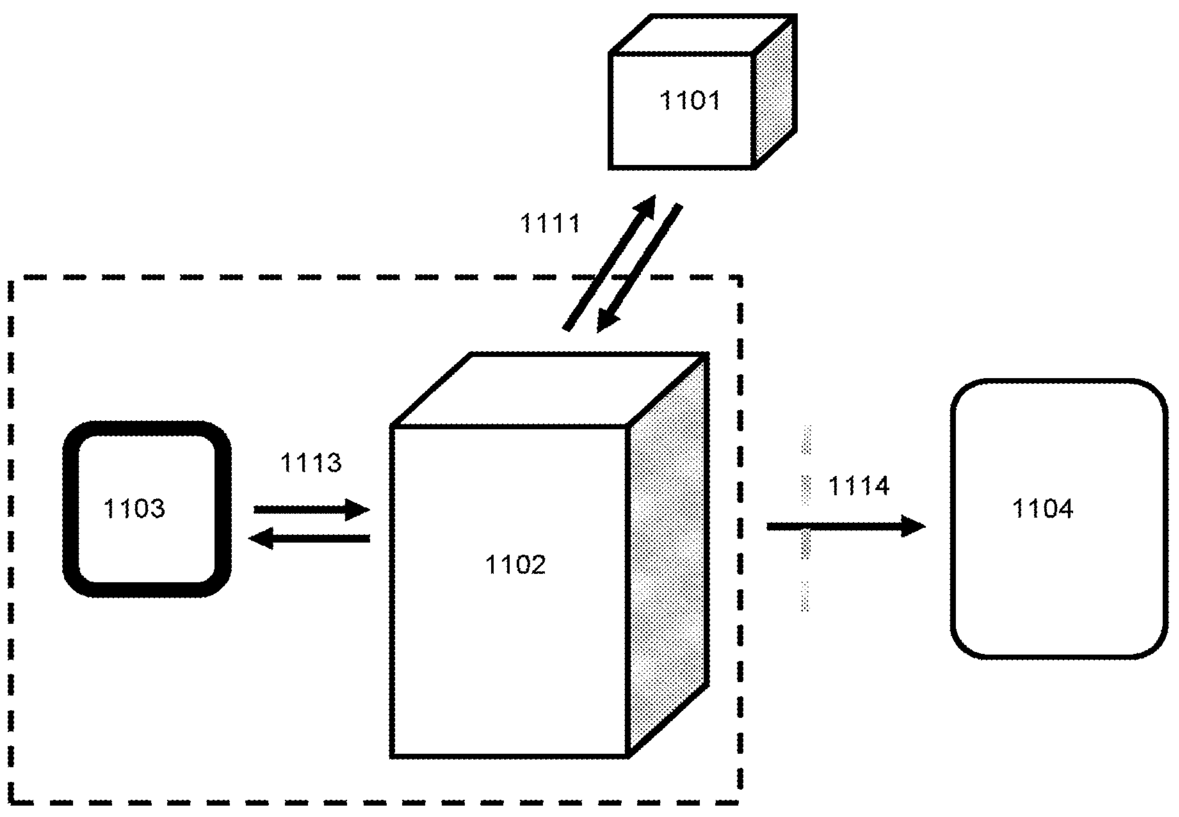
FIG. 11 schematically depicts a 3D printer and processing systems.

In some embodiments, the 3D printer comprises and/or communicates with a multiplicity of processors. The processors may form a network architecture. Examples of a processor architectures is shown in FIG. 11. FIG. 11 shows an example of a 3D printer 1102 comprising a processor that is in communication with a local processor (e.g., desktop) 1101, a remote processor 1104, and a machine interface 1103. The 3D printer interface is termed herein as "machine interface." The communication of the 3D printer processor with the remote processor and/or machine interface may or may not be through a server. The server may be integrated within the 3D printer. The machine interface may be integrated with, or closely situated adjacent to, the 3D printer 1102. Arrows 1111 and 1113 designate local communications. Arrow 1114 designates communicating through a firewall (shown as a discontinuous line). A machine interface may communicate directly or indirectly with the 3D printer processor. A 3D printing processor may comprise a plurality of machine interlaces. Any of the machine interfaces may be optionally included in the 3D printing system. The communication between the 3D printer processor and the machine interface processor may be unidirectional (e.g., from the machine interface processor to the 3D printer processor), or bidirectional. The arrows in FIG. 8 illustration the directionality of the communication (e.g., flow of information direction) between the processors. The 3D printer processor may be connected directly or indirectly to one or more stationary processors (e.g., desktop). The 3D printer processor may be connected directly or indirectly to one or more mobile processors (e.g., mobile device). The 3D printer processor may be connected directly or indirectly (e.g., through a server) to processors that direct 3D printing instructions. The connection may be local (e.g., in 1101) or remote (e.g., in 1104). The 3D printer processor may communicate with at least one 3D printing monitoring processor. The 3D printing processor may be owned by the entity supplying the printing instruction to the 3D printer, or by a client. The client may be an entity or person that desires at least one 3D printing object.

In some embodiments, the 3D printer comprises at least one processor (referred herein as the "3D printer processor"). The 3D printer may comprise a plurality of processors. At least two of the plurality of the 3D printer processors may interact with each other. At times, at least two of the plurality of the 3D printer processors may not interact with each other. Discontinuous line 1114 illustrates a firewall.

A 3D printer processor may interact with at least one processor that acts as a 3D printer interface (also referred to herein as "machine interface processor"). The processor (e.g., machine interface processor) may be stationary or mobile. The processor may be on a remote computer system. The machine interface one or more processors may be connected to at least one 3D printer processor. The connection may be through a wire (e.g., cable) or be wireless (e.g., via Bluetooth technology). The machine interface may be hardwired to the 3D printer. The machine interface may directly connect to the 3D printer (e.g., to the 3D printer processor). The machine interface may indirectly connect to the 3D printer (e.g., through a server, or through wireless communication). The cable may comprise coaxial cable, shielded twisted cable pair, unshielded twisted cable pair, structured cable (e.g., used in structured cabling), or fiber-optic cable.

At times, the machine interface processor directs 3D print job production, 3D printer management, 3D printer monitoring, or any combination thereof. The machine interface processor may not be able to influence (e.g., direct, or be involved in) pre-print or 3D printing process development. The machine management may comprise controlling the 3D printer controller (e.g., directly, or indirectly). The printer controller may direct starting a 3D printing process, stopping a 3D printing process, maintenance of the 3D printer, clearing alarms (e.g., concerning safety features of the 3D printer).

At times, the machine interface processor allows monitoring of the 3D printing process (e.g., accessible remotely or locally). The machine interface processor may allow viewing a log of the 3D printing and status of the 3D printer at a certain time (e.g., 3D printer snapshot). The machine interface processor may allow to monitor one or more 3D printing parameters. The one or more printing parameters monitored by the machine interface processor can comprise 3D printer status (e.g., 3D printer is idle, preparing to 3D print, 3D printing, maintenance, fault, or offline), active 3D printing (e.g., including a build module number), status and/or position of build module(s), status of build module and processing chamber engagement, type and status of pre-transformed material used in the 3D printing (e.g., amount of pre-transformed material remaining in the reservoir), status of a filter, atmosphere status (e.g., pressure, gas level(s)), ventilator status, layer dispensing mechanism status (e.g., position, speed, rate of deposition, level of exposed layer of the material bed), status of the optical system (e.g., optical window, mirror), status of scanner, alarm (boot log, status change, safety events), motion control commands (e.g., of the energy beam, or of the layer dispensing mechanism), or printed 3D object status (e.g., what layer number is being printed), At times, the machine interface processor allows monitoring the 3D print job management. The 3D print job management may comprise status of each build module (e.g., atmosphere condition, position in the enclosure, position in a queue to go in the enclosure, position in a queue to engage with the processing chamber, position in queue for further processing, power levels of the energy beam, type of pre-transformed material loaded, 3D printing operation diagnostics, status of a filter. The machine interface processor (e.g., output device thereof) may allow viewing and/or editing any of the job management and/or one or more printing parameters. The machine interface processor may show the permission level given to the user (e.g., view, or edit). The machine interface processor may allow viewing and/or assigning a certain 3D object to a particular build module, prioritize 3D objects to be printed, pause 3D objects during 3D printing, delete 3D objects to be printed, select a certain 3D printer for a particular 3D printing job, insert and/or edit considerations for restarting a 3D printing job that was removed from 3D printer. The machine interface processor may allow initiating, pausing, and/or stopping a 3D printing job. The machine interface processor may output message notification (e.g., alarm), log (e.g., other than Excursion log or other default log), or any combination thereof. The 3D printer may interact with at least one server (e.g., print server). The 3D print server may be separate or interrelated in the 3D printer.

At times, one or more users may interact with the one or more 3D printing processors through one or more user processors (e.g., respectively). The interaction may be in parallel and/or sequentially. The users may be clients. The users may belong to entities that desire a 3D object to be printed, or entities who prepare the 3D object printing instructions. The one or more users may interact with the 3D printer (e.g., through the one or more processors of the 3D printer) directly and/or indirectly. Indirect interaction may be through the server. One or more users may be able to monitor one or more aspects of the 3D printing process. One or more users can monitor aspects of the 3D printing process through at least one connection (e.g., network connection). For example, one or more users can monitor aspects of the printing process through direct or indirect connection. Direct connection may be using a local area network (LAN), and/or a wide area network (WAN). The network may interconnect computers within a limited area (e.g., a building, campus, neighborhood). The limited area network may comprise Ethernet or Wi-Fi. The network may have its network equipment and interconnects locally managed. The network may cover a larger geographic distance than the limited area. The network may use telecommunication circuits and/or internet links. The network may comprise Internet Area Network (IAN), and/or the public switched telephone network (PSTN). The communication may comprise web communication. The aspect of the 3D printing process may comprise a 3D printing parameter, machine status, or sensor status. The 3D printing parameter may comprise hatch strategy, energy beam power, energy beam speed, energy beam focus, thickness of a layer (e.g., of hardened material or of pre-transformed material).

At times, a user may develop at least one 3D printing instruction and direct the 3D printer (e.g., through communication with the 3D printer processor) to print in a desired manner according to the developed at least one 3D printing instruction. A user may or may not be able to control (e.g., locally, or remotely) the 3D printer controller. For example, a client may not be able to control the 3D printing controller (e.g., maintenance of the 3D printer).

At times, the user (e.g., other than a client) processor may use real-time and/or historical 3D printing data. The 3D printing data may comprise metrology data, or temperature data. The user processor may comprise quality control. The quality control may use a statistical method (e.g., statistical process control (SPC)). The user processor may log excursion log, report when a signal deviates from the nominal level, or any combination thereof. The user processor may generate a configurable response. The configurable response may comprise a print/pause/stop command (e.g., automatically) to the 3D printer (e.g., to the 3D printing processor). The configurable response may be based on a user defined parameter, threshold, or any combination thereof. The configurable response may result in a user defined action. The user processor may control the 3D printing process and ensure that it operates at its full potential. For example, at its full potential, the 3D printing process may make a maximum number of 3D object with a minimum of waste and/or 3D printer down time. The SPC may comprise a control chart, design of experiments, and/or focus on continuous improvement.

The fundamental length scale (e.g., the diameter, spherical equivalent diameter, diameter of a bounding circle, or largest of height, width and length; abbreviated herein as "FLS") of the printed 3D object or a portion thereof can be at least about 50 micrometers (μ), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object or a portion thereof can be at most about 150 μm, 170 μm, 200 μm, 230 μm, 250 μm, 270 μm, 300 μm, 400 μm, 500 μm, 600 μm, 700 μm, 800 μm, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, 100 m, 500 m, or 1000 m. The FLS of the printed 3D object or a portion thereof can any value between the afore-mentioned values (e.g., from about 50 μm to about 1000 m, from about 500 μm to about 100 m, from about 50 μm to about 50 cm, or from about 50 cm to about 1000 m). In some cases, the FLS of the printed 3D object or a portion thereof may be in between any of the afore-mentioned FLS values. The portion of the 3D object may be a heated portion or disposed portion (e.g., tile).

At times, the layer of pre-transformed material (e.g., powder) is of a predetermined height (thickness). The layer of pre-transformed material can comprise the material prior to its transformation in the 3D printing process. The layer of pre-transformed material may have an upper surface that is substantially flat, leveled, or smooth. In some instances, the layer of pre-transformed material may have an upper surface that is not flat, leveled, or smooth. The layer of pre-transformed material may have an upper surface that is corrugated or uneven. The layer of pre-transformed material may have an average or mean (e.g., pre-determined) height. The height of the layer of pre-transformed material (e.g., powder) may be at least about 5 micrometers (μ), 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be at most about 5 micrometers (μ), 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be any number between the afore-mentioned heights (e.g., from about 5 μm to about 1000 mm, from about 5 μm to about 1 mm, from about 25 μm to about 1 mm, or from about 1 mm to about 1000 mm). The "height" of the layer of material (e.g., powder) may at times be referred to as the "thickness" of the layer of material. In some instances, the layer of hardened material may be a sheet of metal. The layer of hardened material may be fabricated using a 3D manufacturing methodology. Occasionally, the first layer of hardened material may be thicker than a subsequent layer of hardened material. The first layer of hardened material may be at least about 1.1 times, 1.2 times, 1.4 times, 1.6 times, 1.8 times, 2 times, 4 times, 6 times, 8 times, 10 times, 20 times, 30 times, 50 times, 100 times, 500 times, 1000 times, or thicker (higher) than the average (or mean) thickness of a subsequent layer of hardened material, the average thickens of an average subsequent layer of hardened material, or the average thickness of any of the subsequent layers of hardened material.

In some instances, one or more intervening layers separate adjacent components from one another. For example, the one or more intervening layers can have a thickness of at most about 10 micrometers ("microns"), 1 micron, 500 nanometers ("nm"), 100 nm, 50 nm, 10 nm, or 1 nm. For example, the one or more intervening layers can have a thickness of at least about 10 micrometers ("microns"), 1 micron, 500 nanometers ("nm"), 100 nm, 50 nm, 10 nm, or 1 nm. In an example, a first layer is adjacent to a second layer when the first layer is in direct contact with the second layer. In another example, a first layer is adjacent to a second layer when the first layer is separated from the second layer by a third layer. In some instances, adjacent to may be 'above' or 'below.' Below can be in the direction of the gravitational force or towards the platform. Above can be in the direction opposite to the gravitational force or away from the platform.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for passivation of debris generated by three-dimensional printing, the apparatus comprising:

a controller;

a passivation chamber;

at least one valve in communication with the controller and configured to:

(a) introduce a passivation mixture to the passivation chamber, the passivation chamber having debris generated by a three-dimensional printing process, wherein the three-dimensional printing process includes printing a three-dimensional object from a starting material comprising elemental metal or metal alloy in a three-dimensional printer, the passivation mixture including a diluent and an oxidizing agent, (b) during passivation, adjust a relative amount of the diluent and the oxidizing agent by introducing additional diluent or oxidizing agent to the passivation chamber; and at least one sensor configured to indicate that a filter media is breaking down, wherein the filter media is disposed in the passivation chamber, wherein the filter media is configured to collect debris during the three-dimensional printing process; and wherein, in response to the at least one sensor indicating that the filter media is breaking down, the controller is configured to cause the at least one valve to adjust an amount of the oxidizing agent.

2. The apparatus of claim 1, wherein the passivation chamber is a filter housing-configured to house a filter utilized in the three-dimensional printing, the filter being configured to cause an accumulation of the debris on the filter during the three-dimensional printing.

3. The apparatus of claim 1, wherein the at least one sensor comprises a hydrogen sensor, or a moisture sensor.

4. The apparatus of claim 1, wherein the at least one sensor is configured to sense a level of a reaction product of the passivation.

5. The apparatus of claim 1, wherein during passivation comprises during the three-dimensional printing.

6. The apparatus of claim 1, wherein the passivation chamber is configured to accommodate a filter configured to cause an accumulation of the debris on the filter during the three-dimensional printing.

7. The apparatus of claim 1, wherein the oxidizing agent comprises water, mist, or water in a form of mist.

8. The apparatus of claim 1, wherein the oxidizing agent comprises oxygen.

9. The apparatus of claim 1, wherein the apparatus further comprises a heat exchanger configured to control a temperature of the passivation mixture (I) before entry into the passivation chamber, (II) after exiting the passivation chamber, or (III) before entry into the passivation chamber and after exiting the passivation chamber.

10. The apparatus of claim 9, wherein the heat exchanger is configured to control the temperature of the passivation mixture at least in part by being configured to cool the passivation mixture.

11. The apparatus of claim 1, wherein the apparatus is operatively coupled to an oxygen generator configured to generate the oxidizing agent.

12. The apparatus of claim 11, wherein oxidizing agent comprises gas or mist.

13. The apparatus of claim 1, wherein the passivation chamber is an ex-situ passivation system that is outside of a three-dimensional printer configured for the three-dimensional printing of the three-dimensional object.

14. The apparatus of claim 1, wherein the controller and the at least one valve are configured for keeping the oxidizing agent below a threshold such that reaction of the passivation mixture with the debris does not breakdown a filter media on which the debris is collected during the three-dimensional printing.

15. The apparatus of claim 1, wherein the apparatus is part of a three-dimensional printer used for the three-dimensional printing of the three-dimensional object, the apparatus being an in-situ passivation system of the three-dimensional printer, the apparatus being integrated along a gas conveyance system of the three-dimensional printer and is configured to passivate the debris during operation of the three-dimensional printing.

16. The apparatus of claim 15, wherein the apparatus is configured to facilitate passivation of the debris that is continuously filtered from a gas flow in the three-dimensional printer and directed into the passivation chamber during the three-dimensional printing.

17. The apparatus of claim 16, wherein the apparatus is configured to facilitate passivation of the debris that is continuously filtered from the gas flow (i) during transformation of the starting material to a transformed material to print at least a portion of the three-dimensional object (ii) during operation of a material conveyance system of a three-dimensional printer configured to perform the three-dimensional printing, and/or (iii) between dispensing operations of the starting material.

18. The apparatus of claim 1, wherein the apparatus is part of, or is operatively coupled to, a three-dimensional printer configured to operate without interruption for a period of at least about six hours, the three-dimensional printer used for the three-dimensional printing of the three-dimensional object.

19. The apparatus of claim 1, wherein during passivation of the debris, the controller and the at least one valve are configured for maintaining in the passivation chamber the passivation mixture having a first relative amount of the oxidizing agent below a second amount of a respective oxidizing agent present in an ambient atmosphere external to the passivation chamber.

20. The apparatus of claim 19, wherein the controller and the at least one valve are configured to adjust the relative amount of the oxidizing agent to be within a threshold window comprising a maximum threshold of at most about 7000 ppm oxidizing agent in the passivation mixture.

21. The apparatus of claim 1, wherein during passivation of the debris, the controller and the at least one valve are configured for maintaining in the passivation chamber a first pressure above a second pressure of an ambient atmosphere external to the passivation chamber.

22. The apparatus of claim 1, wherein the controller and at least one water inlet valve are configured to allow water to inflow for (i) flooding the debris with water and/or (ii) exposing the debris to an ambient environment external to the passivation chamber, and wherein flooding the debris and/or exposing the debris, is utilized after the debris has been passivated to a safe handling level by a user.

23. The apparatus of claim 1, wherein the apparatus is operatively coupled to a safety interlock configured to disable one or more energy beams generated by a component of the three-dimensional printer.

24. The apparatus of claim 23, wherein the safety interlock is configured to disable the one or more energy beams comprises being configured to disable the one or more energy beams from printing the three-dimensional object.

25. The apparatus of claim 24, wherein safety interlock configured to disable the one or more energy beams from printing the three-dimensional object at least in part by being configured to (i) shut power to an energy source configured to generate an energy beam of the one or more energy beams, (ii) control the energy source to halt generating the energy beam, (iii) reduce power of the energy beam such that the energy beam is unable to transform the starting material to print to print at least a portion of the three-dimensional object, and/or (iv) move a position of the energy beam such that the energy beam is unable to transform the starting material to print at least a portion of the three-dimensional object.

* * * * *